United States Patent
Morton et al.

(10) Patent No.: US 12,472,642 B2
(45) Date of Patent: Nov. 18, 2025

(54) ADJUSTABLE END-OF-ARM TOOL OR FIXTURE

(71) Applicant: Magswitch Technology, Inc., Superior, CO (US)

(72) Inventors: David H. Morton, Boulder, CO (US); Cengiz Kizilkan, Ingolstadt (DE)

(73) Assignee: Magswitch Automation Company, Superior, CO (US)

( * ) Notice: Subject to any disclaimer, the term of this patent is extended or adjusted under 35 U.S.C. 154(b) by 0 days.

(21) Appl. No.: 18/568,736

(22) PCT Filed: Jun. 11, 2022

(86) PCT No.: PCT/US2022/033154
§ 371 (c)(1),
(2) Date: Dec. 8, 2023

(87) PCT Pub. No.: WO2022/261520
PCT Pub. Date: Dec. 15, 2022

(65) Prior Publication Data
US 2024/0269861 A1 Aug. 15, 2024

Related U.S. Application Data

(60) Provisional application No. 63/209,878, filed on Jun. 11, 2021.

(51) Int. Cl.
*B25J 15/00* (2006.01)
*B25J 9/16* (2006.01)
*B25J 15/06* (2006.01)

(52) U.S. Cl.
CPC ......... *B25J 15/0004* (2013.01); *B25J 9/1612* (2013.01); *B25J 9/1664* (2013.01);
(Continued)

(58) Field of Classification Search
CPC ............... B25J 15/0004; B25J 15/0052; B25J 15/0608; B25J 15/0061; B25J 9/1612; B25J 9/1664; B25J 9/1697
See application file for complete search history.

(56) References Cited

U.S. PATENT DOCUMENTS 2,863,550 A  12/1958  Hommel
2,947,429 A   8/1960  Buccicone
(Continued)

FOREIGN PATENT DOCUMENTS

AT        510494 A1    4/2012
CN       2179359 Y    10/1994
(Continued)

OTHER PUBLICATIONS

United States Patent and Trademark Office; International Search Report and Written Opinion; International Application No. PCT/US2022/033154; 24 pages; dated Sep. 16, 2022.
(Continued)

*Primary Examiner* — Stephen A Vu
(74) *Attorney, Agent, or Firm* — Faegre Drinker Biddle & Reath LLP

(57) ABSTRACT

Adjustable end of arm tools for robots and fixtures are disclosed. The adjustable end of arm tools and fixtures may each have multiple degrees of freedom to position an interface of a tool in one of a plurality of configurations.

60 Claims, 22 Drawing Sheets

(52) U.S. Cl.
CPC ......... *B25J 9/1697* (2013.01); *B25J 15/0052* (2013.01); *B25J 15/0608* (2013.01)

(56) References Cited

U.S. PATENT DOCUMENTS

| | | | |
|---|---|---|---|
| 3,089,064 A | 5/1963 | Cotton De Bennetot | |
| 3,273,931 A | 9/1966 | Caldwell et al. | |
| 3,316,514 A | 4/1967 | Radus et al. | |
| 3,355,209 A | 11/1967 | Richards et al. | |
| 3,452,310 A | 6/1969 | Israelson | |
| 3,646,669 A | 3/1972 | Erickson | |
| 3,895,270 A | 7/1975 | Maddox | |
| 4,314,219 A | 2/1982 | Haraguchi | |
| 4,384,313 A | 5/1983 | Steingroever et al. | |
| 4,399,718 A | 8/1983 | Zimmer | |
| 4,465,993 A | 8/1984 | Braillon | |
| 4,563,031 A | 1/1986 | Kishimoto et al. | |
| 4,594,568 A | 6/1986 | Hubner et al. | |
| 4,610,580 A | 9/1986 | Palm | |
| 4,636,138 A | 1/1987 | Gorman | |
| 4,639,170 A | 1/1987 | Palm | |
| 4,685,861 A | 8/1987 | Huetsch | |
| 4,921,292 A | 5/1990 | Harwell et al. | |
| 4,956,625 A | 9/1990 | Cardone et al. | |
| 5,100,284 A | 3/1992 | Boisseau | |
| 5,338,150 A | 8/1994 | Focke et al. | |
| 5,444,902 A | 8/1995 | Casturo et al. | |
| 5,525,950 A | 6/1996 | Wang | |
| 5,794,497 A | 8/1998 | Anderson | |
| 6,076,873 A | 6/2000 | Jung | |
| 6,104,270 A | 8/2000 | Elias | |
| 6,154,353 A | 11/2000 | Bowers et al. | |
| 6,160,697 A | 12/2000 | Edel | |
| 6,229,422 B1 | 5/2001 | Pignataro | |
| 6,331,810 B1 | 12/2001 | Jung | |
| 6,489,871 B1 | 12/2002 | Barton | |
| 6,573,817 B2 | 6/2003 | Gottschalk | |
| 6,636,153 B1 | 10/2003 | Barton et al. | |
| 6,644,637 B1 | 11/2003 | Shen et al. | |
| 6,663,154 B2 | 12/2003 | Pancheri | |
| 6,707,360 B2 | 3/2004 | Underwood et al. | |
| 7,001,130 B2 | 2/2006 | Ransom | |
| 7,012,495 B2 | 3/2006 | Underwood et al. | |
| 7,049,919 B2 | 5/2006 | Yamaki | |
| 7,148,777 B2 | 12/2006 | Chell et al. | |
| 7,161,451 B2 | 1/2007 | Shen | |
| 7,396,057 B2 | 7/2008 | Ye et al. | |
| 7,860,610 B2 | 12/2010 | Waldmann et al. | |
| 8,031,038 B2 | 10/2011 | Kimura | |
| 8,083,277 B1 | 12/2011 | Benjamin et al. | |
| 8,157,155 B2 | 4/2012 | Diez et al. | |
| 8,183,965 B2 | 5/2012 | Michael | |
| 8,217,743 B2 | 7/2012 | Liu | |
| 8,256,098 B2 | 9/2012 | Michael | |
| 8,350,663 B1 | 1/2013 | Michael | |
| 8,371,631 B2 | 2/2013 | Lin | |
| 8,604,900 B2 | 12/2013 | Kocijan | |
| 8,803,358 B2 | 8/2014 | Hfner et al. | |
| 8,878,639 B2 | 11/2014 | Kocijan | |
| 8,892,258 B2 | 11/2014 | Jacobsen et al. | |
| 8,907,754 B2 | 12/2014 | Barton et al. | |
| 8,934,210 B1 | 1/2015 | Denis et al. | |
| 9,164,154 B2 | 10/2015 | Filosa et al. | |
| 9,174,317 B1 | 11/2015 | Lessway | |
| 9,202,616 B2 | 12/2015 | Fullerton et al. | |
| 9,232,976 B2 | 1/2016 | Fortier et al. | |
| 9,242,367 B2 | 1/2016 | Timmons et al. | |
| 9,453,769 B2 | 9/2016 | Michael | |
| 9,484,137 B2 | 11/2016 | Kocijan | |
| 9,579,770 B2 | 2/2017 | Pierednik et al. | |
| 9,589,715 B2 | 3/2017 | Choi | |
| 9,818,522 B2 | 11/2017 | Kocijan | |
| 10,011,023 B1 | 7/2018 | Lin et al. | |
| 10,464,218 B2 | 11/2019 | Golan et al. | |
| 10,625,953 B2 | 4/2020 | Hasegawa et al. | |
| 10,668,628 B2 | 6/2020 | Guo et al. | |
| 10,688,611 B2 | 6/2020 | Youngwerth et al. | |
| 10,836,046 B2 | 11/2020 | Brudniok et al. | |
| 10,903,030 B2 | 1/2021 | Morton et al. | |
| 10,953,552 B1 | 3/2021 | Dulla et al. | |
| 11,031,166 B2 | 6/2021 | Morton et al. | |
| 11,097,401 B2 | 8/2021 | Morton et al. | |
| 11,202,409 B1 | 12/2021 | Schroll et al. | |
| 11,511,396 B2 | 11/2022 | Morton et al. | |
| 11,651,883 B2 | 5/2023 | Morton et al. | |
| 11,839,954 B2 | 12/2023 | Morton et al. | |
| 12,023,770 B2 | 7/2024 | Morton et al. | |
| 12,202,132 B2 | 1/2025 | Junker | |
| 2001/0045785 A1 | 11/2001 | Chen et al. | |
| 2002/0105400 A1 | 8/2002 | Underwood et al. | |
| 2003/0030342 A1 | 2/2003 | Chen et al. | |
| 2003/0180135 A1 | 9/2003 | Sawdon et al. | |
| 2003/0220058 A1 | 11/2003 | Pollak et al. | |
| 2004/0130085 A1 | 7/2004 | Lim | |
| 2004/0239460 A1 | 12/2004 | Kocijan | |
| 2005/0012579 A1 | 1/2005 | Underwood et al. | |
| 2008/0145195 A1 | 6/2008 | Sacerdoti et al. | |
| 2008/0168639 A1 | 7/2008 | Otake et al. | |
| 2008/0174296 A1 | 7/2008 | Georgeson et al. | |
| 2009/0027149 A1 | 1/2009 | Kocijan | |
| 2009/0194922 A1 | 8/2009 | Lin et al. | |
| 2010/0156126 A1 | 6/2010 | Trachet et al. | |
| 2010/0201468 A1 | 8/2010 | Pohl et al. | |
| 2010/0237970 A1 | 9/2010 | Liu | |
| 2010/0301839 A1 | 12/2010 | Cardone et al. | |
| 2011/0248806 A1 | 10/2011 | Michael | |
| 2012/0263519 A1 | 10/2012 | Kotula et al. | |
| 2012/0290134 A1* | 11/2012 | Zhao | A61B 34/37 901/47 |
| 2013/0026774 A1 | 1/2013 | Ding | |
| 2013/0135067 A1 | 5/2013 | Choi | |
| 2013/0234817 A1 | 9/2013 | Kocijan | |
| 2013/0285399 A1 | 10/2013 | Sarh et al. | |
| 2013/0320686 A1 | 12/2013 | Morton | |
| 2014/0055069 A1 | 2/2014 | Dai et al. | |
| 2014/0132254 A1 | 5/2014 | Thomas et al. | |
| 2014/0314507 A1 | 10/2014 | Timmons et al. | |
| 2015/0035632 A1 | 2/2015 | Sarh et al. | |
| 2015/0239092 A1 | 8/2015 | Pierednik et al. | |
| 2015/0367484 A1 | 12/2015 | Choi | |
| 2016/0187208 A1 | 6/2016 | Michael | |
| 2016/0207176 A1 | 7/2016 | Choi | |
| 2016/0237993 A1 | 8/2016 | Bosch et al. | |
| 2016/0289046 A1 | 10/2016 | Norton et al. | |
| 2017/0011831 A1 | 1/2017 | Ntti | |
| 2017/0232605 A1 | 8/2017 | Morton | |
| 2017/0334075 A1 | 11/2017 | Eidelberg et al. | |
| 2018/0111237 A1 | 4/2018 | Michael | |
| 2018/0193899 A1 | 7/2018 | Kizilkan | |
| 2018/0240627 A1 | 8/2018 | Matsuo et al. | |
| 2018/0311795 A1 | 11/2018 | Morton et al. | |
| 2018/0315563 A1 | 11/2018 | Morton et al. | |
| 2019/0001485 A1 | 1/2019 | Maruno | |
| 2019/0039838 A1 | 2/2019 | Curhan et al. | |
| 2019/0255700 A1 | 8/2019 | Nose et al. | |
| 2019/0255713 A1 | 8/2019 | Churchill | |
| 2019/0261565 A1 | 8/2019 | Robertson et al. | |
| 2019/0334340 A1 | 10/2019 | Niehoff | |
| 2020/0047333 A1 | 2/2020 | Wiktor | |
| 2020/0156246 A1 | 5/2020 | Srivastav | |
| 2020/0171650 A1 | 6/2020 | Hallock et al. | |
| 2020/0185137 A1 | 6/2020 | Morton et al. | |
| 2020/0315738 A1 | 10/2020 | Dewaele et al. | |
| 2021/0031317 A1 | 2/2021 | Morton et al. | |
| 2021/0031335 A1 | 2/2021 | Morton et al. | |
| 2021/0068909 A1 | 3/2021 | Eyre et al. | |
| 2021/0107137 A1 | 4/2021 | Ohige et al. | |
| 2021/0122011 A1 | 4/2021 | Kitaura et al. | |
| 2021/0162610 A1 | 6/2021 | Kieffer et al. | |
| 2021/0210296 A1 | 7/2021 | Morton et al. | |
| 2021/0213629 A1 | 7/2021 | Frey et al. | |
| 2021/0268615 A1 | 9/2021 | Morton et al. | |
| 2021/0296039 A1 | 9/2021 | Morton et al. | |
| 2023/0090943 A1 | 3/2023 | Morton et al. | |

(56) References Cited

U.S. PATENT DOCUMENTS

| | | |
|---|---|---|
| 2023/0170122 A1 | 6/2023 | Morton et al. |
| 2023/0343530 A1 | 10/2023 | Morton et al. |
| 2023/0364747 A1 | 11/2023 | Morton et al. |
| 2024/0087784 A1 | 3/2024 | Morton |
| 2024/0269803 A1 | 8/2024 | Morton et al. |
| 2024/0269804 A1 | 8/2024 | Kizilkan et al. |
| 2024/0395485 A1 | 11/2024 | Morton et al. |
| 2025/0065460 A1 | 2/2025 | Morton et al. |
| 2025/0170690 A1 | 5/2025 | Morton et al. |

FOREIGN PATENT DOCUMENTS

| | | |
|---|---|---|
| CN | 1104989 A | 7/1995 |
| CN | 1402876 A | 3/2003 |
| CN | 1245725 C | 3/2006 |
| CN | 101274727 A | 10/2008 |
| CN | 101356597 A | 1/2009 |
| CN | 101711194 A | 5/2010 |
| CN | 201689754 U | 12/2010 |
| CN | 101559597 B | 4/2011 |
| CN | 102405502 A | 4/2012 |
| CN | 102574668 A | 7/2012 |
| CN | 202704790 U | 1/2013 |
| CN | 103332585 A | 10/2013 |
| CN | 103377793 A | 10/2013 |
| CN | 103563019 A | 2/2014 |
| CN | 104276506 A | 1/2015 |
| CN | 105684102 A | 6/2016 |
| CN | 105940468 A | 9/2016 |
| CN | 106102993 A | 11/2016 |
| CN | 206617466 U | 11/2017 |
| CN | 110171015 A | 8/2019 |
| DE | 102004014850 A1 | 11/2005 |
| DE | 202007009403 U1 | 9/2007 |
| DE | 202016006696 U1 | 12/2016 |
| EP | 1110680 A1 | 6/2001 |
| EP | 1425763 A1 | 6/2004 |
| EP | 1419034 B1 | 7/2006 |
| EP | 2218557 A2 | 8/2010 |
| EP | 2611569 A1 | 7/2013 |
| EP | 2535307 B1 | 4/2015 |
| EP | 3100289 A1 | 12/2016 |
| EP | 3100288 B1 | 3/2018 |
| EP | 3460411 A1 | 3/2019 |
| EP | 3733108 A1 | 11/2020 |
| FR | 2668084 A1 | 4/1992 |
| GB | 0695130 A | 8/1953 |
| GB | 1471025 A | 4/1977 |
| GB | 2143498 A | 2/1985 |
| GB | 2146406 A | 4/1985 |
| GB | 2566994 A | 4/2019 |
| JP | 51-093568 U | 7/1976 |
| JP | 58-186911 A | 11/1983 |
| JP | 59-030072 U | 2/1984 |
| JP | 61-168079 U | 10/1986 |
| JP | 63-015404 A | 1/1988 |
| JP | 04-207002 A | 7/1992 |
| JP | 07-206211 A | 8/1995 |
| JP | 2608002 B2 | 5/1997 |
| JP | 10-012432 A | 1/1998 |
| JP | 10-149919 A | 6/1998 |
| JP | 11-512032 A | 10/1999 |
| JP | 2000-218675 A | 8/2000 |
| JP | 2001-205678 A | 7/2001 |
| JP | 2002-104765 A | 4/2002 |
| JP | 2002-144271 A | 5/2002 |
| JP | 2003-516627 A | 5/2003 |
| JP | 2004-195637 A | 7/2004 |
| JP | 3111190 U | 7/2005 |
| JP | 2007-208024 A | 8/2007 |
| JP | 4101789 B2 | 6/2008 |
| JP | 2008-535670 A | 9/2008 |
| JP | 2008-253127 A | 10/2008 |
| JP | 2009-509886 A | 3/2009 |
| JP | 2010-158739 A | 7/2010 |
| JP | 2011-148011 A | 8/2011 |
| JP | 2013-219364 A | 10/2013 |
| JP | 2013-537712 A | 10/2013 |
| JP | 2014-081002 A | 5/2014 |
| JP | 2014-511282 A | 5/2014 |
| JP | 5798208 B2 | 10/2015 |
| JP | 2017-506818 A | 3/2017 |
| JP | 2017-537465 A | 12/2017 |
| JP | 2018176313 A | 11/2018 |
| JP | 2019005869 A | 1/2019 |
| JP | 2020-089932 A | 6/2020 |
| KR | 10-2003-0007387 A | 1/2003 |
| KR | 10-2009-0035432 A | 4/2009 |
| KR | 10-2012-0130040 A | 11/2012 |
| KR | 10-2013-0063129 A | 6/2013 |
| KR | 10-2015-0049224 A | 5/2015 |
| KR | 10-1643538 B1 | 7/2016 |
| WO | 96/07610 A1 | 3/1996 |
| WO | 99/08293 A1 | 2/1999 |
| WO | 01/43147 A1 | 6/2001 |
| WO | 03/09972 A2 | 2/2003 |
| WO | 03/19583 A1 | 3/2003 |
| WO | 2008/142716 A2 | 11/2008 |
| WO | 2009/000008 A1 | 12/2008 |
| WO | 2010/020006 A1 | 2/2010 |
| WO | 2010/135788 A1 | 12/2010 |
| WO | 2012/029073 A1 | 3/2012 |
| WO | 2012098347 A1 | 7/2012 |
| WO | 2012/160262 A1 | 11/2012 |
| WO | 2014/033757 A1 | 3/2014 |
| WO | 2015/033851 A1 | 3/2015 |
| WO | 2015/071878 A1 | 5/2015 |
| WO | 2015/114214 A1 | 8/2015 |
| WO | 2015/114220 A1 | 8/2015 |
| WO | 2016/148321 A1 | 9/2016 |
| WO | 2016/162419 A1 | 10/2016 |
| WO | 2016185927 A1 | 11/2016 |
| WO | 2016198867 A1 | 12/2016 |
| WO | 2018/200948 A1 | 11/2018 |
| WO | 2018/227140 A1 | 12/2018 |
| WO | 2020/086791 A1 | 4/2020 |
| WO | 2020198857 A1 | 10/2020 |
| WO | 2021046479 A1 | 3/2021 |
| WO | 2021115736 A1 | 6/2021 |
| WO | 2021116990 A1 | 6/2021 |
| WO | 2022023131 A1 | 2/2022 |
| WO | 2022/261520 A1 | 12/2022 |
| WO | 2022/266255 A1 | 12/2022 |
| WO | 2025/106673 A1 | 5/2025 |

OTHER PUBLICATIONS

European Search Report for EP Patent Application No. 22821172.8, Issued on Feb. 10, 2025, 11 pages.
International Search Report and Written Opinion received for PCT Patent Application No. PCT/US2022/033154, mailed on Sep. 16, 2022, 23 pages.
U.S. Appl. No. 63/194,692, filed May 28, 2021 (47 pages).
Gimatic USA; Gimatic Cobot KIT-UR-V for Universal Robots; gimaticusa.com; Apr. 1, 2019.
Destaco; Bodybuilder End Effector; destaco.com; Sep. 19, 2020.
Pisco; Vacuum EOAT Kit; pisco.com; Aug. 7, 2020.
Ixtur Automatic On/Off Lifting Magnets; Industrial Magnetics, Inc., magnetics.com, Nov. 1, 2015, https://web.archive.org/web/20151101101715/https://www.magnetics.com product.asp?ProductID=169, two pages.
"MagnaGrip SS Sensing System" https://www.maglogix.com/maglogix-switchable-permanent-magnets-magnagrip, copyright 2014-2017, printed Jul. 20, 2019, (5 pages).
"MaxX The hand controlled magnetic lifter", Tecnomagnete, Oct. 2008, (16 pages).
"Pick & Place for End-of-Arm Tooling", DocMagnet, undated, (5 pages).
"Pick 'n Place D Series", DocMagnet, retrieved from https://web.archive.org/web/20150512113557/http://www.docmagnet.com:80/products/magnetic-material-handling/automation/pick-n-place-d-series/, May 12, 2015, (4 pages).

(56) References Cited

OTHER PUBLICATIONS

"RPL 11 ERIEZ Lifting Magnet 1,100 lb Hoist or Crane," eBay, ebay.com, seller: industrial_supplies_warehouse, ebay Item No. 263279261219, accessed: Oct. 2017. https://www.ebay.com/itm/RPL-11-ERIEZ-Lifting-Magnet-1-100-lb-Hoist-or-Crane-/263279261219.

Amara et al., "Overload Capability of Linear Flux Switching Permanent Magnet Machines", Applied Mechanics and Materials, vol. 416-417, No. 1, Sep. 2013, pp. 345-352.

Ara Nerses Knaian: "Electropermanent Magnetic Connectors and Actuators: Devices and Their Application in Programmable Matter", PhD Thesis., Massachusetts Institute of Technology, 2010, pp. 1-206.

China National Intellectual Property Administration; Chinese Office Action and Search Report; Chinese Application No. 2019800273029; Aug. 18, 2022; 20 pages.

China National Intellectual Property Administration; Chinese Search Report; Chinese Application No. 2019800273029; Jan. 25, 2022; 3 pages.

European Patent Office; International Search Report and Written Opinion; International Application No. PCT/US2024/055926; 23 pages; dated Apr. 17, 2025.

Extended European Search Report for European Application No. 18792036.8, dated Dec. 8, 2020, 8 pages.

International Preliminary Report on Patentability received for PCT Patent Application No. PCT/US2018/029786, mailed on Nov. 7, 2019, 10 pages.

International Preliminary Report on Patentability received for PCT Patent Application No. PCT/US2018/036734, mailed on Dec. 19, 2019, 7 pages.

International Preliminary Report on Patentability received for PCT Patent Application No. PCT/US2019/019179, mailed on Sep. 3, 2020, 9 pages.

International Preliminary Report on Patentability received for PCT Patent Application No. PCT/US2019/027267, mailed on Nov. 5, 2020, 11 pages.

International Search Report and Written Opinion of the International Searching Authority, Australian Patent Office, PCT/US2018/029786 to Magswitch Technology Worldwide PTY Ltd. et al., Aug. 21, 2018, 17 pages.

International Search Report and Written Opinion received for PCT Patent Application No. PCT/US2018/036734, mailed on Sep. 4, 2018, 10 pages.

International Search Report and Written Opinion received for PCT Patent Application No. PCT/US2019/019179, mailed on Jun. 24, 2019, 14 pages.

International Search Report and Written Opinion received for PCT Patent Application No. PCT/US2019/027267, mailed on Jul. 17, 2019, 27 pages.

Japanese Patent Office; Japanese Office Action; Japanese Application No. 2020-508977; dated Jun. 29, 2022; 4 pages.

Korean Intellectual Property Office; Korean Office Action; Korean Application No. 10-2019-7034982; dated May 27, 2022; 17 pages.

Lu et al., "Belt type wall climbing robot magnetic adsorption Magnetic field and motion analysis of units", Robots, vol. 2, No. 1, Mar. 28, 2006, pp. 125-129.

Material Handling Catalogue, DocMagnet, undated, (8 pages).

Official Action for Canadian Application No. 3,061,331, dated Feb. 9, 2021, 3 pages.

Search Report and First Office Action for Chinese Application No. 2018800408500, dated Apr. 6, 2021, 16 pages.

Search Report in EP19757223.3, Oct. 5, 2021, (9 pages).

The Wayback Machine—https://web.archive.org/web/20170405061444/https7/en.wikipedia.org/wiki/Electropermanent_magnet, (dated Apr. 5, 2017; retrieved Oct. 11, 2021), (9 pages).

U.S. Appl. No. 62/248,804, filed Oct. 30, 2015, (64 pages).

Japanese Patent Office; Decision for Rejection and translation; Japanese Application No. 2023-575880; 17 pages; dated Oct. 7, 2025.

* cited by examiner

ADJUSTABLE END-OF-ARM TOOL OR FIXTURE

RELATED APPLICATION

This application is a national stage application of PCT International Application No. PCT/US2022/033154, filed Jun. 11, 2022, titled ADJUSTABLE END-OF-ARM TOOL OR FIXTURE, which claims the benefit of U.S. Provisional Application No. 63/209,878, filed Jun. 11, 2021, titled ADJUSTABLE END-OF-ARM TOOL OR FIXTURE, the entire disclosures of which are expressly incorporated by reference herein.

BACKGROUND

An end-of-arm tool may be used to manipulate an object or a fixture may be used to support an object. However, such devices and fixtures are typically designed for a specific object, such that manipulating or supporting different objects entails substituting an end-of-arm tool or fixture with another specialized device or fixture. Such specialization may introduce manufacturing delays (e.g., as a result of the time required to switch devices and fixtures), lead to additional complexity (e.g., to plan and program changes), and require additional space (e.g., to store multiple devices and use multiple fixtures).

It is with respect to these and other general considerations that embodiments have been described. Also, although relatively specific problems have been discussed, it should be understood that the embodiments should not be limited to solving the specific problems identified in the background.

SUMMARY

In an exemplary embodiment of the present disclosure, an adjustable end-of-arm tool for a robot is provided. The adjustable end-of-arm tool comprising a base adapted to be coupled to the robot; a first adjustable assembly coupled to the base; and a second adjustable assembly coupled to the base. The first adjustable assembly comprising: a first plurality of links; a first plurality of couplers coupling the plurality of links and the base, the first plurality of couplers providing at least two degrees of the freedom; and a first tool coupled to the base through the first plurality of links and the first plurality of couplers, the first tool including a first interface which is positionable relative to the base in multiple positions based on the first plurality of links and the first plurality of couplers. The second adjustable assembly comprising: a second plurality of links; a second plurality of couplers coupling the plurality of links and the base, the first plurality of couplers providing at least two degrees of the freedom; and a second tool coupled to base through the second plurality of links and the second plurality of couplers, the second tool including a second interface which is positionable relative to the base in multiple positions based on the second plurality of links and the second plurality of couplers.

In another exemplary embodiment of the present disclosure, an adjustable fixture to receive an object is provided. The adjustable fixture comprising: a base; a first adjustable assembly coupled to the base; and a second adjustable assembly coupled to the base. The first adjustable assembly comprising: a first plurality of links; a first plurality of couplers coupling the plurality of links and the base, the first plurality of couplers providing at least two degrees of the freedom; and a first tool coupled to the base through the first plurality of links and the first plurality of couplers. The first tool including a first interface extending above the base. The first interface being positionable relative to the base in multiple positions based on the first plurality of links and the first plurality of couplers. The second adjustable assembly comprising: a second plurality of links; a second plurality of couplers coupling the plurality of links and the base, the first plurality of couplers providing at least two degrees of the freedom; and a second tool coupled to base through the second plurality of links and the second plurality of couplers. The second tool including a second interface extending above the base. The second interface being positionable relative to the base in multiple positions based on the second plurality of links and the second plurality of couplers.

In a further exemplary embodiment of the present disclosure, a method for controlling an adjustable assembly of an EOAT for a robot is provided. The method comprising: identifying a first configuration associated with a first object; configuring the adjustable assembly according to the first configuration wherein an interface of the adjustable assembly has a first position relative to a base of the adjustable assembly; engaging a tool of the adjustable assembly, thereby causing the adjustable assembly to grip the first object; disengaging the tool of the adjustable assembly; identifying a second configuration associated with a second object; configuring the adjustable assembly according to the second configuration wherein an interface of the adjustable assembly has a second position relative to a base of the adjustable assembly, the second position being different than the first position; engaging the tool of the adjustable assembly, thereby causing the adjustable assembly to grip the second object; and disengaging the tool of the adjustable assembly.

In still another exemplary embodiment of the present disclosure, an adjustable end-of-arm tool for a robot is provided. The adjustable end-of-arm tool comprising: a base adapted to be coupled to the robot; a first adjustable assembly coupled to the base, and a second adjustable assembly coupled to the base. The first adjustable assembly comprising: a first plurality of links; a first plurality of couplers coupling the plurality of links and the base, the first plurality of couplers providing at least two degrees of the freedom; and a first tool coupled to the base through the first plurality of links and the first plurality of couplers. The first tool including a first interface which is positionable relative to the base in multiple positions based on the first plurality of links and the first plurality of couplers. The second adjustable assembly comprising: a second plurality of links; a second plurality of couplers coupling the plurality of links and the base, the first plurality of couplers providing at least two degrees of the freedom; and a second tool coupled to base through the second plurality of links and the second plurality of couplers. The second tool including a second interface which is positionable relative to the base in multiple positions based on the second plurality of links and the second plurality of couplers.

In an example thereof, at least one of the first tool and the second tool is a magnetic gripper.

In another example thereof, the base has a longitudinal mid-plane. The first adjustable assembly being positioned on a first side of the longitudinal mid-plane and the second adjustable assembly being positioned on a second side of the longitudinal mid-plane, the second side being opposite the first side. In a variation thereof, the base includes a linear rail defining a first axis. In another variation thereof, the first plurality of couplers enables linear movement along the first axis, enables linear movement along a second axis perpendicular to the first axis, enables linear movement along a third axis perpendicular to both the first axis and the second axis. In a further variation thereof, the first plurality of links includes a first linear rail parallel to the second axis and slidably coupled to the linear rail; and a second linear rail parallel to the third axis and slidably coupled to the first linear rail.

In a further example thereof, the first plurality of couplers enables rotation about at least one of the first axis, the second axis, and the third axis. In a variation thereof, the first plurality of couplers enables rotation about at least two of the first axis, the second axis, and the third axis. In a further variation thereof, the first plurality of couplers enables rotation about each of the first axis, the second axis, and the third axis. In still a further variation thereof, the first plurality of couplers enables rotation about each of the first axis, the second axis, and the third axis and the first axis, the second axis, and the third axis intersect at a common point.

In still a further example thereof, the first tool and the second tool are each a single-sided tool. In a variation thereof, the single-sided tool is one of: a magnetic gripper; a suction gripper; a pin clamp; or a locator.

In yet still a further example thereof, the first tool and the second tool are each a double-sided tool. In a variation thereof, the double-sided tool is one of: a power clamp; a parallel clamp; a swing unit; a multiple finger gripping device; or a mylar gripping device.

In yet another example thereof, the adjustable end-of-arm tool further comprising: a third adjustable assembly coupled to the base. The third adjustable assembly comprising: a third plurality of links; a third plurality of couplers coupling the third plurality of links and the base, the third plurality of couplers providing at least two degrees of the freedom; and a third tool coupled to the base through the third plurality of links and the third plurality of couplers. In a variation thereof, the base has a longitudinal mid-plane. The first adjustable assembly and the third adjustable assembly being positioned on a first side of the longitudinal mid-plane and the second adjustable assembly being positioned on a second side of the longitudinal mid-plane, the second side being opposite the first side. In a further variation thereof, the first plurality of links and the first plurality of couplers provides six degrees of freedom for the positioning the first tool relative to the base, the second plurality of links and the second plurality of couplers provides six degrees of freedom for the positioning the second tool relative to the base, and the third plurality of links and the third plurality of couplers provides six degrees of freedom for the positioning the third tool relative to the base. In still a further variation thereof, each of the first adjustable assembly, the second adjustable assembly, and the third adjustable assembly are independently coupled to the base.

In yet still another example thereof, the first plurality of links and the first plurality of couplers provides six degrees of freedom for the positioning the first tool relative to the base and the second plurality of links and the second plurality of couplers provides six degrees of freedom for the positioning the second tool relative to the base. In a variation thereof, each of the first adjustable assembly and the second adjustable assembly are independently coupled to the base.

In yet a further still example thereof, the adjustable end-of-arm tool further comprises a controller configured to: identify a first configuration associated with a first object; and configure the first adjustable assembly and the second adjustable assembly according to the first configuration to position the first interface of first tool in a first position relative to the base and to position the second interface of the second tool in a second position relative to the base. In a variation thereof, the controller is further configured to: identify a second configuration associated with a second object, wherein the second configuration is different than the first configuration; and configure the first adjustable assembly and the second adjustable assembly according to the second configuration to position the first interface of first tool in a third position relative to the base and to position the second interface of the second tool in a fourth position relative to the base.

In a further yet exemplary embodiment of the present disclosure, an adjustable fixture to receive an object is provided. The adjustable fixture comprising: a base; a first adjustable assembly coupled to the base, and a second adjustable assembly coupled to the base. The first adjustable assembly comprising: a first plurality of links; a first plurality of couplers coupling the first plurality of links and the base, the first plurality of couplers providing at least two degrees of the freedom; and a first tool coupled to the base through the first plurality of links and the first plurality of couplers. The first tool including a first interface extending above the base. The first interface being positionable relative to the base in multiple positions based on the first plurality of links and the first plurality of couplers. The second adjustable assembly comprising: a second plurality of links; a second plurality of couplers coupling the second plurality of links and the base, the second plurality of couplers providing at least two degrees of the freedom; and a second tool coupled to base through the second plurality of links and the second plurality of couplers. The second tool including a second interface extending above the base. The second interface being positionable relative to the base in multiple positions based on the second plurality of links and the second plurality of couplers.

In an example thereof, the first tool and the second tool are each a single-sided tool. In a variation thereof, the single-sided tool is one of: a magnetic gripper; a suction gripper; a pin clamp; or a locator.

In another example thereof, the first tool and the second tool are each a double-sided tool.

In a further example thereof, the adjustable fixture further comprises: a controller configured to: identify a first configuration associated with a first object; and configure the first adjustable assembly and the second adjustable assembly according to the first configuration to position the first interface of first tool in a first position relative to the base and to position the second interface of the second tool in a second position relative to the base. In a variation thereof, the first configuration associated with the first object is identified according to a sequence comprising the first object and a second object; and the controller is further configured to: identify a second configuration associated with the second object according to the sequence; and configure the first adjustable assembly and the second adjustable assembly according to the second configuration to position the first interface of first tool in a third position relative to the base and to position the second interface of the second tool in a fourth position relative to the base.

In yet another example thereof, the first plurality of links and the first plurality of couplers provides six degrees of freedom for the positioning the first tool relative to the base and the second plurality of links and the second plurality of couplers provides six degrees of freedom for the positioning the second tool relative to the base. In a variation thereof, each of the first adjustable assembly and the second adjustable assembly are independently coupled to the base.

In still a further variation thereof, the first plurality of couplers enables rotation about each of a first axis, a second axis perpendicular to the first axis, and a third axis perpendicular to the first axis and the second axis and the first axis, the second axis, and the third axis intersect at a common point.

In yet another exemplary embodiment of the present disclosure, a method for controlling an adjustable assembly of an EOAT for a robot is provided. The method comprising: identifying a first configuration associated with a first object; configuring the adjustable assembly according to the first configuration wherein an interface of the adjustable assembly has a first position relative to a base of the adjustable assembly; engaging a tool of the adjustable assembly, thereby causing the adjustable assembly to grip the first object; disengaging the tool of the adjustable assembly; identifying a second configuration associated with a second object; configuring the adjustable assembly according to the second configuration wherein an interface of the adjustable assembly has a second position relative to a base of the adjustable assembly, the second position being different than the first position; engaging the tool of the adjustable assembly, thereby causing the adjustable assembly to grip the second object; and disengaging the tool of the adjustable assembly.

In an example thereof, the first configuration associated with the first object is identified according to a stored sequence comprising the first object and the second object; and the second configuration associated with the second object is identified according to the stored sequence.

In another example thereof, the first configuration associated with the first object is identified in response to detecting the first object using computer vision; and the second configuration associated with the second object is identified in response to detecting the second object using computer vision.

In a further example thereof, configuring the adjustable assembly according to the first configuration comprises: detecting the first object using computer vision; and dynamically configuring the adjustable assembly based on the detected first object.

In yet still another example thereof, configuring the adjustable assembly according to the first configuration comprises: identifying a location of the first object using computer vision; and configuring the interface of the adjustable assembly according to the identified location.

In still a further exemplary embodiment of the present disclosure, a method for controlling an adjustable assembly of an EOAT for a robot is provided. The adjustable assembly includes a base, a plurality of tools including a first tool having a first interface, a second tool having a second interface, and a third tool having a third interface. The first interface of the first tool being moveable relative to the base in six degrees of freedom. The second interface of the second tool being moveable relative to the base in six degrees of freedom. The third interface of the third tool being moveable relative to the base in six degrees of freedom. The method comprising: identifying a first configuration associated with a first object; configuring the adjustable assembly according to the first configuration wherein the first interface of the first tool of the adjustable assembly has a first position relative to the base, the second interface of the second tool of the adjustable assembly has a second position relative to the base, and the third interface of the third tool of the adjustable assembly has a third position relative to the base; engaging the plurality of tools of the adjustable assembly, thereby causing the adjustable assembly to grip the first object; disengaging the plurality of tool of the adjustable assembly; identifying a second configuration associated with a second object; configuring the adjustable assembly according to the second configuration wherein at least one of the first interface of the first tool, the second interface of the second tool, and the third interface of the third tool is moved relative to the first configuration; engaging the plurality of tools of the adjustable assembly, thereby causing the adjustable assembly to grip the second object; and disengaging the plurality of tools of the adjustable assembly.

In an example thereof, the first configuration associated with the first object is identified according to a stored sequence comprising the first object and the second object; and the second configuration associated with the second object is identified according to the stored sequence.

In another example thereof, the first configuration associated with the first object is identified in response to detecting the first object using computer vision; and the second configuration associated with the second object is identified in response to detecting the second object using computer vision.

In a further example thereof, configuring the adjustable assembly according to the first configuration comprises: detecting the first object using computer vision; and dynamically configuring the adjustable assembly based on the detected first object.

In still another example thereof, configuring the adjustable assembly according to the first configuration comprises: identifying a location of the first object using computer vision; and configuring the interface of the adjustable assembly according to the identified location.

In still another exemplary embodiment of the present disclosure, an adjustable end-of-arm tool for a robot is provided. The adjustable end-of-arm tool comprising: a base adapted to be coupled to the robot, a first adjustable assembly coupled to the base, and a second adjustable assembly coupled to the base. The base including a linear rail defining a first axis. The first adjustable assembly comprising: a first plurality of links; a first plurality of couplers coupling the plurality of links and the base, the first plurality of couplers enables linear movement along the first axis, enables linear movement along a second axis perpendicular to the first axis, enables linear movement along a third axis perpendicular to both the first axis and the second axis, and enables rotation about at least two of a fourth axis, a fifth axis, and a sixth axis; and a first tool coupled to the base through the first plurality of links and the first plurality of couplers. The first tool including a first interface which is positionable relative to the base in multiple positions based on the first plurality of links and the first plurality of couplers. The second adjustable assembly comprising: a second plurality of links; a second plurality of couplers coupling the plurality of links and the base, the second plurality of couplers providing at least two degrees of the freedom; and a second tool coupled to base through the second plurality of links and the second plurality of couplers. The second tool including a second interface which is positionable relative to the base in multiple positions based on the second plurality of links and the second plurality of couplers.

In an example thereof, the first plurality of couplers enables rotation about each of the fourth axis, the fifth axis, and the sixth axis. In a variation thereof, the first plurality of couplers enables rotation about each of the fourth axis, the fifth axis, and the sixth axis and the fourth axis, the fifth axis, and the sixth axis intersect at a common point.

In another example thereof, the fourth axis is the first axis, the fifth axis is the second axis, and the sixth axis is the third axis.

In still another example thereof, each of the first adjustable assembly and the second adjustable assembly are independently coupled to the base. In a variation thereof, the adjustable end-of-arm tool further comprises a third adjustable assembly coupled to the base. The third adjustable assembly comprising: a third plurality of links; a third plurality of couplers coupling the third plurality of links and the base, the third plurality of couplers providing at least two degrees of the freedom; and a third tool coupled to the base through the third plurality of links and the third plurality of couplers. In another variation thereof, the base has a longitudinal mid-plane, the first adjustable assembly and the third adjustable assembly being positioned on a first side of the longitudinal mid-plane and the second adjustable assembly being positioned on a second side of the longitudinal mid-plane, the second side being opposite the first side. In a further variation thereof, each of the first adjustable assembly, the second adjustable assembly, and the third adjustable assembly are independently coupled to the base.

In yet still another exemplary embodiment of the present disclosure, an adjustable end-of-arm tool for a robot is provided. The adjustable end-of-arm tool comprising: a base adapted to be coupled to the robot; a first adjustable assembly coupled to the base, and a second adjustable assembly coupled to the base. The first adjustable assembly comprising: a first linear adjustment subassembly coupled to the base, the first linear adjustment subassembly provides at least two degrees of linear motion relative to the base; a first rotational adjustment subassembly coupled to the base through the first linear subassembly, the first rotational adjustment subassembly provides at least two degrees of rotational motion relative to the base; and a first tool coupled to the base through the first rotational subassembly and the first linear subassembly, the first tool including a first interface which is positionable relative to the base in multiple positions based on the first linear adjustment subassembly and the first rotational adjustment subassembly. The second adjustable assembly comprising: a second linear adjustment subassembly coupled to the base; a second rotational adjustment subassembly coupled to the base through the second linear subassembly; and a second tool coupled to the base through the second rotational subassembly and the second linear subassembly, the second tool including a second interface which is positionable relative to the base in multiple positions based on the second linear adjustment subassembly and the second rotational adjustment subassembly.

In an example thereof, the first rotational adjustment subassembly provides at least three degrees of rotational motion relative to the base.

In another example thereof, the base includes a linear rail defining a first axis, the first linear adjustment subassembly includes a first plurality of links and a first plurality of couplers coupling the plurality of links and the base, the first plurality of couplers enables linear movement along the first axis, enables linear movement along a second axis perpendicular to the first axis, enables linear movement along a third axis perpendicular to both the first axis and the second axis. In a variation thereof, the first rotational adjustment subassembly provides at least three degrees of rotational motion relative to the linear adjustment subassembly about a fourth axis, a fifth axis, and a sixth axis. In another variation thereof, the fourth axis is the first axis, the fifth axis is the second axis, and the sixth axis is the third axis. In yet another variation thereof, the fourth axis, the fifth axis, and the sixth axis intersect at a common point.

In a further example thereof, the first tool and the second tool are each a single-sided tool. In a variation thereof, the single-sided tool is one of: a magnetic gripper; a suction gripper; a pin clamp; or a locator.

In yet another example thereof, the first tool and the second tool are each a double-sided tool.

In still another example thereof, the adjustable end-of-arm tool further comprising a controller configured to: identify a first configuration associated with a first object; and configure the first adjustable assembly and the second adjustable assembly according to the first configuration to position the first interface of first tool in a first position relative to the base and to position the second interface of the second tool in a second position relative to the base. In a variation thereof, the first configuration associated with the first object is identified according to a sequence comprising the first object and a second object. The controller is further configured to: identify a second configuration associated with the second object according to the sequence; and configure the first adjustable assembly and the second adjustable assembly according to the second configuration to position the first interface of first tool in a third position relative to the base and to position the second interface of the second tool in a fourth position relative to the base.

In still yet a further example thereof, the adjustable end-of-arm tool further comprising: a third adjustable assembly coupled to the base. The third adjustable assembly comprising: a third linear adjustment subassembly coupled to the base, the third linear adjustment subassembly provides at least two degrees of linear motion relative to the base; a third rotational adjustment subassembly coupled to the base through the third linear subassembly, the third rotational adjustment subassembly provides at least two degrees of rotational motion relative to the base; and a third tool coupled to the base through the third rotational subassembly and the third linear subassembly. The third tool including a third interface which is positionable relative to the base in multiple positions based on the third linear adjustment subassembly and the third rotational adjustment subassembly. In a variation thereof, the base has a longitudinal mid-plane, the first adjustable assembly and the third adjustable assembly being positioned on a first side of the longitudinal mid-plane and the second adjustable assembly being positioned on a second side of the longitudinal mid-plane, the second side being opposite the first side. In another variation thereof, the first plurality of links and the first plurality of couplers provides six degrees of freedom for the positioning the first tool relative to the base, the second plurality of links and the second plurality of couplers provides six degrees of freedom for the positioning the second tool relative to the base, and the third plurality of links and the third plurality of couplers provides six degrees of freedom for the positioning the third tool relative to the base. In still a further variation thereof, each of the first adjustable assembly, the second adjustable assembly, and the third adjustable assembly are independently coupled to the base.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. The following detailed description is therefore not to be taken in a limiting sense, and the scope of the present disclosure is defined by the appended claims and their equivalents.

End-of-arm tools (EOATs) and fixtures may be used to manipulate and support objects, for example as part of a manufacturing process. As an example, an EOAT may be coupled to a robot and be used to hold an object or to move an object to a fixture, at which point the object may be supported by the fixture. Exemplary robots include industrial robots having a plurality of links moveably coupled together to alter a position of an end of the robot in space and hence the position of the EOAT. The couplers between the links of the robot may control the end of the robot in one or more translational axes and one or more rotational axes. In embodiments, the end of the robot is controllable in multiple translational axes and multiple rotational axes. However, EOATs and fixtures are typically designed for specific objects, such that a first set of EOATs and/or fixtures may be used for a first group of objects, while a second set of EOATs and/or fixtures may be used for a second group of objects. Thus, transitioning from manufacturing the first group of objects to manufacturing the second group of objects may entail changing out the first set of EOATs and fixtures with the second set of EOATs and fixtures.

This may introduce additional time to the manufacturing process, as well as added complexity and additional space requirements (e.g., to store multiple sets of EOATs and fixtures). Additionally, such specialized EOATS and fixtures may grip objects from multiple edges and/or sides, such that the size of the EOATs and fixtures may be comparable to or exceed that of the objects for which they are used. More powerful robotic devices may be required to effectively control such large EOATs, resulting in additional energy consumption, added mechanical complexity, and increased space requirements, among other detriments.

Figure 7:
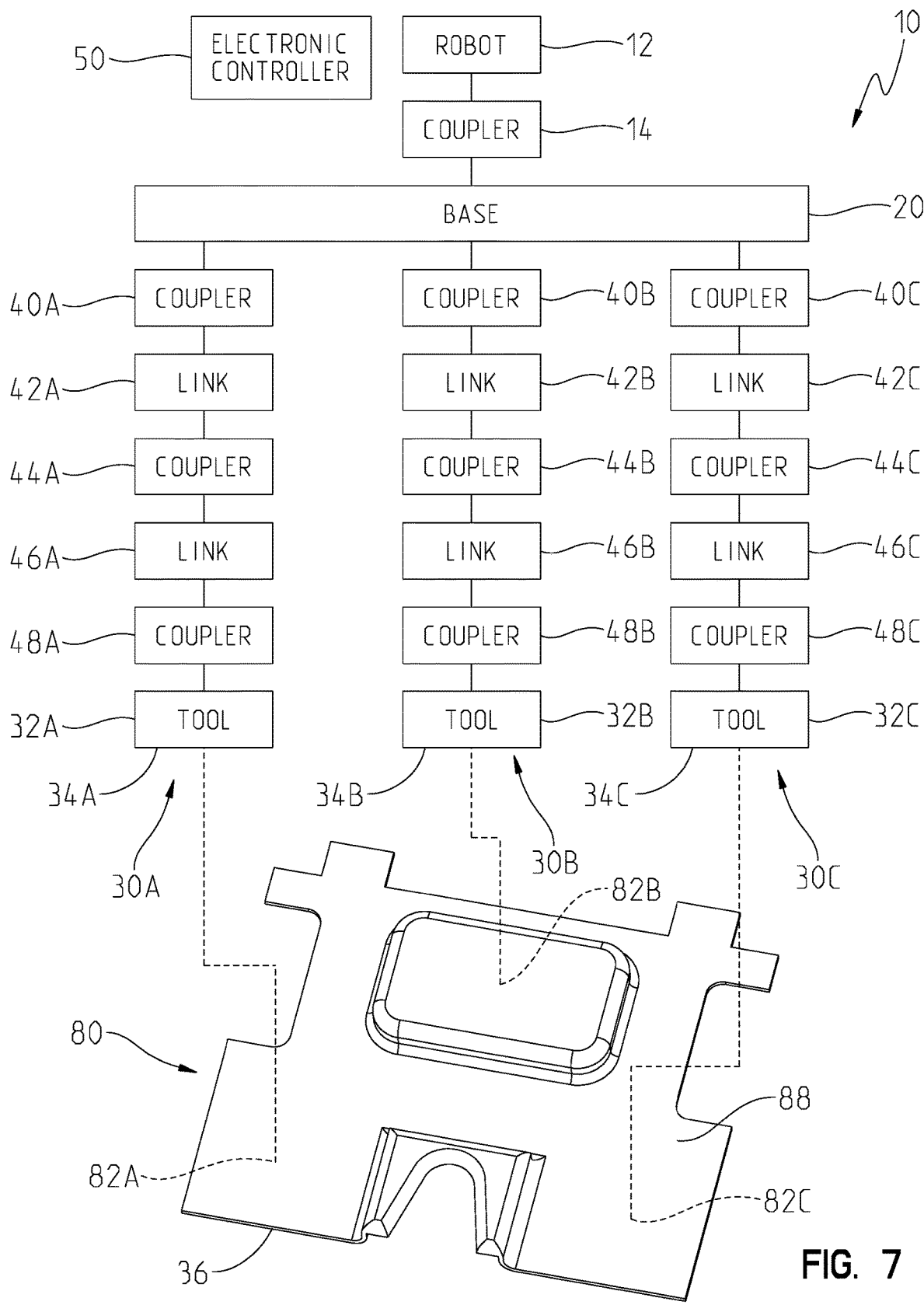
FIG. 7 illustrates a representative view of an exemplary adjustable end-of-arm-tool (EOAT).

Accordingly, aspects of the present disclosure relate to an adjustable EOAT or fixture. As an example, a set of adjustable assemblies may be used as an EOAT or a fixture, where each adjustable assembly may be used to control a tool. Referring to FIG. 7, an exemplary adjustable EOAT 10 is illustrated. EOAT 10 is coupled to an end of a robot 12 through one or more couplers 14. In embodiments, couplers 14 fix EOAT 10 relative to robot 12. In embodiments, one or more couplers 14 permit one or more degrees of movement (translational and/or rotational) of EOAT 10 relative to robot 12. Exemplary couplers include linear translation mounts, rotational mounts, and other suitable mounts.

EOAT 10 includes a base 20 which as illustrated is coupled to robot 12 through coupler 14. Base 20 may include one or more components coupled through in an assembly. Base 20 carries a plurality of adjustable assemblies 30A-C. Although three adjustable assemblies 30A-C are shown, fewer or additional adjustable assemblies may be included as part of EOAT 10.

Each adjustable assembly 30 includes a tool 32 which interfaces with one or more workpieces 80 to be moved by EOAT 10 and robot 12. Exemplary tools include grippers, pin clamps, clamps, and locators. As shown in FIG. 7, tools 32A-C interfaces with workpiece 80, illustratively a stamped metal component, at locations 82A-C. Each of locations 82A-C are inbound of a perimeter envelope 86 of workpiece 80. Thus, a footprint of EOAT 10 defined by interfaces 34A-C of tools 32A-C is completely within perimeter envelope 86 of workpiece 80. Although in the illustrated embodiment, each of interfaces 34A-C of tools 32A-C are within perimeter envelope 86 of workpiece 80, in embodiments, one or more of tools may extend over an outside portion of perimeter envelope 86 and the respective interface of the tool interact with both a front side 88 of workpiece 80 and a rear side (not shown) of workpiece 80. As mentioned herein the positions of interfaces 34A-C of tools 32A-C may be positioned in multiple positions relative to base 20. It should be noted that the positions of interfaces 34A-C relative to base 20 need not be determined rather the positioned relative to base 20 simply provides a reference. In actuality, the interfaces may be positioned based on a coordinate system of the robot, the adjustable assembly itself, or other coordinate systems in the system.

Exemplary locators include pins and other locating features. Exemplary grippers include suction cup grippers and magnetic grippers. Magnetic grippers are also referred to herein as magnetic coupling devices. Suction cup grippers include cups as the respective interface 34 with workpiece 80 and a pneumatic system which selectively applies a vacuum to the cup grippers to hold workpiece 80 relative to EOAT 10. Magnetic grippers are used with ferromagnetic workpieces 80 and generally include pole shoes as the respective interface 34 with workpiece 80 and a magnetic flux source which supplies a magnetic flux at the surface of the pole shoes to create a magnetic circuit through the pole shoes and workpiece. 80. Exemplary magnetic flux sources include electromagnets, electro-permanent magnets, rare earth permanent magnets, other suitable magnets, and combinations thereof. Exemplary magnetic grippers are disclosed in U.S. Pat. Nos. 7,012,495, 8,878,639, 10,903,030; US Published Patent Application Nos. US20180311795 and US20210031317; U.S. Provisional Patent Application No. 63/194,692; and Published PCT Application No. WO2020086791A1, the entire disclosures of which are expressly incorporated by reference herein.

Figure 8:
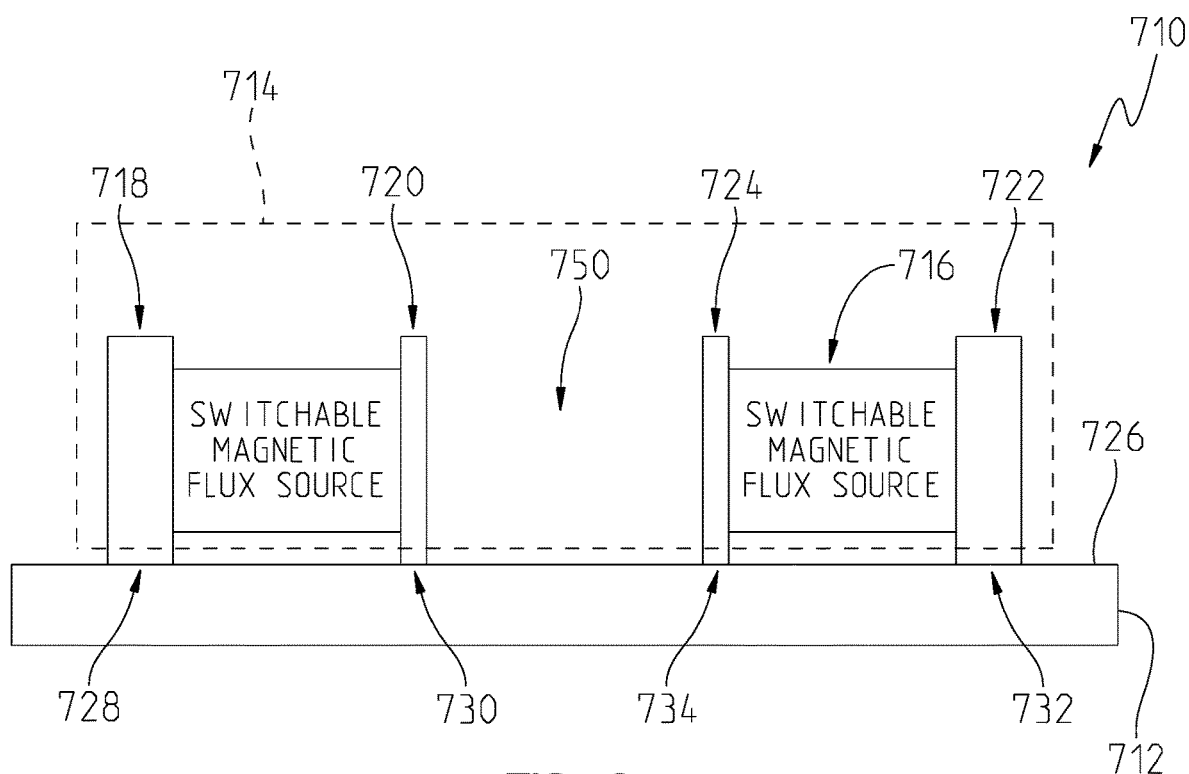
FIG. 8 illustrates a representative view of an exemplary magnetic coupling device having multiple workpiece contact interfaces for each pole of the magnetic coupling device and the magnetic coupling device in an OFF state.

Referring to FIG. 8, an exemplary magnetic coupling device 710 is shown. Magnetic coupling device 710 is configured to magnetically couple a ferromagnetic workpiece 712. Magnetic coupling device 710 includes a housing 714, a switchable magnetic flux source 716, a first north pole portion 718, a second north pole portion 720, a first south pole portion 722, and a second south pole portion 724. First north pole portion 718 includes a workpiece interface 728, second north pole portion 720 includes a workpiece interface 730, first south pole portion 722 includes a workpiece interface 732, and second south pole portion 724 includes a workpiece interface 734, each of which contacts a respective part of ferromagnetic workpiece 712, illustratively a surface 726 of ferromagnetic workpiece 712. Each of workpiece interface 728, workpiece interface 730, workpiece interface 732, and workpiece interface 734 include at least one workpiece engagement surface. Workpiece interface 728, workpiece interface 730, workpiece interface 732, and workpiece interface 734 may each be planar, curved, contoured, have a plurality of spaced apart projections, or any other suitable shape for contacting ferromagnetic workpiece 712. Each of first north pole portion 718, second north pole portion 720, first south pole portion 722, and second south pole portion 724 are made of a ferromagnetic material and may be a part of housing 714 or separate components coupled to housing 714.

Figure 9:
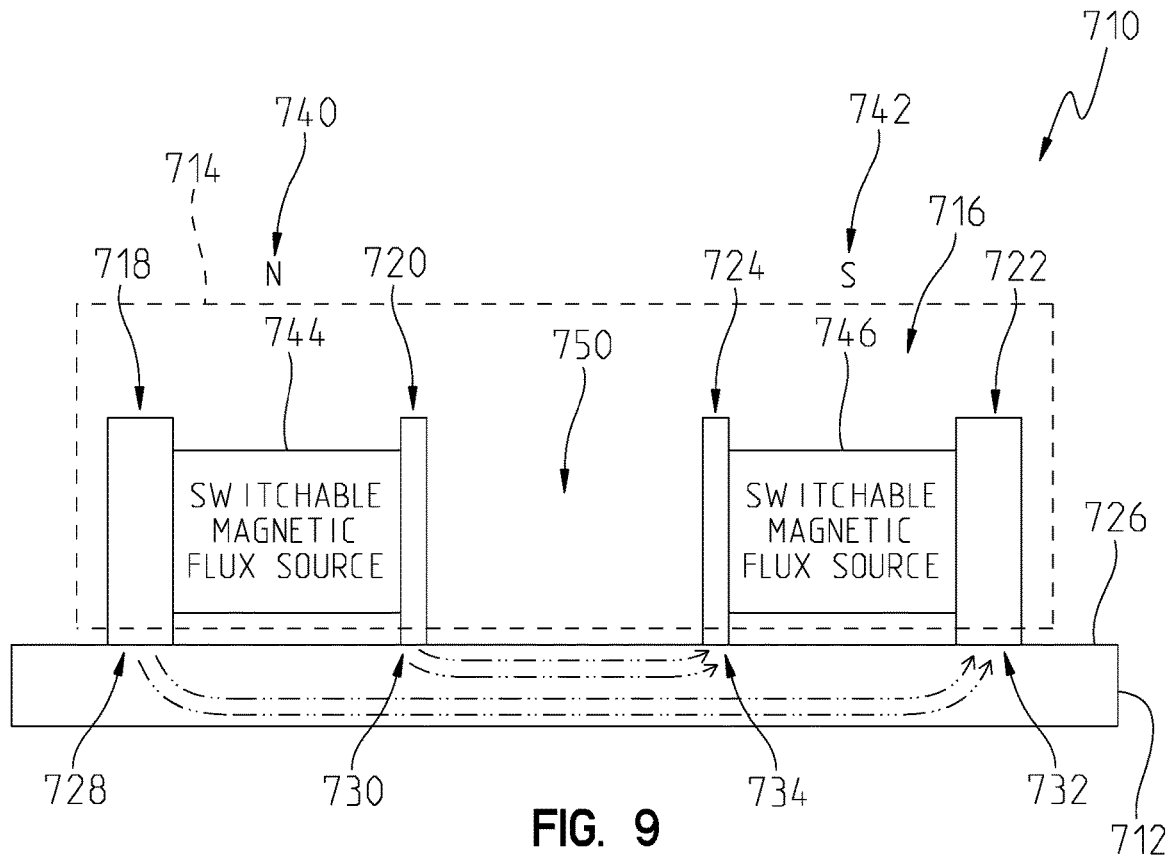
FIG. 9 illustrates the magnetic coupling device of FIG. 8 with the magnetic coupling device in an ON state.

Switchable magnetic flux source 716 of magnetic coupling device 710 is switchable between an OFF state wherein a magnetic circuit is formed within housing 714 and an ON state wherein a magnetic circuit is formed from switchable magnetic flux source 716 through workpiece interface 728 and workpiece interface 730 of magnetic coupling device 710, through ferromagnetic workpiece 712, through workpiece interface 732 and workpiece interface 734 of magnetic coupling device 710, and back to switchable magnetic flux source 716 (as represented by the arrows shown in FIG. 9). In embodiments, switchable magnetic flux source 716 may be placed in at least one partial ON state wherein the strength of the magnetic circuit formed through ferromagnetic workpiece 712 is more than the OFF state and less than the ON state.

Switchable magnetic flux source 716 may include multiple permanent magnets and is configurable to have an overall north pole portion 744 and an overall south pole portion 746. As shown in FIG. 9, overall north pole portion 744 of switchable magnetic flux source 716 is positioned between first north pole portion 718 and second north pole portion 720 and overall south pole portion 746 of switchable magnetic flux source 716 is positioned between first south pole portion 722 and second south pole portion 724. Overall north pole portion 744 of switchable magnetic flux source 716 is magnetically coupled with first north pole portion 718 and second north pole portion 720 resulting in workpiece interface 728 of first north pole portion 718 and workpiece interface 730 of second north pole portion 720 forming an overall north pole 740 of magnetic coupling device 710. Overall south pole portion 746 is magnetically coupled with first south pole portion 722 and second south pole portion 724 resulting in workpiece interface 732 of first south pole portion 722 and workpiece interface 734 of second south pole portion 724 forming an overall south pole 742 of magnetic coupling device 710.

Switchable magnetic flux source 716 may include one or more permanent magnets and is configurable to have an overall north pole portion 744 and an overall south pole portion 746. In embodiments, switchable magnetic flux source 716 includes at least one electro-permanent magnet which is switchable between an ON state (having a north pole and a south pole) and an OFF state (not magnetized relative to external objects). Further, the at least one electro-permanent magnet may be configured to have varying magnetic strengths which allow the device to be configured in a partial ON state having a magnetic strength at workpiece interfaces 728, 730, 732, and 734 less than the ON state and greater than an OFF state. In embodiments, switchable magnetic flux source 716 includes at least one rare earth permanent magnet and at least one electro-permanent magnet, the combination of which is switchable between an ON state having a magnetic strength at workpiece interfaces 728, 730, 732, and 734 and an OFF state wherein a magnetic circuit is formed internally to housing 714. Further, the combination may be configured to have varying magnetic strengths which allow the device to be configured in a partial ON state having a magnetic strength at workpiece interfaces 728, 730, 732, and 734 less than the ON state and greater than an OFF state. In embodiments, switchable magnetic flux source 716 includes a plurality of rare earth permanent magnets, the combination of which is switchable between an ON state having a magnetic strength at workpiece interfaces 728, 730, 732, and 734 and an OFF state wherein a magnetic circuit is formed internally to housing 714. Further, the combination may be configured to have varying magnetic strengths which allow the device to be configured in a partial ON state having a magnetic strength at workpiece interfaces 728, 730, 732, and 734 less than the ON state and greater than an OFF state. In embodiments, switchable magnetic flux source 716 includes at least one rare earth permanent magnet which is moveable relative to the housing 714 to thus be switchable between an ON state having a magnetic strength at workpiece interfaces 728, 730, 732, and 734 and an OFF state wherein a magnetic circuit is formed internally to housing 714.

As shown in FIGS. 8 and 9, a channel 750 is provided between pole portions 720 and 724. Channel 750, as discussed herein, may receive one or more sensors, stationary pins, retractable pins, probes, and/or additional tools.

Figure 10:
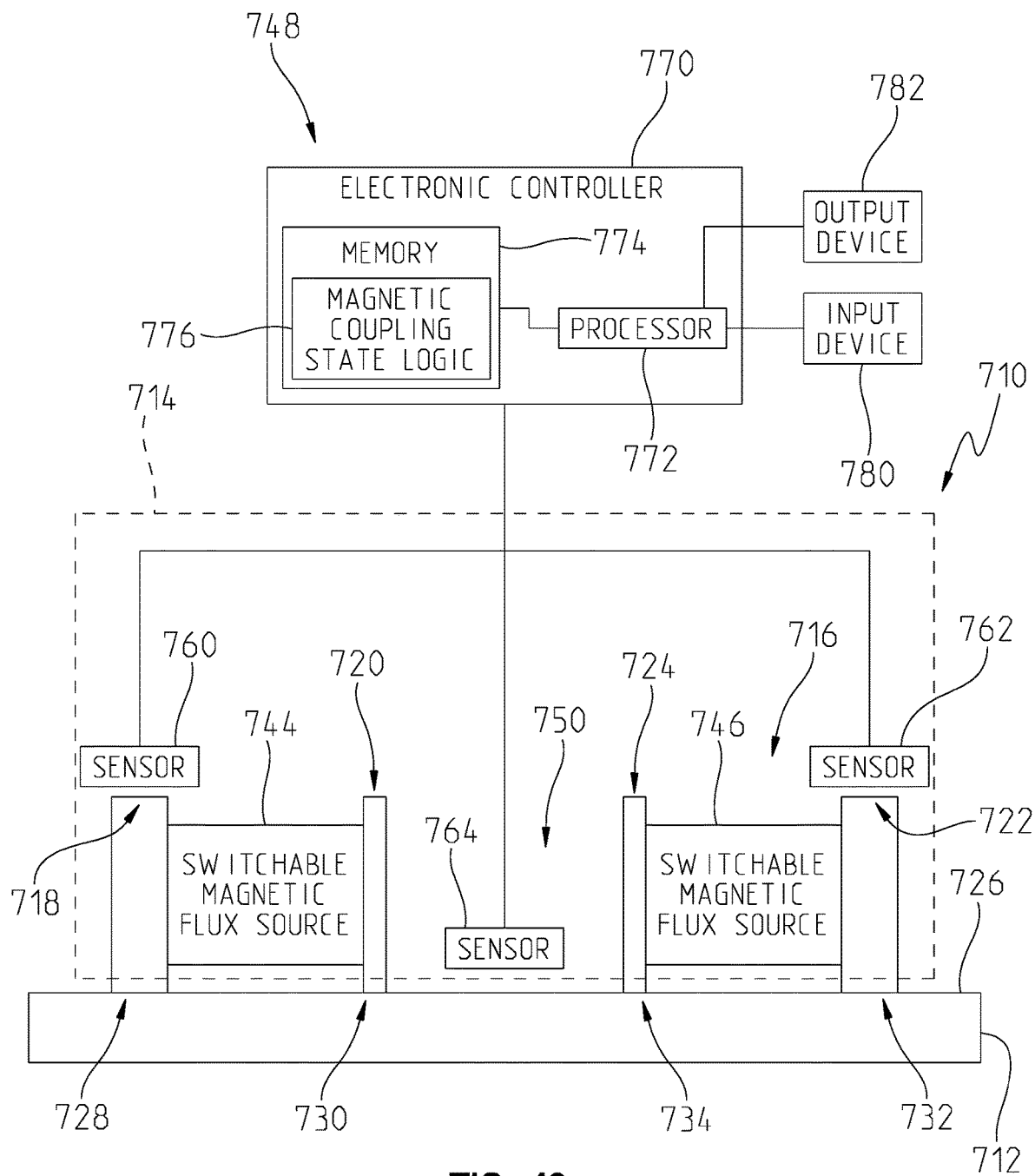
FIG. 10 illustrates the magnetic coupling device of FIG. 8 with a sensing system.

Referring to FIG. 10, in embodiments, magnetic coupling device 710 further includes a monitoring system 748 including one or more sensors which monitor a characteristic of magnetic coupling device 710 and/or a characteristic of a magnetic circuit formed between magnetic coupling device 710 and ferromagnetic workpiece 712. As shown in FIG. 10, a first sensor 760 may be positioned proximate first north pole portion 718, a second sensor 762 may be positioned proximate first south pole portion 722, and a third sensor 764 may be positioned proximate ferromagnetic workpiece 712 in a channel 750 provided between second north pole portion 720 and second south pole portion 724. Each of first sensor 760, second sensor 762, and third sensor 764 may be a magnetic flux sensor. Additional types of sensors include temperature sensors which are used to compensate for temperature dependent drift in the magnetic flux sensors. Additionally, the positions of sensors 760, 762, and 764 are exemplary and one or sensors may be positioned at different locations. In embodiments, sensor 764 may be a proximity sensor. Exemplary proximity sensors include inductive sensors, ultrasound sensors, photonic sensors, and other suitable sensors.

Each of sensors 760, 762, and 64 are operatively coupled to an electronic controller 770. Electronic controller 770 includes at least one processor 772 and associated memory 774. Memory 774 includes magnetic coupling state logic 776, logic control circuit, which monitors the output of sensors 760, 762, 764 to determine one or more characteristics of magnetic coupling device 710 and/or one or more characteristics of a magnetic circuit formed between magnetic coupling device 710 and ferromagnetic workpiece 712. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which electronic controller 770 is not microprocessor-based, but rather is configured to control operation of magnetic coupling device 800 based on one or more sets of hardwired instructions. Further, electronic controller 770 may be contained within a single device or be a plurality of devices networked together or otherwise electrically connected to provide the functionality described herein.

Electronic controller 770 may further receive input through one or more input devices 780. Exemplary input devices include buttons, switches, levers, dials, touch displays, soft keys, and a communication module. Electronic controller 770 may further provide output through one or more output devices 782. Exemplary output devices include visual indicators, audio indicators, and a communication module. Exemplary visual indicators include displays, lights, and other visual systems. Exemplary audio indicators include speakers and other suitable audio systems.

Figure 11:
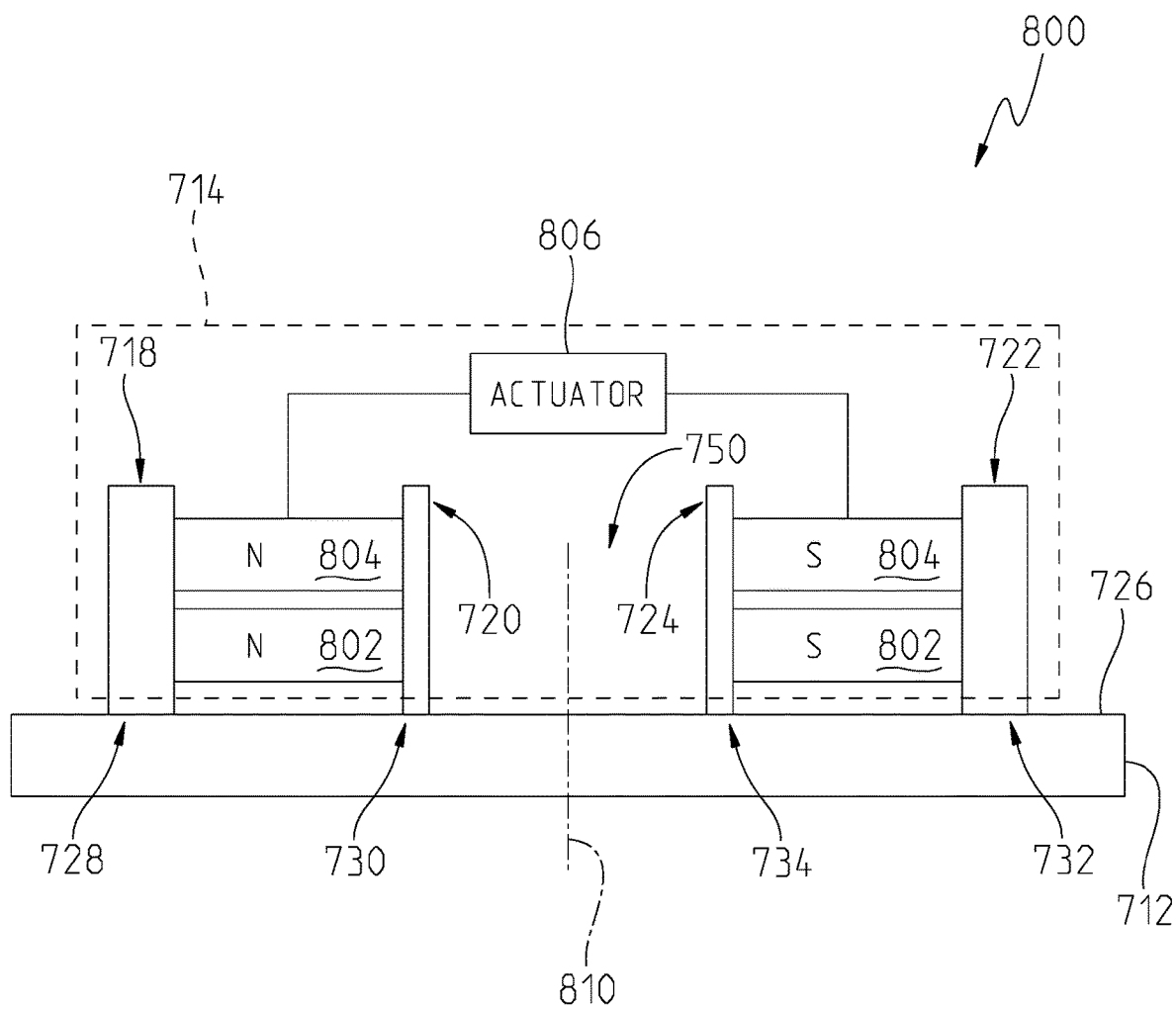
FIG. 11 illustrates a representative view of an exemplary magnetic coupling device having multiple workpiece contact interfaces for each pole of the magnetic coupling device, the magnetic coupling device including a stack of permanent magnets with a first permanent magnet moveable relative to a second permanent magnet with an actuator.

Referring to FIG. 11, each of workpiece interface 730 and workpiece interface 734 are closer to rotational axis 810 than either of first permanent magnet 802 and second permanent magnet 804. Between workpiece interface 730 and workpiece interface 734 is channel 750 which as mentioned herein may receive one or more sensors, stationary pins, retractable pins, retractable pin clamps, cameras, probes, and/or additional tools. Workpiece interface 730 of second north pole portion 720 and workpiece interface 734 of second south pole portion 724 provide an external north pole of magnetic coupling device 800 and an external south pole of magnetic coupling device 800, respectively, of a magnetic circuit formed with rare earth permanent magnets without any of the rare earth permanent magnets forming the magnetic circuit being positioned between second north pole portion 720 and second south pole portion 724. Further, in embodiments, each of first permanent magnet 802 and second permanent magnet 804 surround rotational axis 810 and each of first permanent magnet 802 and second permanent magnet 804 include a respective aperture to form part of channel 750.

Referring to FIG. 11, an exemplary embodiment of magnetic coupling device 710 is shown, illustratively magnetic coupling device 800. Magnetic coupling device 800 includes a switchable magnetic flux source 716 having a first permanent magnet 802 and a second permanent magnet 804. Second permanent magnet 804 is spaced apart from first permanent magnet 802. In embodiments, a spacer (not shown) is positioned between first permanent magnet 802 and second permanent magnet 804. In embodiments, each of first permanent magnet 802 and second permanent magnet 804 are rare earth permanent magnets.

Second permanent magnet 804 is moveable relative to first permanent magnet 802. magnetic coupling device 800 includes an actuator 806 which positions second permanent magnet 804 relative to first permanent magnet 802. Exemplary actuators 806 include manual actuators, hydraulic actuators, pneumatic actuators, mechanical actuators, electrically controlled actuators, and combinations thereof. Referring to FIG. 5, actuator 806 is an electrically controlled actuator and includes a motor (not shown) which is controlled by electronic controller 770 to position second permanent magnet 804 relative to first permanent magnet 802. Exemplary actuators are disclosed in U.S. patent Ser. No. 10/903,030, the entire disclosure of which is expressly incorporated by reference herein.

In embodiments, actuator 806 rotates second permanent magnet 804 relative to first permanent magnet 802 about a rotational axis 810. First permanent magnet 802 is held fixed relative to housing 714. Workpiece interface 728 of first north pole portion 718, workpiece interface 730 of second north pole portion 720, workpiece interface 732 of first south pole portion 722, and workpiece interface 734 of second south pole portion 724 are magnetically coupled to first permanent magnet 802 and second permanent magnet 804. In embodiments, one or both of first permanent magnet 802 and second permanent magnet 804 are comprised of a single rare earth magnet. In embodiments, one or both of first permanent magnet 802 and second permanent magnet 804 are comprised of a multiple rare earth magnets that collectively form the respective first permanent magnet 802 or second permanent magnet 804.

In one position of second permanent magnet 804 relative to first permanent magnet 802, a north pole of second permanent magnet 804 is generally aligned with a north pole of first permanent magnet 802 and a south pole of second permanent magnet 804 is generally aligned with a south pole of first permanent magnet 802, as shown in FIG. 11. This configuration corresponds to magnetic coupling device 800 being in an ON state with workpiece interface 728 of first north pole portion 718 and workpiece interface 730 of second north pole portion 720 corresponding to an external north pole of magnetic coupling device 800 and workpiece interface 732 of first south pole portion 722 and workpiece interface 734 of second south pole portion 724 corresponding to an external south pole of magnetic coupling device 800. In the ON state, when magnetic coupling device 800 is in contact with ferromagnetic workpiece 712, a magnetic circuit is formed to magnetically couple ferromagnetic workpiece 712 to magnetic coupling device 800.

Figure 12:
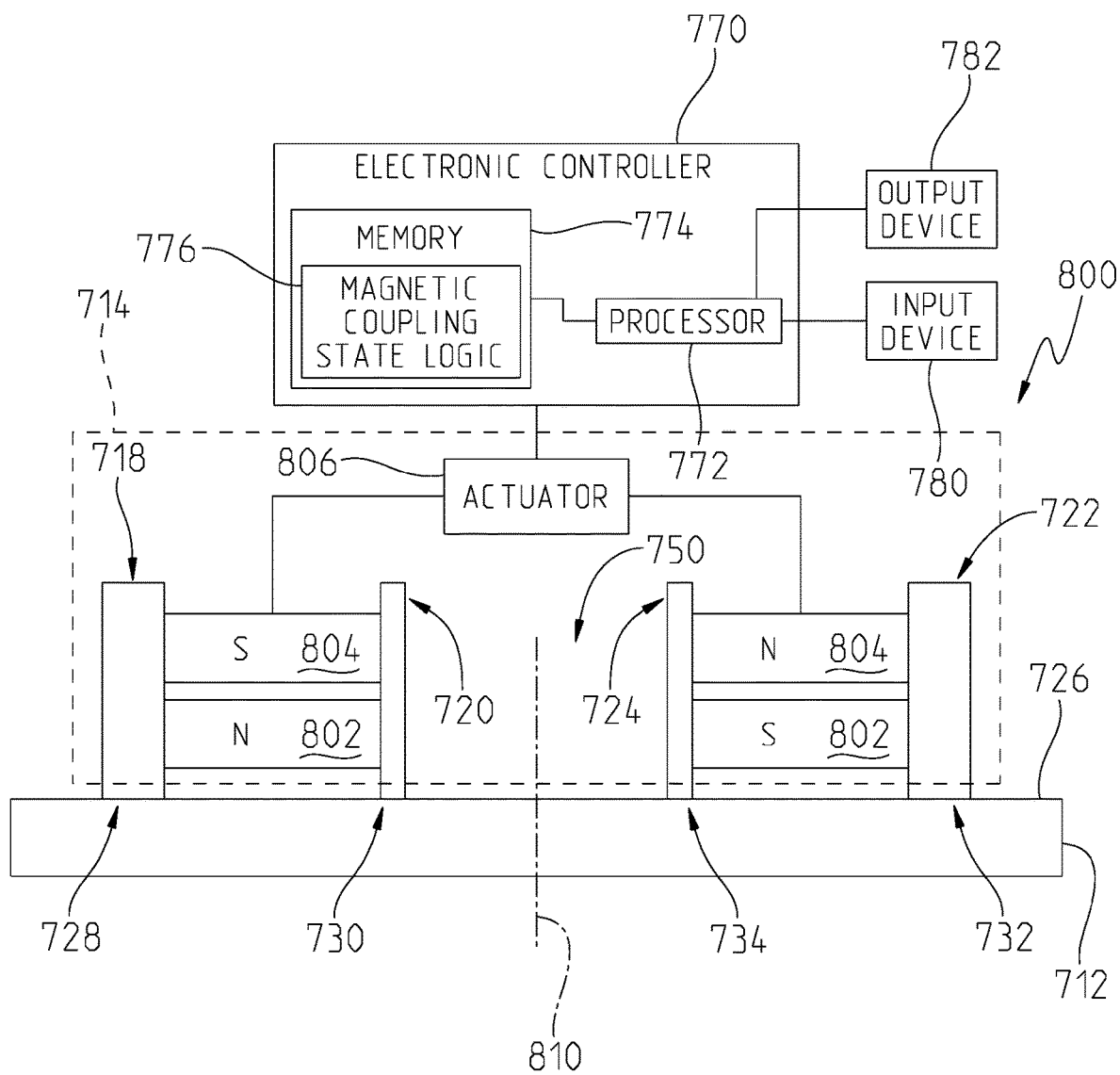
FIG. 12 illustrates the magnetic coupling device of FIG. 11 including an electronic controller operatively coupled to the actuator.

In another position of second permanent magnet 804 relative to first permanent magnet 802, a north pole of second permanent magnet 804 is generally aligned with a south pole of first permanent magnet 802 and a south pole of second permanent magnet 804 is generally aligned with a north pole of first permanent magnet 802, as shown in FIG. 12. This configuration corresponds to magnetic coupling device 800 being in an OFF state and a magnetic circuit is formed generally within housing 714; magnetic coupling device 800 lacks an external north pole at workpiece interface 728 of first north pole portion 718 and workpiece interface 730 of second north pole portion 720 and an external south pole at workpiece interface 732 of first south pole portion 722 and workpiece interface 734 of second south pole portion 724. In the OFF state, ferromagnetic workpiece 712 is not magnetically coupled to magnetic coupling device 800.

Actuator 806 rotates second permanent magnet 804 about rotational axis 810 to move second permanent magnet 804 between the positions shown in FIG. 4 and FIG. 12. In embodiments, actuator 806 is able to position second permanent magnet 804 at rotational positions between those shown in FIGS. 11 and 12. These intermediate rotational positions correspond to partial ON states of magnetic coupling device 800 with workpiece interface 728 of first north pole portion 718 and workpiece interface 730 of second north pole portion 720 corresponding to an external north pole of magnetic coupling device 800 and workpiece interface 732 of first south pole portion 722 and workpiece interface 734 of second south pole portion 724 corresponding to an external south pole of magnetic coupling device 800, but having a lower level of magnetic flux available at each of the external north pole and the external south pole. As such, magnetic coupling device 800 is able to be configured to provide a variable strength magnetic flux level to perform various operations, such as the operations disclosed in U.S. patent Ser. No. 10/903,030, the entire disclosure of which is expressly incorporated by reference herein.

Referring to FIG. 11, each of workpiece interface 730 and workpiece interface 734 are closer to rotational axis 810 than either of first permanent magnet 802 and second permanent magnet 804. Between workpiece interface 730 and workpiece interface 734 is channel 750 which as mentioned herein may receive one or more sensors and/or tools, such as probes. Workpiece interface 730 of second north pole portion 720 and workpiece interface 734 of second south pole portion 724 provide an external north pole of magnetic coupling device 800 and an external south pole of magnetic coupling device 800, respectively, of a magnetic circuit formed with rare earth permanent magnets without any of the rare earth permanent magnets forming the magnetic circuit being positioned between second north pole portion 720 and second south pole portion 724. Further, in embodiments, each of first permanent magnet 802 and second permanent magnet 804 surround rotational axis 810 and each of first permanent magnet 802 and second permanent magnet 804 include a respective aperture to form part of channel 750.

Figure 14:
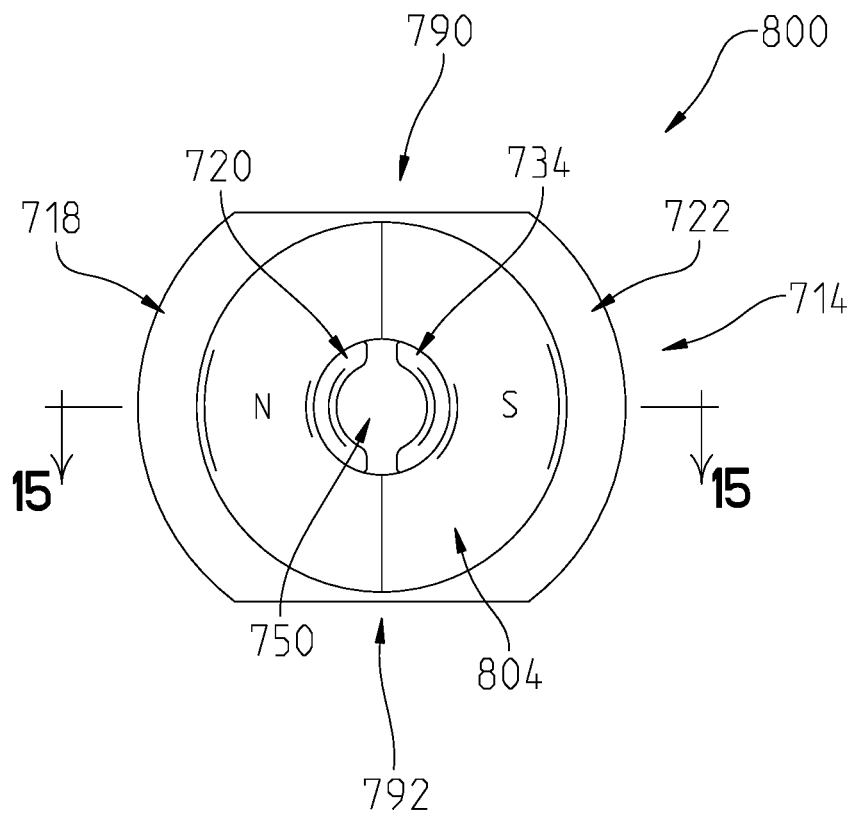
FIG. 14 illustrates a top view of an exemplary magnet and pole piece assembly of the magnetic coupling device of FIG. 11.
Figure 15:
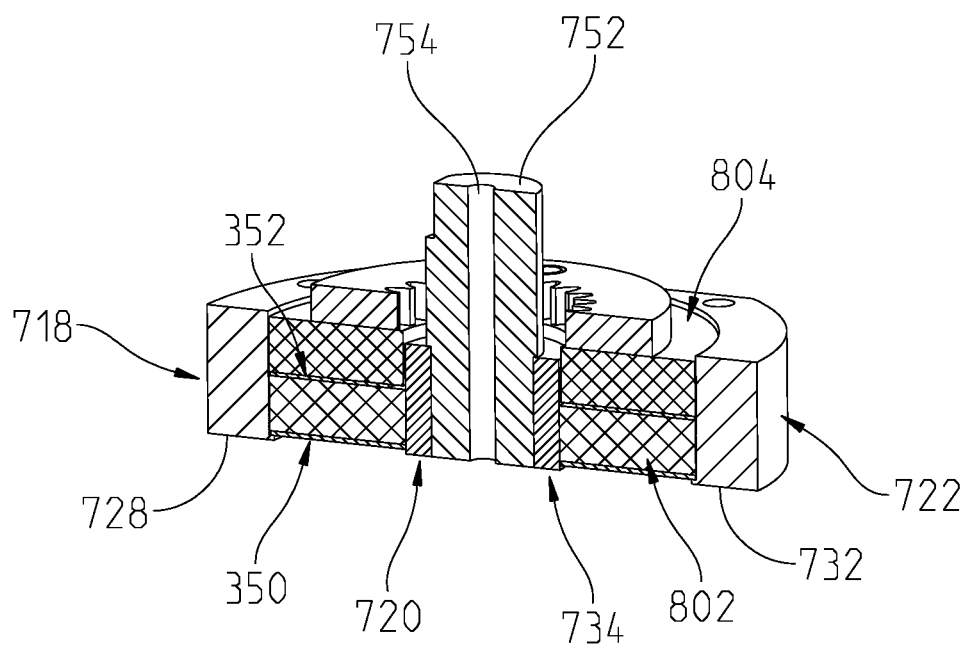
FIG. 15 illustrates a sectional view of another exemplary magnet and pole piece assembly of the magnetic coupling device of FIG. 11.

Referring to FIGS. 14 and 15, an exemplary arrangement for magnetic coupling device 800 is shown. Second north pole portion 720 and workpiece interface 734 are carried by a support 752 (see FIG. 15). Channel 750 is provided as a central opening 754 through support 752.

Referring to FIG. 14, housing 714 is made of a ferromagnetic material. An exemplary ferromagnetic material is steel. Housing 714 is dimensioned such that only thin wall webs 790 and 792 connect first north pole portion 718 and housing 714 which are both thick walled portions of housing 714. By having thin wall webs 790 and thin wall webs 792 being thinner than first north pole portion 718 and first south pole portion 722, the magnetic flux is directed through workpiece interface 728 of first north pole portion 718 and workpiece interface 732 of first south pole portion 722 into ferromagnetic workpiece 712 instead of passing between first north pole portion 718 and first south pole portion 722 through thin wall webs 790 and thin wall webs 792.

Figure 13:
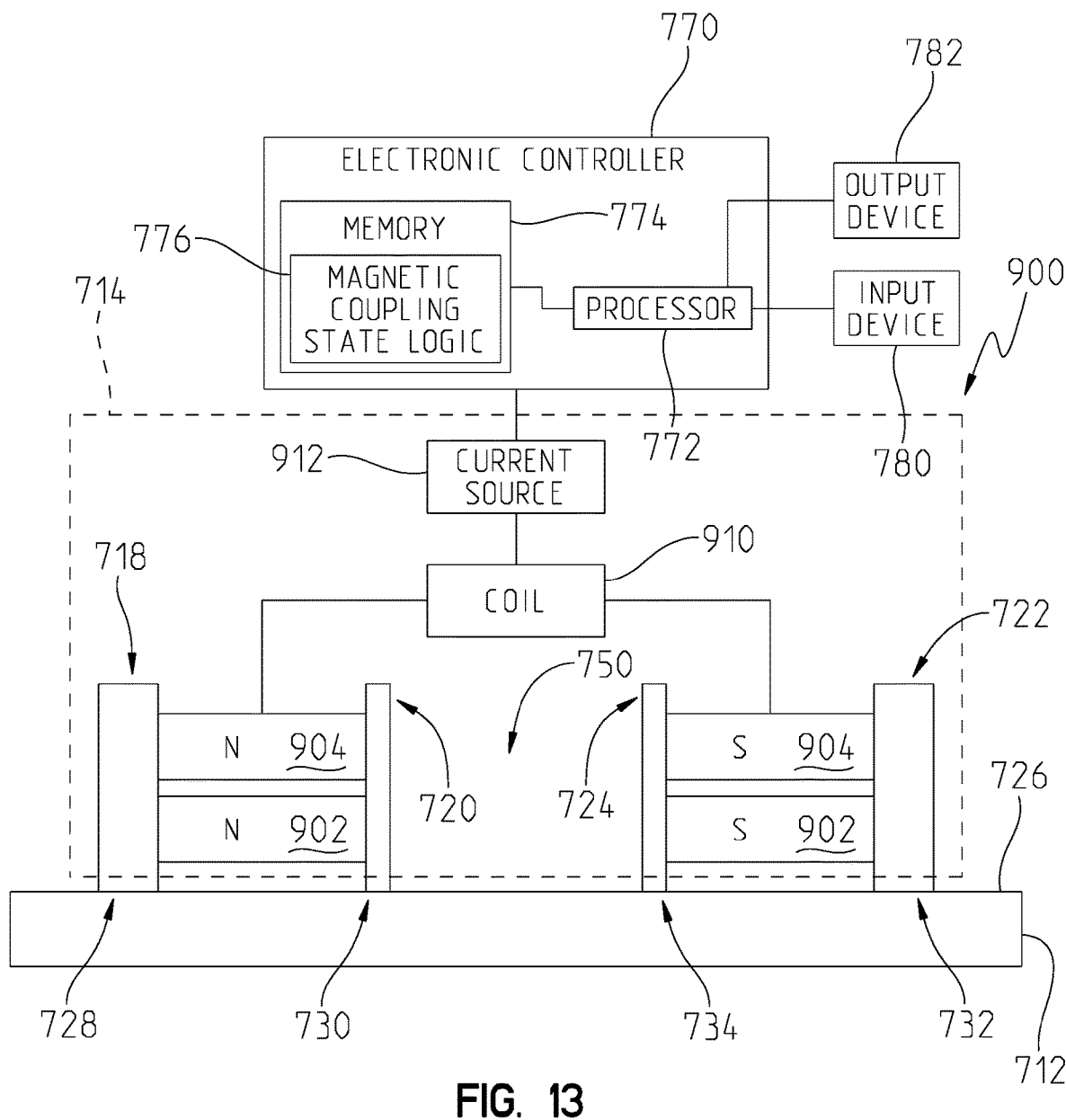
FIG. 13 illustrates a representative view of an exemplary magnetic coupling device having multiple workpiece contact interfaces for each pole of the magnetic coupling device, the magnetic coupling device including a stack of permanent magnets with a first electro-permanent magnet and a second permanent magnet.

Referring to FIG. 13, an exemplary embodiment of magnetic coupling device 710 is shown, illustratively magnetic coupling device 900. Magnetic coupling device 900 includes a switchable magnetic flux source 716 having a first permanent magnet 902 and a second permanent magnet 904. Second permanent magnet 904 is spaced apart from first permanent magnet 902. In embodiments, a spacer (not shown) is positioned between first permanent magnet 902 and second permanent magnet 904 or an air gap is maintained between first permanent magnet 902 and second permanent magnet 904. In embodiments, first permanent magnet 902 is a rare earth permanent magnet and second permanent magnet 904 is an electro-permanent magnet. First permanent magnet 902 and second permanent magnet 904 are held fixed relative to housing 714. Workpiece interface 728 of first north pole portion 718, workpiece interface 730 of second north pole portion 720, workpiece interface 732 of first south pole portion 722, and workpiece interface 734 of second south pole portion 724 are magnetically coupled to first permanent magnet 902 and second permanent magnet 904.

At least a portion of second permanent magnet 904 is surrounded by a coil 910 which is coupled to a current source 912. A direction and strength of a current provided through coil 910 is controlled by electronic controller 770. The current is used to alter the pole positions for second permanent magnet 904. In embodiments, the current may be used to position a north pole of second permanent magnet 904 in general alignment with a north pole of first permanent magnet 902 and a south pole of second permanent magnet 904 is general alignment with a south pole of first permanent magnet 902, as shown in FIG. 13. The current does not need to be persistent to maintain second permanent magnet 904 in this configuration. This configuration corresponds to magnetic coupling device 900 being in an ON state with workpiece interface 728 of first north pole portion 718 and workpiece interface 730 of second north pole portion 720 corresponding to an external north pole of magnetic coupling device 900 and workpiece interface 732 of first south pole portion 722 and workpiece interface 734 of second south pole portion 724 corresponding to an external south pole of magnetic coupling device 900. In the ON state, when magnetic coupling device 900 is in contact with ferromagnetic workpiece 712, a magnetic circuit is formed to magnetically couple ferromagnetic workpiece 712 to magnetic coupling device 900. In embodiments, the magnetic mass of first permanent magnet 902 and second permanent magnet 904 may be different or the same. In embodiments, one or both of first permanent magnet 902 and second permanent magnet 904 are comprised of a permanent magnet. In embodiments, one or both of first permanent magnet 802 and second permanent magnet 804 are comprised of multiple permanent magnets that collectively form the respective first permanent magnet 802 or second permanent magnet 804.

In embodiments, the current may be used to position a north pole of second permanent magnet 904 in general alignment with a south pole of first permanent magnet 902 and a south pole of second permanent magnet 904 in general alignment with a north pole of first permanent magnet 902. This configuration corresponds to magnetic coupling device 900 being in an OFF state and a magnetic circuit is formed generally within housing 714; magnetic coupling device 900 lacks an external north pole at workpiece interface 728 of first north pole portion 718 and workpiece interface 730 of second north pole portion 720 and an external south pole at workpiece interface 732 of first south pole portion 722 and workpiece interface 734 of second south pole portion 724. In the OFF state, ferromagnetic workpiece 712 is not magnetically coupled to magnetic coupling device 800.

In embodiments, the electro permanent magnet of the second permanent magnet 904 may be charged to different levels to provide a variable magnetic strength at the workpiece interfaces 728, 730, 732, 734. Thus, at least one partial ON state may be configured having a magnetic strength at the workpiece interfaces 728, 730, 732, 734 being less than the ON state and greater than the OFF state. Exemplary electro-permanent magnets include AlNiCo electro-permanent magnets.

Referring to FIG. 13, between workpiece interface 730 and workpiece interface 734 is channel 750 which as mentioned herein may receive one or more sensors and/or tools, such as probes. In embodiments, each of first permanent magnet 802 and second permanent magnet 804 surround rotational axis 810 and each of first permanent magnet 802 and second permanent magnet 804 include a respective aperture to form part of channel 750.

Figure 16:
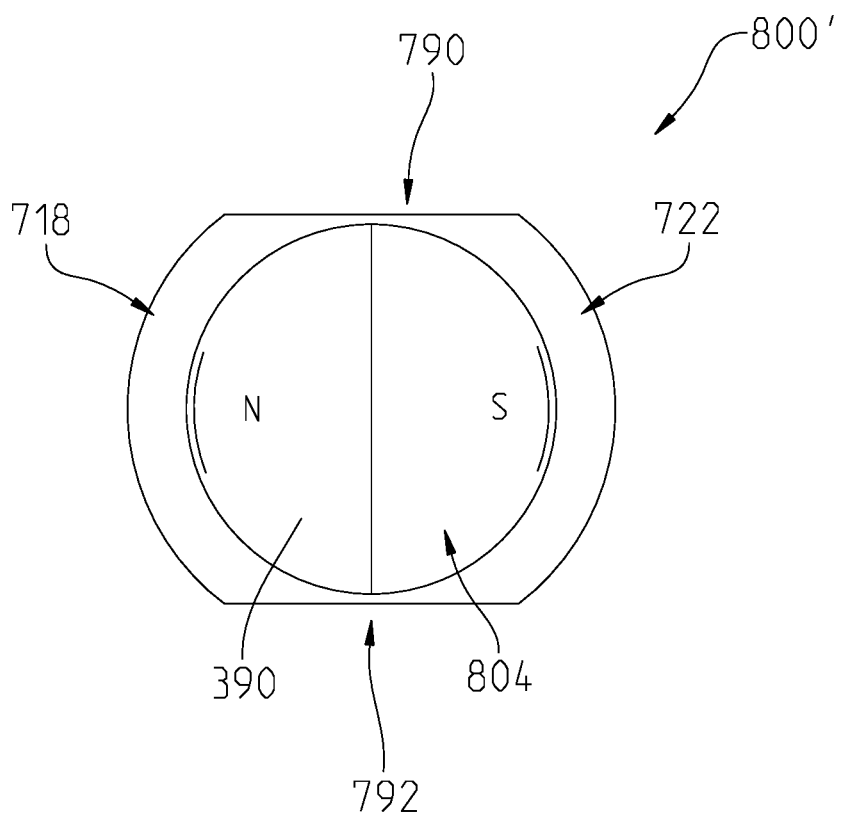
FIG. 16 illustrates a top view of an exemplary magnet and pole piece assembly of the magnetic coupling device of FIG. 11 without the central channel.
Figure 17:
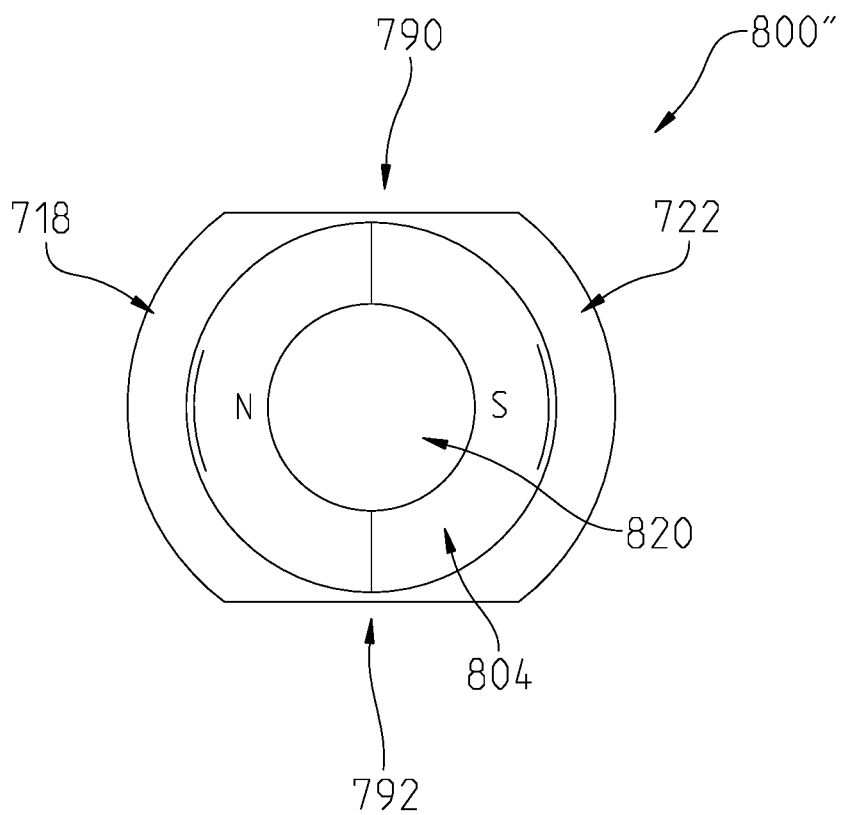
FIG. 17 illustrates a top view of an exemplary magnet and pole piece assembly of the magnetic coupling device of FIG. 11 without the central channel and including a ferromagnetic cores.

Referring to FIG. 16, in embodiments, magnetic coupling device 800' does not include channel 750. Rather, each of first permanent magnet 802 and second permanent magnet 804 are solid circular permanent magnets. In embodiments, a plurality of magnets may collectively form one or both of first permanent magnet 802 and second permanent magnet 804. Further, each of first permanent magnet 802 and second permanent magnet 804 may have various shapes. An exemplary arrangement is shown in FIGS. 2, 4, and 7 of U.S. Pat. No. 10,903,030, issued Jan. 26, 2021, titled VARIABLE FIELD MAGNETIC COUPLERS AND METHODS FOR ENGAGING A FERROMAGNETIC WORKPIECE, the entire disclosure of which are expressly incorporated by reference herein. Another exemplary arrangement is shown in U.S. Pat. No. 7,012,495, titled SWITCHABLE PERMANENT MAGNETIC DEVICE, the entire disclosure of which are expressly incorporated by reference herein. Further, each of first permanent magnet 802 and second permanent magnet 804 may be a platter containing multiple magnets. An exemplary arrangement is shown in FIGS. 17-19 of U.S. Pat. No. 10,903,030, issued Jan. 26, 2021, titled VARIABLE FIELD MAGNETIC COUPLERS AND METHODS FOR ENGAGING A FERROMAGNETIC WORKPIECE, the entire disclosure of which are expressly incorporated by reference herein.

Referring to FIG. 17, in embodiments, magnetic coupling device 800" does not include channel 750, but each of first permanent magnet 802 and second permanent magnet 804 includes a ferromagnetic core (ferromagnetic core 820 for second permanent magnet 804 shown in FIG. 17). An exemplary arrangement is shown in U.S. Provisional Patent Application No. 63/351,349, filed Jun. 11, 2022, titled MAGNETIC COUPLING DEVICE, the entire disclosure of which are expressly incorporated by reference herein.

Returning to FIG. 7, each adjustable assembly 30A-C illustratively includes a plurality of links and a plurality of couplers. In the illustrated embodiment, a first coupler 40A-C couples a first link 42A-C to base 20, a second coupler 44A-C couples first link 42A-C to a second link 46A-C, and a third coupler 48A-C couples second link 46A-C to tool 32A-C. In embodiments, one or more of couplers 40A-C, 44A-C, and 48A-C fix the respective components being coupled together. In embodiments, one or more couplers 40A-C, 44A-C, and 48A-C permit one or more degrees of movement (translational and/or rotational) between the respective components being coupled together. Exemplary couplers include linear translation mounts, rotational mounts, and other suitable mounts. A given coupler 40A-C, 44A-C, and 48A-C may contain multiple stages of mounts to provide more than one degree of freedom between the respective components being coupled together and/or a mount that itself provides multiple degrees of freedom. In embodiments, a given one of couplers 40A-C, 44A-C, and 48A-C may provide a single degree of freedom between the respective components being coupled together. In embodiments, a given one of couplers 40A-C, 44A-C, and 48A-C may provide multiple degrees of freedom between the respective components being coupled together. In embodiments, a given one of couplers 40A-C, 44A-C, and 48A-C may provide both at least one rotational degree of freedom and at least one translational degree of freedom.

In embodiments, the positioning of the respective components coupled together by couplers 40A-C, 44A-C, and 48A-C are controlled by an electronic controller 50. Electronic controller 50 controls one or more actuators of the respective couplers 40A-C, 44A-C, and 48A-C to move the corresponding coupled components relative to each other and/or to hold the position of the corresponding coupled components relative to each other. Although illustrated as a single electronic controller 50, electronic controller 50 may be one or more controllers which control the operation of couplers 40A-C, 44A-C, and 48A-C. Further, electronic controller 50 may control the operation of coupler 14 and/or robot 12.

As explained herein, by adjusting the relative positions of interfaces 34 of tools 32, EOAT may be easily used with multiple workpieces having different shapes and/or same shaped workpieces randomly placed in a container. Further, the description of EOAT 10 may also be implemented as a fixture to hold workpiece 80. In the case of a fixture, base 20 supports adjustable assemblies 30A-C relative to the floor or other support.

As described herein, an adjustable assembly may comprise a linear adjustment subassembly and a rotational adjustment subassembly, such that the tool of the adjustable assembly is linearly controllable along the x, y, and z axes (e.g., by the linear adjustment subassembly), as well as rotationally controllable about the x, y, and z axes (e.g., by the rotational adjustment subassembly). While example movements are described herein, it will be appreciated that any of a variety of additional or alternative movements may be implemented by an adjustable assembly according to aspects described herein. Further, the grouping of translational movements (linear movements) in one sub-assembly and rotational movements (angular movements) in another sub-assembly is for the ease of the reader, not due to a requirement that they be in separate sub-assemblies. On the contrary, it is possible, in embodiments to have a given sub-assembly that provides both translational and rotational motion.

In embodiments, one or more of the adjustable assemblies may have less than six degrees of freedom. In embodiments, one or more of the adjustable assemblies may have more than six degrees of freedom. In embodiments, each of the adjustable assemblies includes the same number of degrees of freedom. In embodiments, at least two of the adjustable assemblies have different numbers of degrees of freedom.

Example tools include, but are not limited to, a gripper (e.g., a magnetic gripper, a suction gripper, or a pin clamp) or a locator (e.g., a 2-way locating pin or a 4-way locating pin). In examples, a tool may engage with an object from substantially one side. For example, a magnetic gripper or a suction gripper may be referred to herein as single-sided tools that act on an object from the side at which the magnetic or suction force is provided. Similarly, a pin clamp or locator may engage with an object through a hole of the object. A pin clamp may include a retractable pin that is extended on the opposite side of the object. In such an example, a separate tool may not be required to exert force that is opposite that of the pin clamp, such that a pin clamp may also be a single-sided tool. Thus, such aspects may be in contrast to gripping an object from opposing edges or on both sides of the object using multiple tools. EOATs and fixtures may be smaller in size where single-sided tools are used, for example as compared to EOATs and fixtures where one or more additional tools are needed on opposite sides or edges of an object. In addition to such single-sided tools, an EOAT may similarly use any of a variety of double-sided tools, including, but not limited to, power clamps, parallel clamps, swing units, and multiple finger or mylar gripping devices, among other mechanical grippers. Further, aspects described herein may be used for any of a variety of other tools, including, but not limited to, drivers, drills, and paint heads, as well as tools for welding, painting, and polishing, among other examples.

An EOAT or fixture may include one or more adjustable assemblies, thereby manipulating or supporting an object using one or more tools associated therewith. For example, an EOAT may have a longitudinal mid-plane along its base along which adjustable assemblies are distributed. In examples, the adjustable assemblies of the EOAT may be positioned such that all tools are on one side of the longitudinal mid-plane, while, in other examples, at least one tool may be on the opposite side of the longitudinal mid-plane. For example, the EOAT may comprise three adjustable assemblies, where two tools are on one side of the longitudinal mid-plane and one tool is on the other side of the longitudinal mid-plane. Such a configuration may enable the EOAT to manipulate a larger object than if all tools were on the same side of the longitudinal mid-plane, by virtue of the increased range of motion (e.g., on both sides of the longitudinal mid-plane rather than a single side).

In examples, an adjustable EOAT or adjustable fixture as described herein is controlled by a controller that configures a set of adjustable assemblies, for example, to manipulate or support an object. The controller may control movement along and/or rotation about the x, y, and/or z axes of each adjustable assembly, thereby positioning an associated tool accordingly. The controller may configure the set of adjustable assemblies for a first object and, subsequently, for a second object. The controller may store one or more configurations for the set of adjustable assemblies (e.g., in association with an object), such that a stored configuration may be retrieved and used to configure the adjustable assemblies accordingly. For example, a stored configuration may define a position and a rotation for a tool along and about the x, y, and z axes. As another example, the stored configuration may define one or more contact points of an object in three-dimensional space, which may be used to generate a position and a rotation for one or more tools of an EOAT accordingly.

In examples, a set of stored configurations may be utilized in a sequence, for example according to an order with which objects are handled on an assembly line. Thus, one or more EOATs and/or fixtures in a series may be configured according to each subsequent object in the sequence as the objects progress down the assembly line. As another example, a configuration may be dynamically selected from the set of stored configurations and applied accordingly. For example, computer vision techniques may be used to identify an object and select an associated configuration accordingly. In another example, such computer vision techniques may be used to dynamically identify one or more locations at which to interact with an object, such that an EOAT and/or fixture may be configured based on the identified locations. Thus, an EOAT may be configured according to a predefined sequence of configurations or dynamically based on an identified object, or any combination thereof.

In some instances, the controller configures a set of adjustable assemblies for an EOAT and a set of adjustable assemblies for a corresponding fixture, such that the EOAT can be used to manipulate an object and place the object on the fixture. The controller may configure an adjustable assembly to be in a retracted or disabled state, such that only a subset of adjustable assemblies is used by the EOAT or fixture. Similarly, the controller may engage or disengage a tool of an adjustable assembly, for example causing the tool to generate or cease generation of a magnetic force or suction force, or extending or retracting a pin of a pin clamp, among other examples.

As a result of the adjustable nature of an EOAT or fixture according to aspects of the present disclosure, it may be possible to transition to handling different objects more quickly, EOATs may be lighter and therefore require less powerful robotic devices, and less space may be needed to house or operate the robotic device as a result in such a reduction in robotic payloads, thereby reducing the overall size of an assembly line, among other benefits. Further, a reduced number of tool stands (e.g., for holding different specialized EOATs) may be provided and fewer fixture stands may be needed in instances where adjustable EOATs and fixtures are used. Additionally, non-valued time may be reduced, as a equipment may spend a lower percentage of time changing tools and a higher percentage of time contributing to value-added processes. As a result of reduced equipment and decreased complexity, higher technical availability may be achieved. Similarly, time to market may be decreased as a result of reduced design and engineering requirements. For instances, simulations may be used to identify robot and/or EOAT movements to adapt an assembly line to manufacture a given object.

In some instances, the controller may further control a robotic device to which the EOAT is mechanically coupled or the controller may be separate from that of a robotic device. One or more image capture devices, light detection and ranging (LIDAR) systems, and/or other machine vision systems and sensors may be used by the controller, for example, to dynamically configure a set of adjustable assemblies based on a detected object. Such sensors may be mounted on the EOAT, the robotic device, and/or external to the EOAT and robotic device, among other examples. Thus, an EOAT need not be restricted to preconfigured object positions. As another example, the controller may identify obstacles and configure an EOAT or fixture so as to avoid a collision or reduce potential damage, among other examples. For example, the controller may model adjustable assemblies and associated movements, such that information of the surrounding environment (e.g., as may be gathered using computer vision techniques and/or LIDAR) may be evaluated to identify potential issues. In embodiments, the tools of the EOAT or fixture itself may be used to assist in determining proximity to the workpiece and/or correctness of the placement of the tool on the workpiece. Additional details are provided in U.S. Pat. No. 10,903,030, US Published Patent Application Nos. US20180311795, and Published PCT Application No. WO2020086791A1, the entire disclosures of which are expressly incorporated by reference herein.

Example computer vision techniques include, but are not limited to, object detection and object tracking. In some instances, sematic segmentation or instance segmentation may be used, for example to determine object boundaries. In some instances, machine learning techniques may be used, for example to detect objects and/or control movement of a robotic device, an adjustable EOAT, an adjustable fixture, and/or one or more constituent adjustable assemblies, linear adjustment subassemblies, or rotational adjustment assemblies. For example, a convolutional neural network or graph neural network may be used for object identification, among other examples. It will be appreciated that the adjustable EOATs and fixtures described herein may be independently controllable or may be controlled in conjunction with one another, among other examples.

Figure 1A:
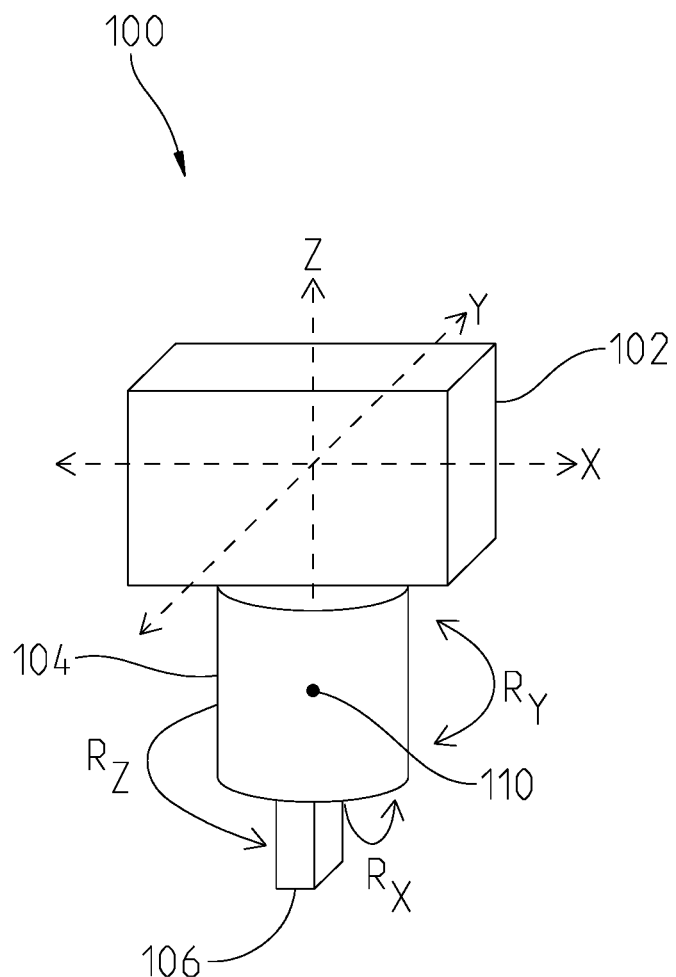
FIG. 1A illustrates a representative front view of an adjustable assembly for use with an adjustable end-of-arm tool or adjustable fixture.

FIG. 1A illustrates a block diagram of a front view of adjustable assembly 100 for use with an adjustable end-of-arm tool or adjustable fixture. As illustrated, adjustable assembly 100 comprises linear adjustment subassembly 102, rotational adjustment subassembly 104, and tool 106. The linear adjustment subassembly 102 and the rotational adjustment subassembly 104 have a plurality of links and couplers which permit the desired movements of the adjustable assembly 100 to position tool 106. As illustrated, linear adjustment subassembly 102 enables movement along the x, y, and z axes. Rotational adjustment subassembly 104 is mechanically coupled to linear adjustment subassembly 102, such that movement by linear adjustment subassembly 102 adjusts the position of rotational adjustment subassembly 104 accordingly. Further, the grouping of translational movements (linear movements) in one sub-assembly and rotational movements (angular movements) in another sub-assembly is for the ease of the reader, not due to a requirement that they be in separate sub-assemblies. On the contrary, it is possible, in embodiments to have a given sub-assembly that provides both translational and rotational motion. As another example, rotational mounts may couple links of a sub-assembly together, thereby enhancing the modularity and range of motion of the sub-assembly, as may be beneficial in instances where multiple adjustable assemblies 100 are used.

Rotational adjustment subassembly 104 is illustrated as enabling rotational movement about the x, y, and z axes. It will be appreciated that a given point of rotation 110 may occur in the center of rotational adjustment assembly 104, at an end portion of the rotational adjustment assembly, and/or at an attachment point of tool 106, among other examples. In embodiments, rotational adjustment assembly 104 may be coupled to linear adjustment subassembly in a way wherein rotation is not about the x, y, and z axes, but rather about three orthogonal axes (a fourth axis, a fifth axis, and a sixth axis) that are rotated relative to at least two of the x, y, and z axes. However, in examples the fourth axis, the fifth axis, and the sixth axis do coincide with the x, y, and z axes.

In embodiments, rotational adjustment assembly 104 is a wrist joint having a frame and an output interface supported by the frame. The tool 106 is coupled to the output interface. The output interface may be rotated about the z-axis with a hydraulic motor, stepper motor, or other suitable device which rotates the frame relative to the linear adjustment subassembly 102. Along with the output interface, a control assembly for rotation about the y-axis and a control assembly for rotation about the x-axis are rotated about the z-axis. The control assembly for rotation about the y-axis may include a first ring that surrounds the z-axis and which is pivotably connected to the frame. The pivot axis between the frame and the first ring corresponds to the y-axis. The angular position of the first ring relative to the frame may be controlled with a hydraulic cylinder coupled between the frame and the first ring at a location spaced apart from the pivots between the frame and first ring. The first ring carries the control assembly for rotation about the x-axis and the output interface. As such, a rotation of the first ring about the y-axis causes a corresponding rotation of the output interface and hence the tool about the y-axis. The control assembly for rotation about the x-axis may include a second ring that surrounds the z-axis and which is pivotably connected to the first ring of the y-axis control assembly. The pivot axis between the first ring and the second ring corresponds to the x-axis. The angular position of the second ring relative to the first ring may be controlled with a hydraulic cylinder coupled between the first ring and the second ring at a location spaced apart from the pivots between the first ring and the second ring. The second ring carries the output interface. As such, a rotation of the second ring about the x-axis causes a corresponding rotation of the output interface and hence the tool about the x-axis. In embodiments, the pivot axis between the frame and first ring for the control assembly for rotation about the y-axis and the pivot axis between the first ring and the second ring for the control assembly for rotation about the x-axis intersect each other. In embodiments, the pivot axis between the frame and first ring for the control assembly for rotation about the y-axis and the pivot axis between the first ring and the second ring for the control assembly for rotation about the x-axis intersect each other and intersect the rotation axis of the frame about the z-axis, shown as point 110 in FIG. 1A. An exemplary wrist joint is disclosed in Chinese Patent No. CN110171015B.

Thus, linear adjustment subassembly 102 and rotational adjustment subassembly 104 are usable to adjust the position of tool 106 along and about the x, y, and z axes. As described above, tool 106 may be a gripper or a locator, among other examples. In some instances, tool 106 may be removable from rotational adjustment assembly 104, such that tool 106 is mechanically coupled at an attachment point of rotational adjustment assembly 104.

Figure 1B:
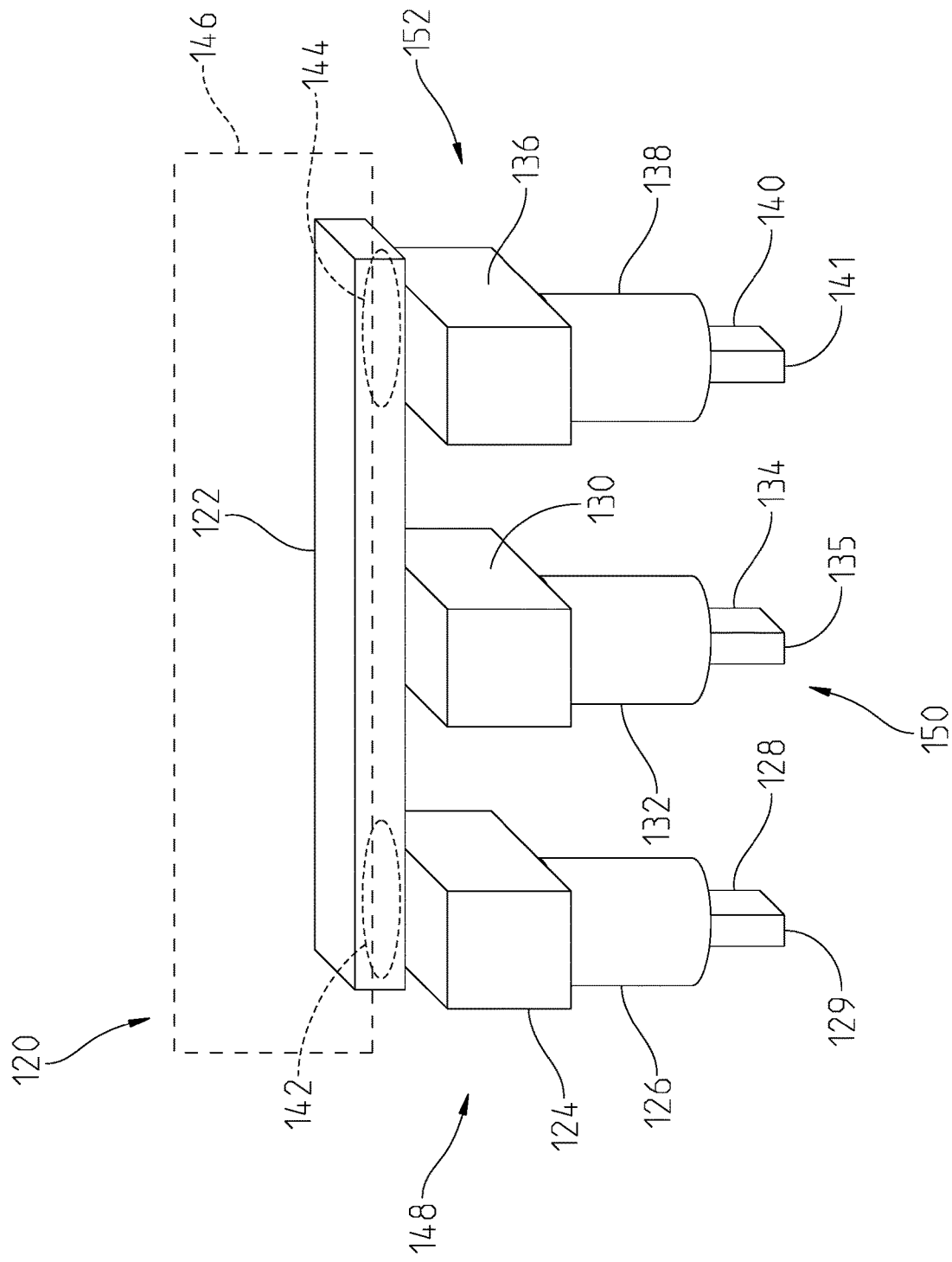
FIGS. 1B and 1C illustrate representative front and back views, respectively, of an adjustable end-of-arm tool having multiple adjustable assemblies in various configurations according to aspects of the present disclosure.
Figure 1C:
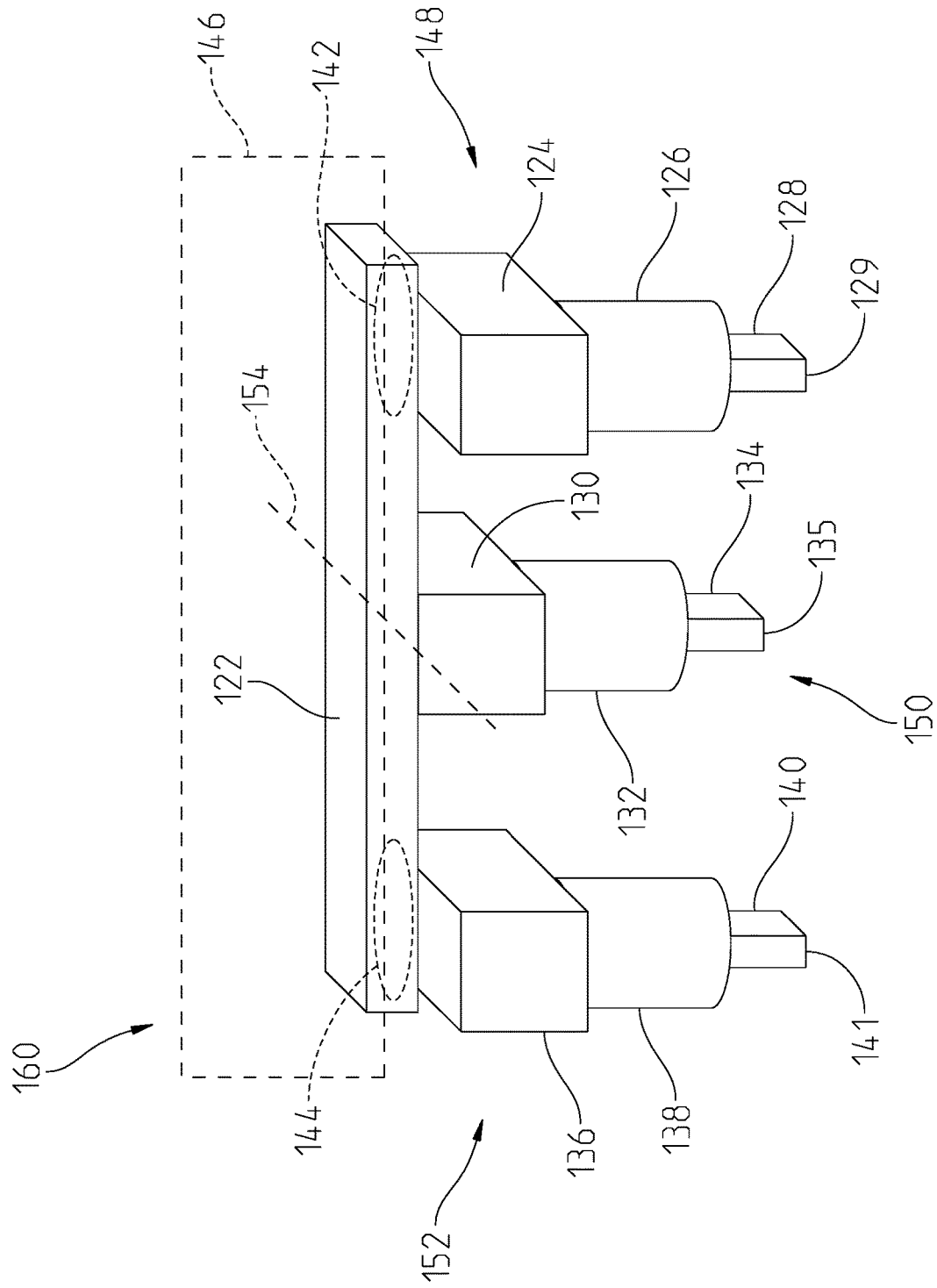

FIGS. 1B and 1C illustrate block diagrams of a front view 120 and a back view 160, respectively, of an adjustable end-of-arm tool 122 having multiple adjustable assemblies 148, 150, and 152 in various configurations according to aspects of the present disclosure.

EOAT 122 comprises adjustable assembly 148 (e.g., comprising linear adjustment subassembly 124, rotational adjustment subassembly 126, and tool 128), adjustable assembly 150 (e.g., comprising linear adjustment subassembly 130, rotational adjustment subassembly 132, and tool 134), and adjustable assembly 152 (e.g., comprising linear adjustment subassembly 136, rotational adjustment subassembly 138, and tool 140). The respective linear adjustment subassemblies 124, 130, and 136 and the respective rotational adjustment subassemblies 126, 132, and 138 each have a plurality of links and couplers which permit the desired movements of the respective adjustable assembly 148, 150, and 152 to position respective tool 128, 134, and 140. In embodiments, the interfaces 129, 135, and 141 of tools 128, 134, and 140 of EOAT 122 may form a plane via which an object can be manipulated. In embodiments, at least two of the interfaces 129, 135, and 141 of tools 128, 134, and 140 of EOAT 122 are non-planer due to either a translation of one of tools relative to the other and/or a rotation of one of the tools relative to the other. It will be appreciated that, in other examples, interfaces 129, 135, and 141 may be planar. In examples, tools 128, 134, and 140 need not be the same type of tool. For example, tools 128 and 140 may be magnetic grippers, while tool 134 may be a locating pin.

As illustrated in view 120, EOAT 122 is in a configuration where adjustable assemblies 148, 150, and 152 are distributed along longitudinal mid-plane 146 such that tools 128, 134, and 140 are all on one side of longitudinal mid-plane 146. EOAT 122 is further illustrated as including rotation mounts 142 and 144, such that adjustable assemblies 148 and/or 152 may be rotated to achieve alternate configurations. View 160 in FIG. 1C illustrates such an alternate configuration of EOAT 122, where adjustable assemblies 148 and 152 are configured to position tools 128 and 140 on the opposite side of longitudinal mid-plane 146 as compared to adjustable assembly 150 and its associated tool 134. In addition to the illustrated rotation, rotation mounts 142 and 144 may be linearly translatable along longitudinal mid-plane 146 to adjust the position of tools 128 and 140 along longitudinal mid-plane 146 with respect to tool 134.

Such a configuration may offer a deeper range of motion (e.g., along axis 154) as compared to that of the configuration in view 120. In other configurations, an adjustable assembly may be configured to be in line with longitudinal mid-plane 146, such that the configuration of tools 128, 134, and 140 is wider (e.g., along axis 146) than the configurations illustrated in views 120 and 160. It will be appreciated that, in other examples, rotation mounts 142 and/or 144 may be omitted, such that adjustable assemblies 148 and 152, respectively, are fixably attached to EOAT 122, similar to adjustable assembly 150. In other examples, any number of adjustable assemblies and/or rotation mounts may be used.

Figure 1D:
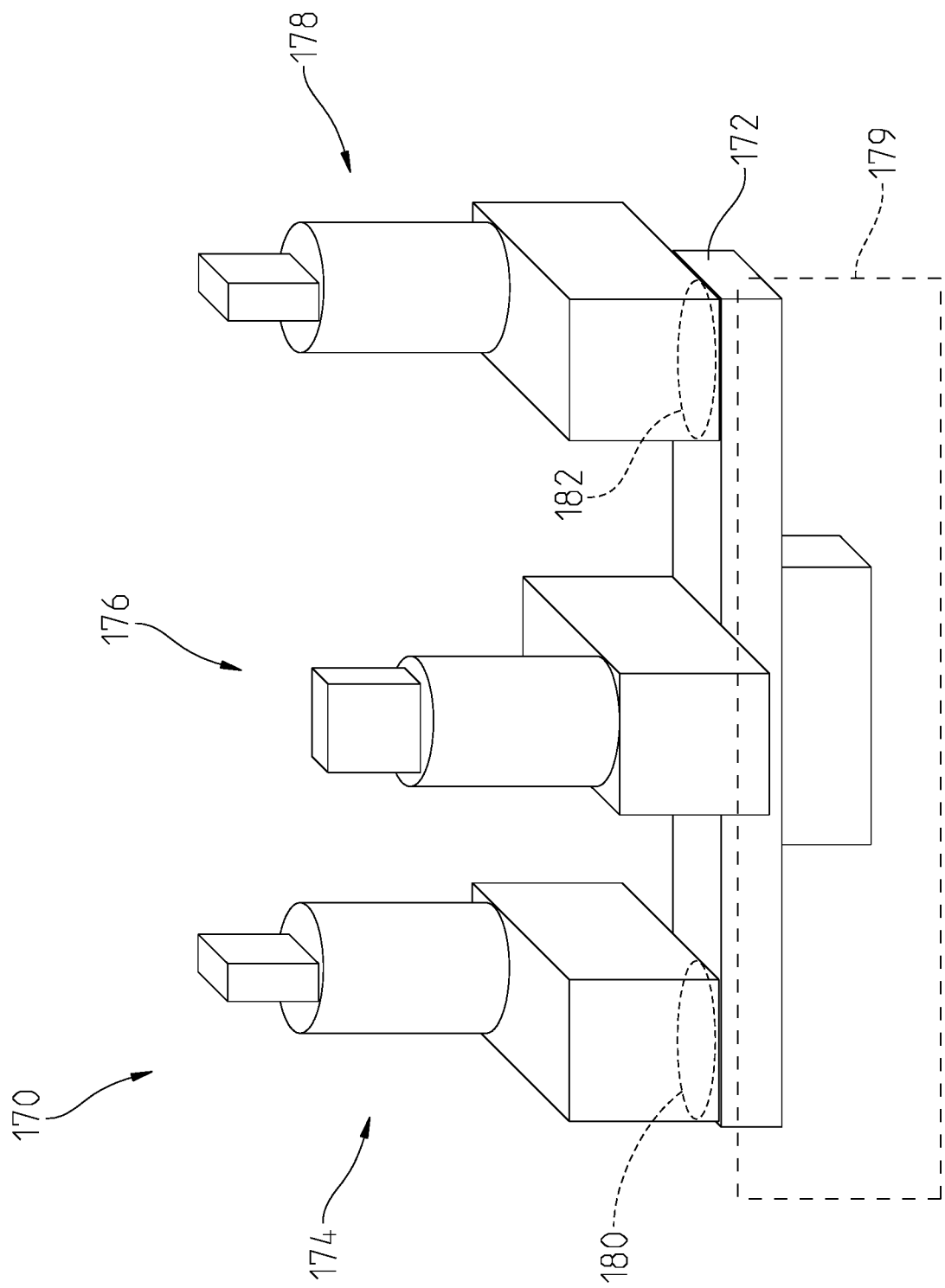
FIG. 1D illustrates a representative front view of an adjustable fixture having multiple adjustable assemblies.
Figure 2A:
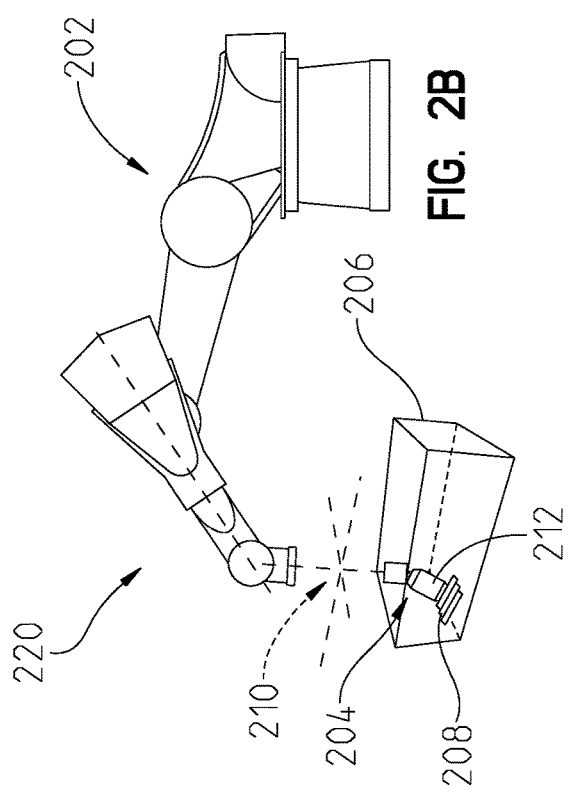
FIGS. 2A-2D illustrate example views of a robotic device having an adjustable end-of-arm tool manipulating multiple objects according to aspects described herein.
Figure 2B:
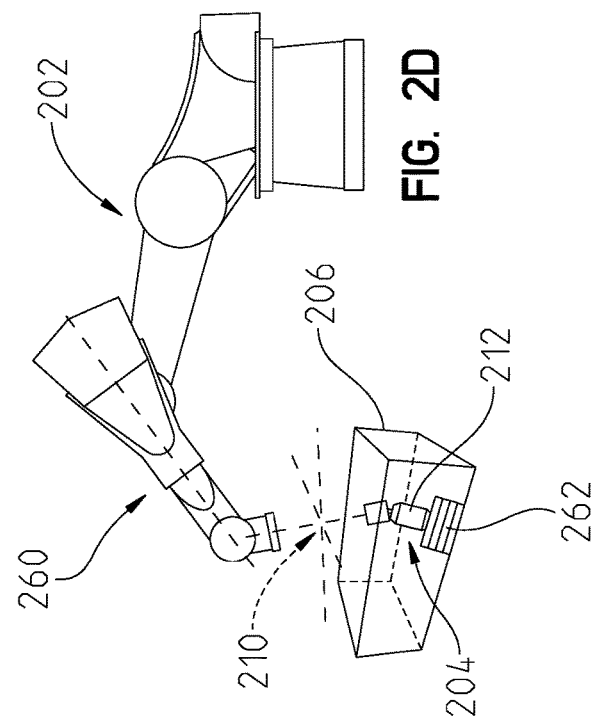
Figure 2C:
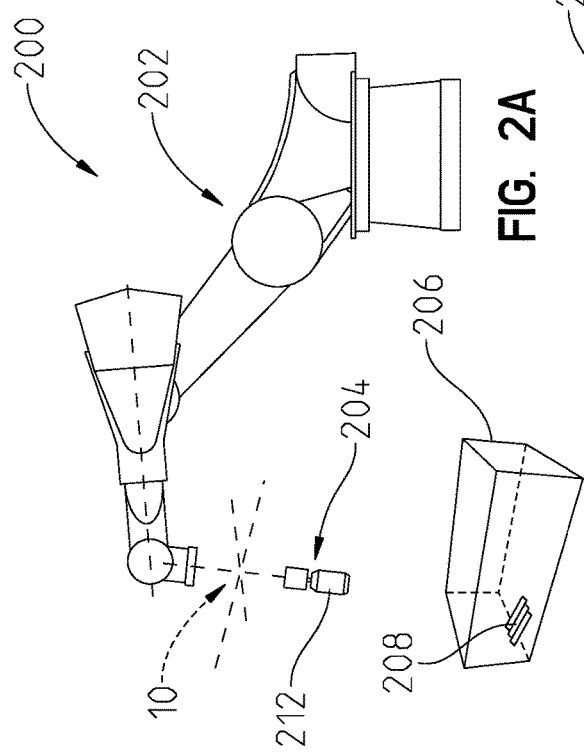
Figure 2D:
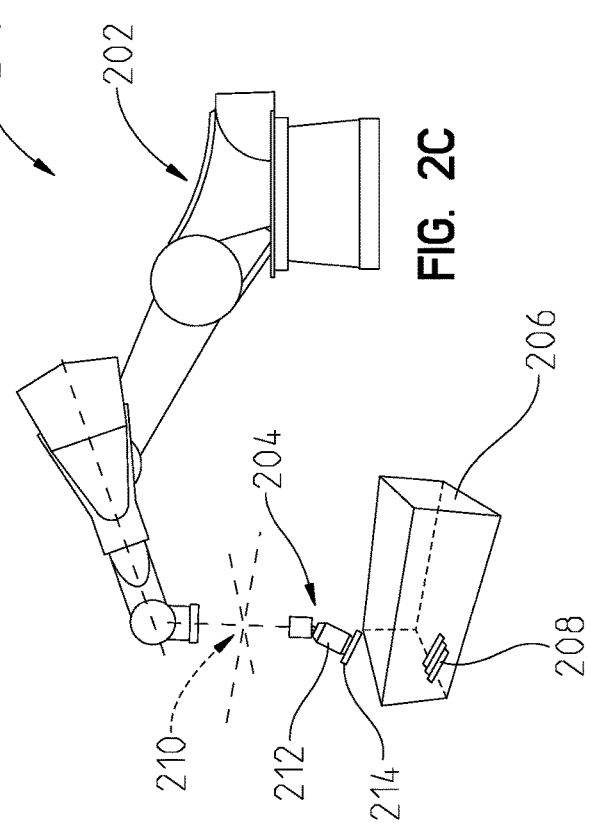

FIG. 1D illustrates a block diagram of a front view of an adjustable fixture 170 having multiple adjustable assemblies. Aspects of adjustable fixture 170 are similar to EOAT 122 and are therefore not necessarily re-described in detail. For example, EOAT 122 is illustrated as comprising adjustable assemblies 174, 176, and 178, which are similar to those discussed above with respect to FIGS. 1A-1C.

Similar to EOAT 122, base 172 of adjustable fixture 170 comprises rotation mounts 180 and 182, such that adjustable assemblies 174 and 178 may be rotated for configurations where one or more of adjustable assemblies 174, 176, and 178 are on the same or different sides of a longitudinal mid-plane 179 of adjustable fixture 170. As discussed above, adjustable fixture 170 may be used to support an object, as may be placed on adjustable fixture 170 using an adjustable EOAT, such as EOAT 122 discussed above. Thus, both adjustable fixture 170 and EOAT 122 may be configured by a controller to support and manipulate, respectively, the same object.

FIGS. 2A-2D illustrate example views 200, 220, 240, and 260 of a robotic device 202 having an adjustable end-of-arm tool (e.g., comprising linear adjustment subassembly 210, rotational adjustment subassembly 204, and tool 212) manipulating multiple objects 208 and 262 according to aspects described herein. Although the EOAT is illustrated with a single adjustable assembly, the EOAT may have two or more adjustable assemblies each having translational and/or rotational adjustability.

Thus, in addition to the tool adjustment aspects described above with respect to an adjustable assembly, an EOAT itself may be moved. As an example, the EOAT may be configured according to a stored configuration associated with objects 208 or objects 262, such that robotic device 202 may then move the EOAT to manipulate objects 208 or objects 262 accordingly.

For example, as compared to view 200, view 220 depicts the EOAT in a configuration to manipulate objects 208. As illustrated, rotational adjustment subassembly 204 has been configured to rotate tool 212 in such a way that it may manipulate objects 208. In some examples, linear adjustment subassembly 210 may similarly move tool 212 along one or more axes, for example to better access objects 208 in container 206.

Accordingly, robotic device 202 may move the adjustable EOAT into container 206, at which point a controller may engage tool 212 to manipulate object 214 of objects 208 accordingly. For example, tool 212 may be a magnetic gripper or a suction gripper, such that tool 212 is used to generate magnetic or suction force. In some examples, the EOAT may remain in a substantially similar configuration for the duration that it is used by robotic device 202 to manipulate object 214. In other instances, linear adjustment subassembly 210 and/or rotational adjustment subassembly 204 may be reconfigured while tool 212 is gripping object 214. For example, linear adjustment subassembly 210 may move tool 212 along one or more of the x, y, or z axes in addition to or as an alternative to movement by robotic device 202. Thus, it will be appreciated that robotic device 202 and the EOAT may operate in concert to manipulate object 214.

View 260 similarly illustrates robotic device 202 using EOAT to manipulate objects 262 using tool 212. In examples, the EOAT is configured according to a stored configuration associated with objects 262, for example, from a previous configuration for objects 208. In some instances, computer vision, a LIDAR system, or other sensor information is used to identify objects 208 and/or objects 262 within container 206, such that the EOAT may be dynamically configured to manipulate objects 208 and/or 262 accordingly. For example, the EOAT may be configured based on the sensor information (e.g., absent pre-existing configuration information for objects 208 and/or 262) or an associated configuration may be adapted according to the sensor information, for example to account for variations in the position of objects 208 and/or 262.

Figure 3A:
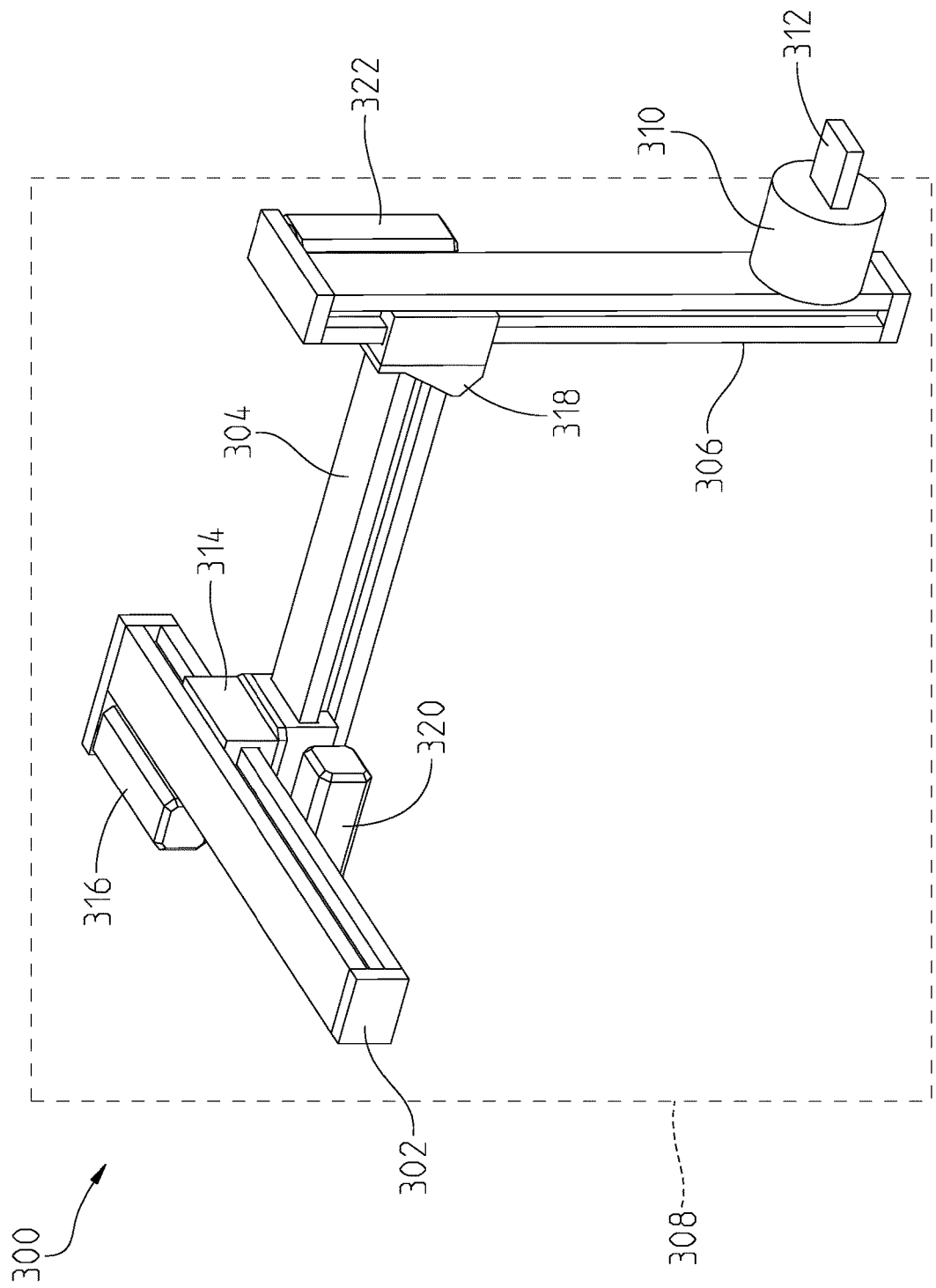
FIG. 3A illustrates a front left view of an example adjustable assembly.
Figure 3B:
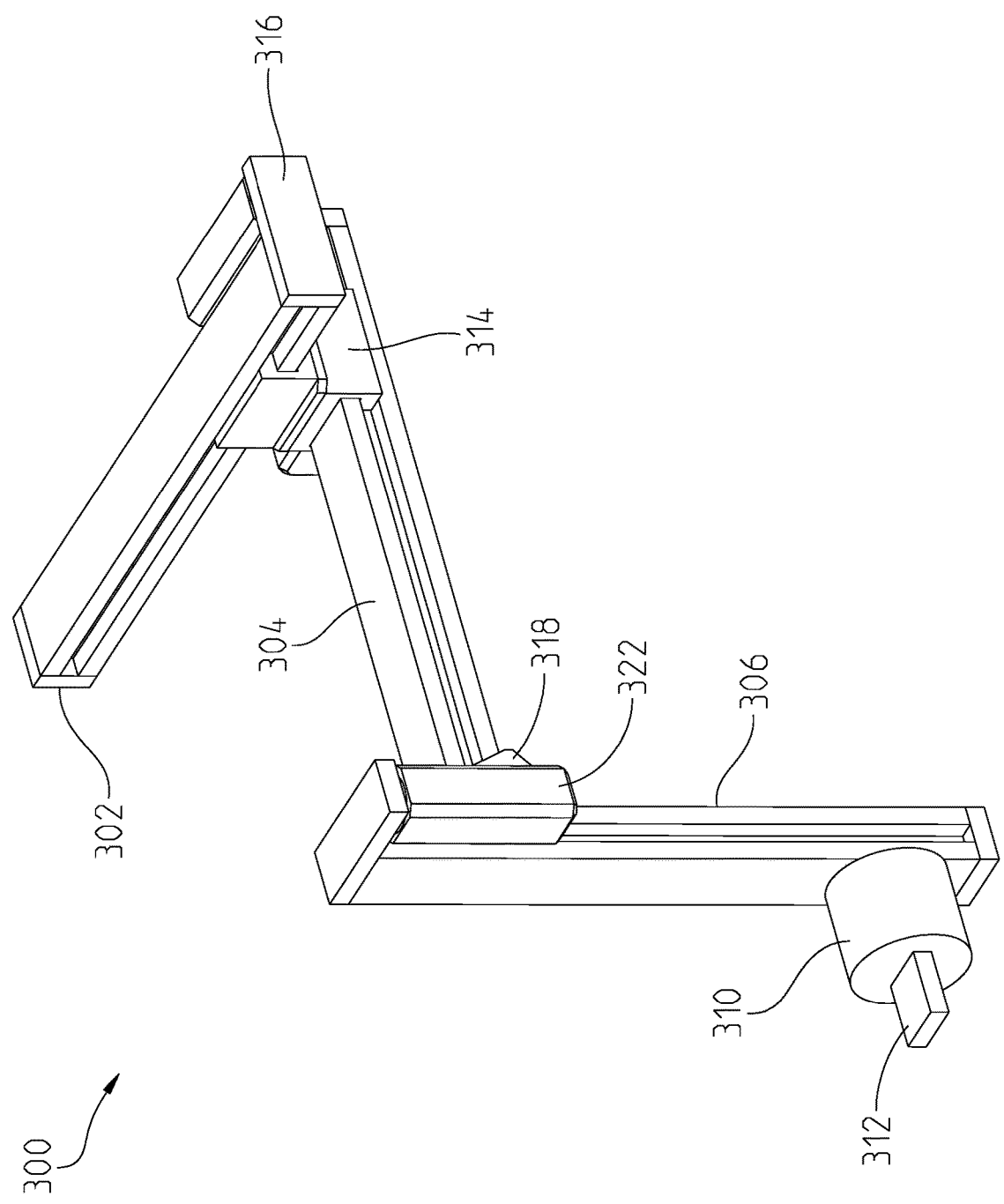
FIG. 3B illustrates a front right view of an example adjustable assembly.
Figure 3C:
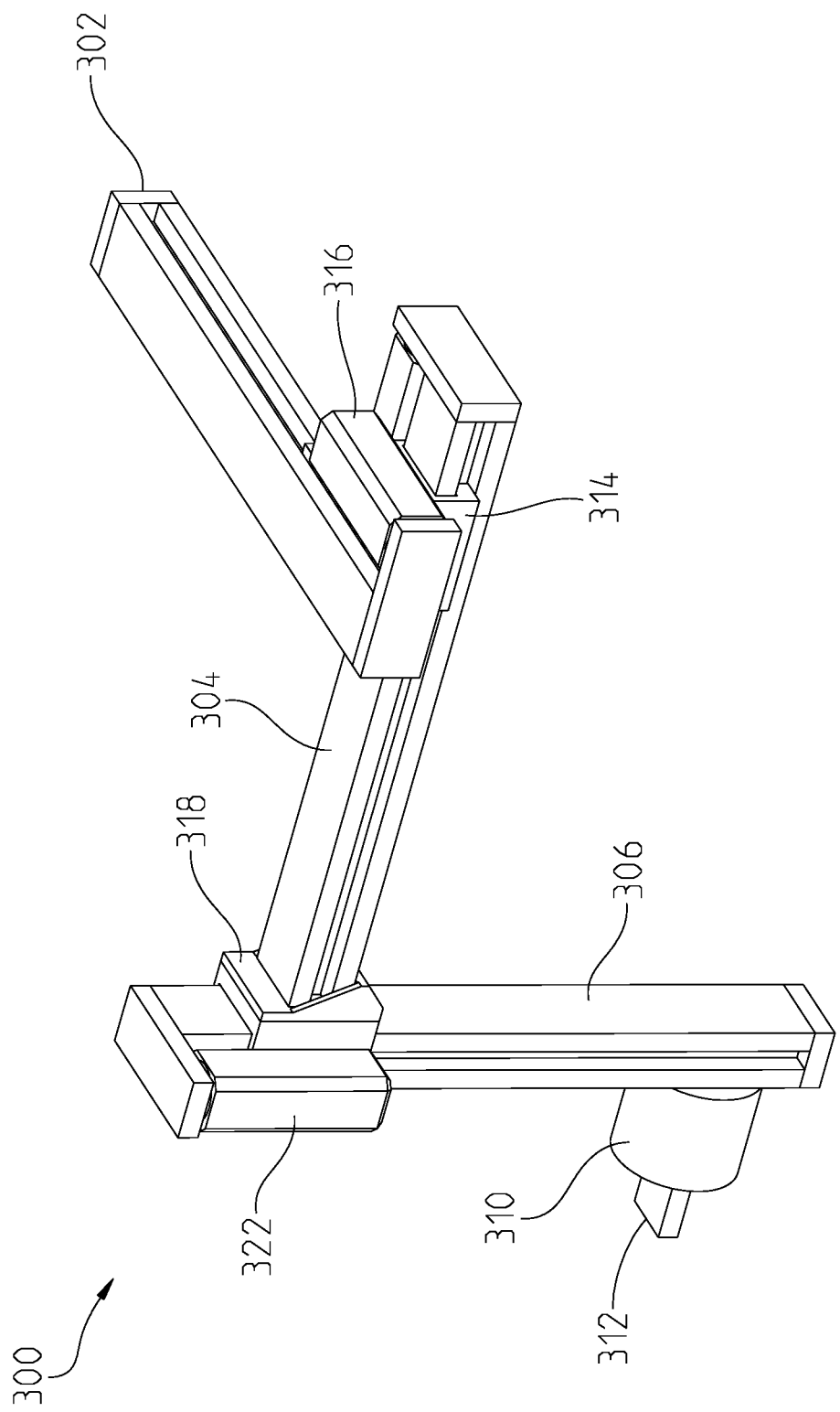
FIG. 3C illustrates a rear left view of an example adjustable assembly.

FIG. 3A illustrates a front left view of an example adjustable assembly 300, while FIG. 3B illustrates a front right view and FIG. 3C illustrates a rear left view. As illustrated, adjustable assembly 300 comprises linear adjustment subassembly 308, rotational adjustment subassembly 310, and tool 312. The linear adjustment subassembly 308 and the rotational adjustment subassemblies 310 each have a plurality of links and couplers which permit the desired movements of the adjustable assembly 300 to position the tool 312. Linear adjustment subassembly 308 is illustrated as comprising linear rails 302, 304, and 306. As illustrated, slidable coupler 314 slides along linear rail 302 and linear rail 304, while slidable coupler 322 slides along linear rail 306. Thus, in the instant example, slidable coupler 314 enables movement along two perpendicular axes (e.g., that of linear rails 302 and 304; the x and y axes), while slidable coupler 318 enables movement along one axis perpendicular to those of slidable coupler 314 (e.g., that of linear rail 306; the z axis).

Linear adjustment subassembly 308 is further depicted as comprising motors 316, 320, and 322. As illustrated, motor 316 causes movement along linear rail 302, motor 320 causes movement along linear rail 304, and motor 322 causes movement along linear rail 306. In examples, motors 316, 320, and 322 each comprise a rotary encoder, such that the positions along linear rails 302, 304, and 306 may be determined. For example, the location of coupler 314 may be determined relative to linear rail 302 by a rotary encoder of motor 316, while the location of coupler 314 along linear rail 304 may be determined by a rotary encoder of motor 320. Similarly, the location of coupler 318 along linear rail 306 may be determined by motor 322. It will be appreciated that such aspects are provided as an example and, in other examples, any of a variety of additional or alternative techniques may be used to determine the current configuration of linear adjustment subassembly 308. Such feedback may similarly be provided by rotational adjustment subassembly 310. For example, an absolute encoder may be used (e.g., for each axis), such that homing after an interruption in power may be not be required. Further, data from absolute encoders of an adjustable assembly may be used by a controller (e.g., controller 50) to store a configuration of the adjustable assembly for subsequent use.

Adjustable assembly 300 is further illustrated as comprising rotational adjustment assembly 310 and tool 312, aspects of which are similar to those discussed above with respect to FIGS. 1A-1D and 2A-2D, and are therefore not necessarily re-described in detail. As noted above, rotational adjustment assembly 310 may enable rotation about the x, y, and z axis, such that tool 312 may be rotated accordingly.

It will be appreciated that the location at which rotational adjustment assembly 310 is affixed to linear rail 306 is provided as an example. As another example, rotational adjustment assembly 310 may be affixed to the end of linear rail 306 or, as a further example, rather than moving linear rail 306 with respect to slidable coupler 318, linear rail 306 may be fixably coupled to linear rail 304 and motor 322 may be configured to move rotational adjustment assembly 310 along linear rail 306 instead.

Figure 4A:
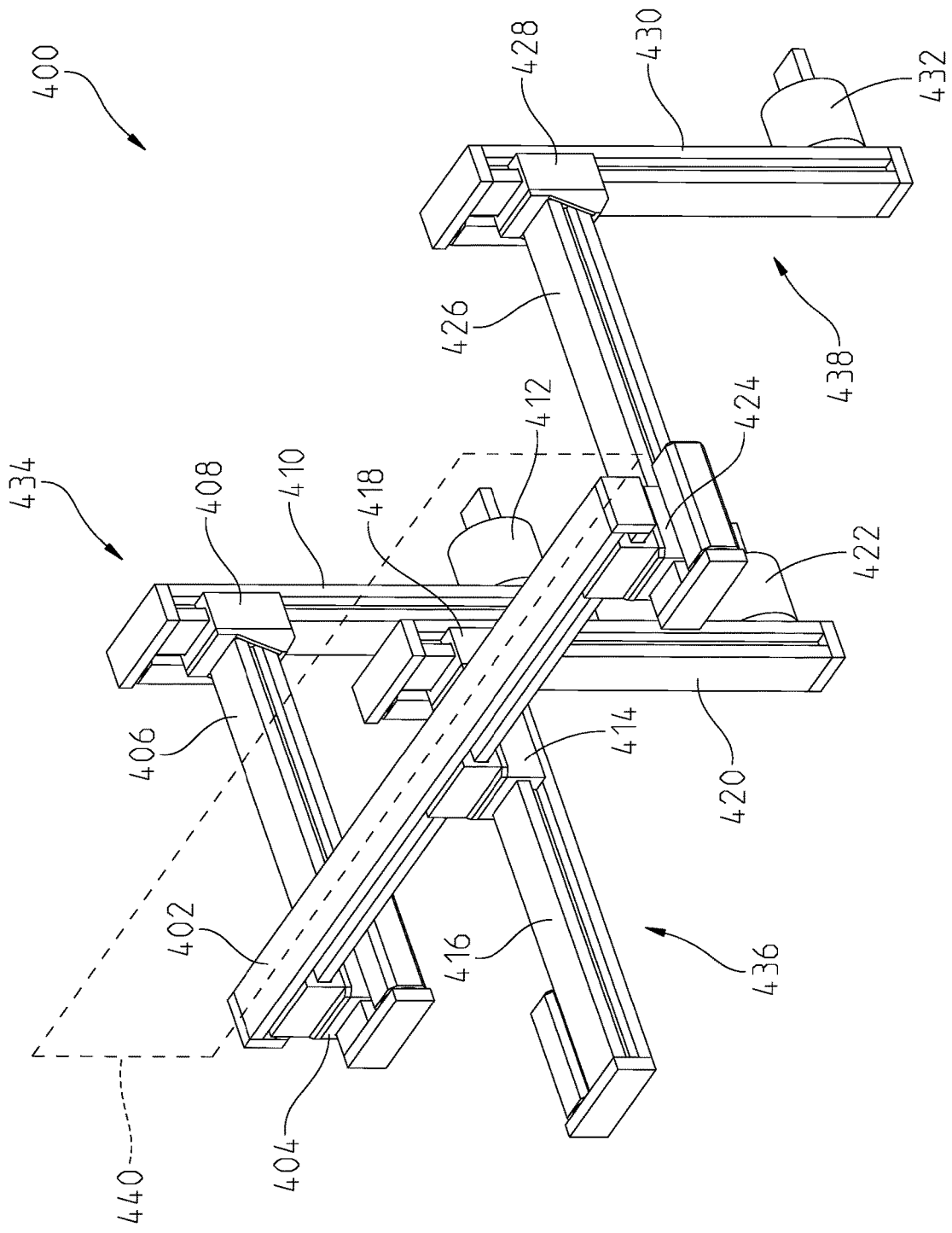
FIG. 4A illustrates a top perspective view of an adjustable end-of-arm tool having multiple adjustable assemblies according to aspects of the present disclosure.
Figure 4B:
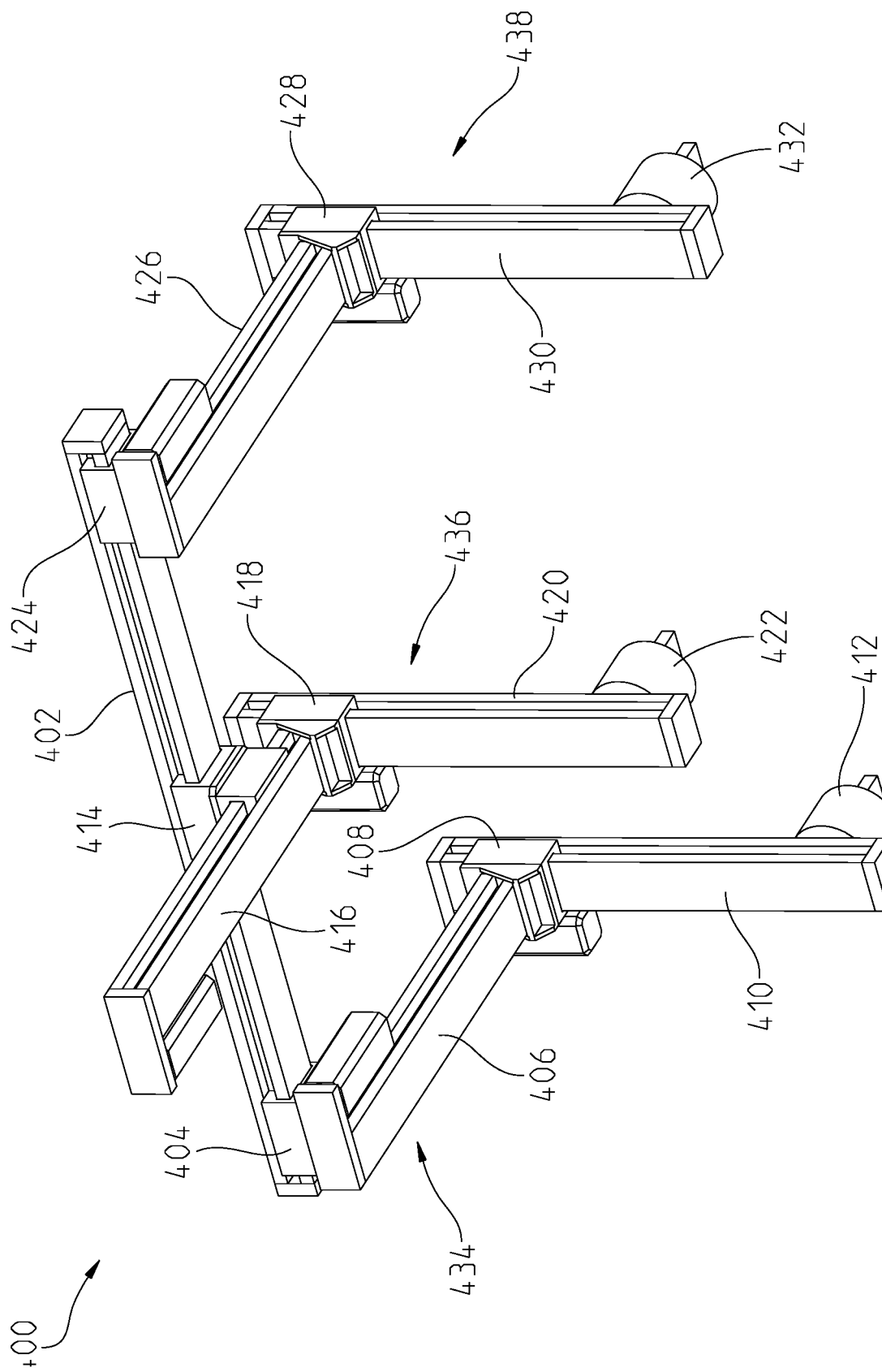
FIG. 4B illustrates a bottom perspective view of an adjustable end-of-arm tool having multiple adjustable assemblies according to aspects of the present disclosure.
Figure 4C:
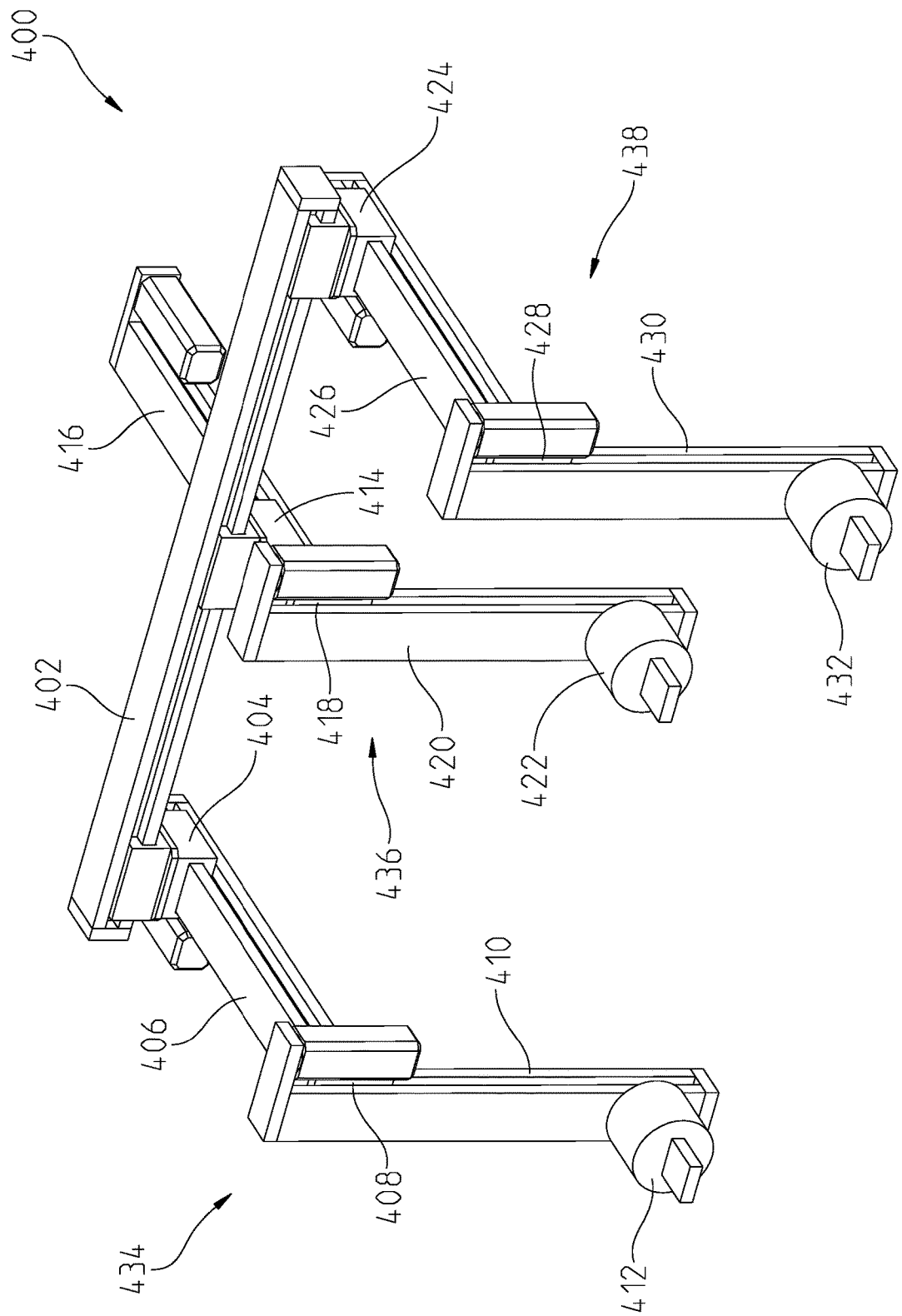
FIG. 4C illustrates another top perspective view of an adjustable end-of-arm tool having multiple adjustable assemblies according to aspects of the present disclosure.

FIG. 4A illustrates a top perspective view of an adjustable end-of-arm tool 400 having multiple adjustable assemblies according to aspects of the present disclosure, while FIG. 4B illustrates a bottom perspective view and FIG. 4C illustrates another top perspective view. For example, EOAT 400 may be used by a robotic device, such as robotic device 202 discussed above with respect to FIGS. 2A-2D. In such instances, common linear rail 402 may comprise a mechanism with which EOAT 400 may be mechanically coupled to robotic device 202. Aspects of EOAT 400 may be similar to that of EOAT 122 discussed above with respect to FIGS. 1B-1C and are therefore not necessarily re-described below in detail. Further, while FIGS. 4A-4C depict an EOAT 400, it will be appreciated that similar aspects are applicable to an adjustable fixture, similar to adjustable fixture 170 discussed above with respect to FIG. 1D.

As illustrated, EOAT 400 comprises adjustable assemblies 434, 436, and 438. Adjustable assembly 434 is illustrated as comprising slidable coupler 404, linear rail 406, slidable coupler 408, linear rail 410, and rotatable adjustment subassembly 412. Adjustable assembly 436 is illustrated as comprising slidable coupler 414, linear rail 416, slidable coupler 418, linear rail 420, and rotatable adjustment subassembly 422. Adjustable assembly 438 is illustrated as comprising slidable coupler 424, linear rail 426, slidable coupler 428, linear rail 430, and rotatable adjustment subassembly 432.

As compared to adjustable assembly 300 discussed above with respect to FIGS. 3A-3C, adjustable assemblies 434, 436, and 438 have a base including a common linear rail 402 on which slidable couplers 404, 414, and 424 move along longitudinal mid-plane 440. Adjustable assemblies 434, 436, and 438 each further comprise linear rails 406, 416, and 426 that are coupled to slidable couplers 404, 414, or 424, respectively, such that each adjustable assembly may position a respective tool along linear rails 406, 416, and 426 accordingly. Although the base is shown as having a single linear rail, in embodiments, base includes multiple rails, each supporting one or more of the adjustable assemblies.

The illustrated example EOAT 400 is a configuration in which all adjustable assemblies 434, 436, and 438 are on the same side of longitudinal mid-plane 440 (e.g., similar to the configuration illustrated in view 120 discussed above with respect to FIG. 1B). In some instances, EOAT 400 may further comprise one or more rotation mounts, such that an adjustable assembly may be rotated perpendicular to longitudinal mid-plane 440, similar to the aspects discussed above with respect to view 160 of FIG. 1C. As another example, an adjustable assembly may be fixably attached in another configuration (e.g., rotated 90 or 180 degrees).

Figure 5A:
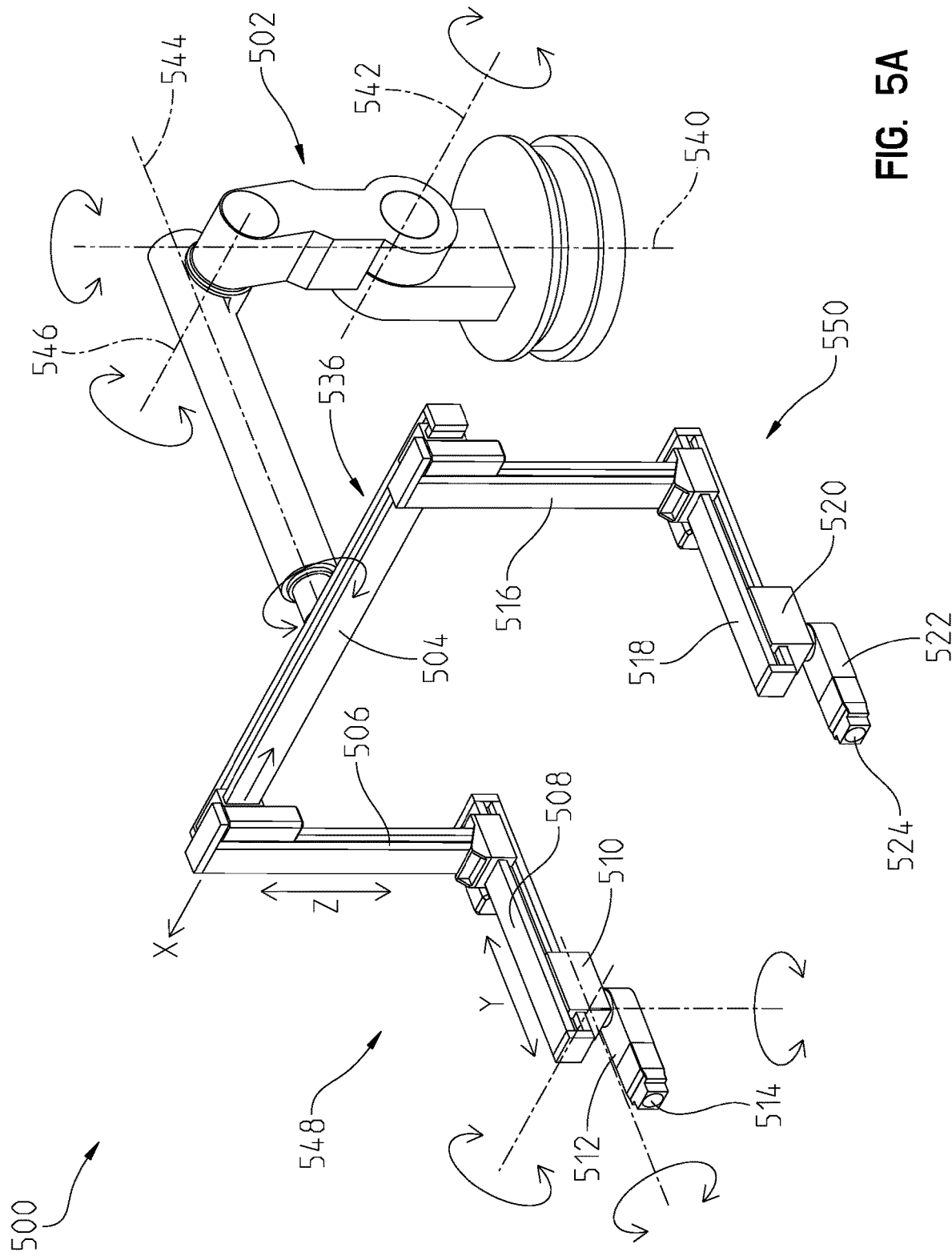
FIG. 5A illustrates a perspective view of a robotic device having an adjustable end-of-arm tool according to aspects of the present disclosure.

FIG. 5A illustrates a perspective view 500 of a robotic device 502 having an adjustable end-of-arm tool 536 according to aspects of the present disclosure. Aspects of robotic device 502 and EOAT 536 may be similar to those discussed above and may therefore not necessarily be re-described in detail below. For example, EOAT 536 may be similar to that of EOAT 400 discussed above with respect to FIGS. 4A-4C.

As illustrated, robotic device 502 is configured to move EOAT 536 above a variety of axes 540, 542, 544, and 546. Thus, tools 512 and 522 may be moved about such axes in addition to or as an alternative to movement by adjustable assemblies 548 and 550 according to aspects described herein. As illustrated, adjustable assembly 548 comprises linear rail 506, linear rail 508, rotational adjustment subassembly 510, tool 512, and contact point 514. Similarly, adjustable assembly 550 comprises linear rail 516, linear rail 518, rotational adjustment subassembly 520, tool 522, and contact point 524. Similar to EOAT 400 discussed above with respect to FIGS. 4A-4C, EOAT 536 comprises common linear rail 504 along which adjustable assemblies 548 and/or 550 may move. For example, common linear rail 504 may enable movement of tools 512 and 522 along the x-axis, while linear rails 506 and 516 may enable movement along the z-axis and linear rails 508 and 518 may enable movement along the y-axis.

Figure 5B:
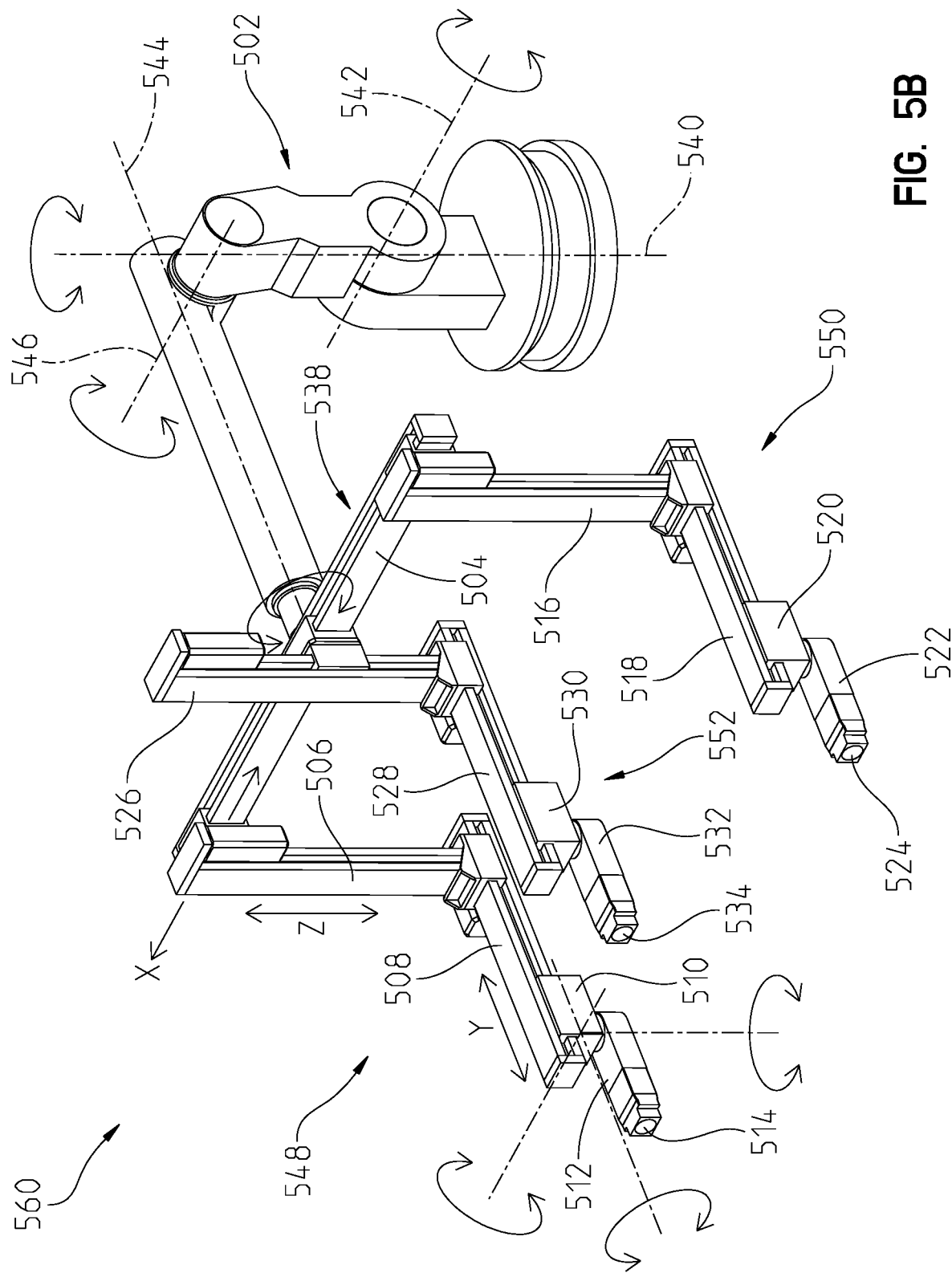
FIG. 5B illustrates a perspective view of a robotic device having another adjustable end-of-arm tool according to aspects of the present disclosure.

While examples are described herein with a configuration of linear rails offering movement in a given order of axes, it will be appreciated that a linear adjustment subassembly may have any of a variety of other arrangements. For example, FIGS. 3A-3C illustrate an instance where a first linear rail 302 enables movement along the x-axis, a second linear rail 304 enables movement along the y-axis, and a third linear rail 306 enables movement along the z-axis, while FIGS. 5A-5B illustrate an instance where a first linear rail 504 enables movement along the x-axis, a second linear rail 506 enables movement along the z-axis, and a third linear rail 508 enables movement along the y-axis. Further, other examples need not restrict movement axes that are perpendicular to one another.

As discussed above, adjustable assemblies 548 and 550 of EOAT 536 may be configured for manipulation of any of a variety of objects. In examples, EOAT 536 is configured independent of movement by robotic device 502, such that EOAT 536 is configured to manipulate an object (e.g., thereby enabling robotic device 502 to grip the object), while robotic device 502 moves EOAT 536 (and, when interfaces 514 and 524 are engaged, an object associated therewith) about one or more of axes 540, 542, 544, and 546. Such movements need not be mutually exclusive, such that robotic device 502 may move toward an object while EOAT 536 is configured to manipulate the object at least partially contemporaneously with the movement of robotic device 502.

In other instances, adjustable assemblies 548 and 550 may be operated in conjunction with movement of robotic device 502, such that the object is moved as a result of a combination of movement by robotic device 502 and EOAT 536. In such instances, the positions of tools 512 and 522 may remain substantially fixed with respect to one another, even while there is movement along and/or rotation about the x, y, and/or z axes.

FIG. 5B illustrates a perspective view 560 of a robotic device 502 having another adjustable end-of-arm tool 538 according to aspects of the present disclosure. As compared to EOAT 536 discussed above with respect to FIG. 5A, EOAT 538 has an additional adjustable assembly 552 comprising linear rail 526 for movement along the z-axis, linear rail 528 for movement along the y-axis, rotational adjustment subassembly 530 for rotation about the x, y, and z axes, tool 532, and contact point 534. Thus, it will be appreciated that an EOAT may include any number of adjustable assemblies, for example according to the weight to be lifted using the EOAT or the range needed to grip an object, among other examples. In some examples, an adjustable assembly may be disabled for certain objects. For example, EOAT 538 may be used similar to EOAT 536 in some instances, where adjustable assembly 552 may be retracted or otherwise moved such that tool 532 is not in contact with an object that is otherwise contacted at contact points 514 and 524 of tools 512 and 522, respectively. In instances where an EOAT includes multiple adjustable assemblies, each adjustable assembly may comprise a set of sensors used by a controller (e.g., controller 50) to prevent or mitigate crashes that may occur among the multiple adjustable assemblies (e.g., between adjustable assemblies 548, 550, and/or 552).

Figure 6:
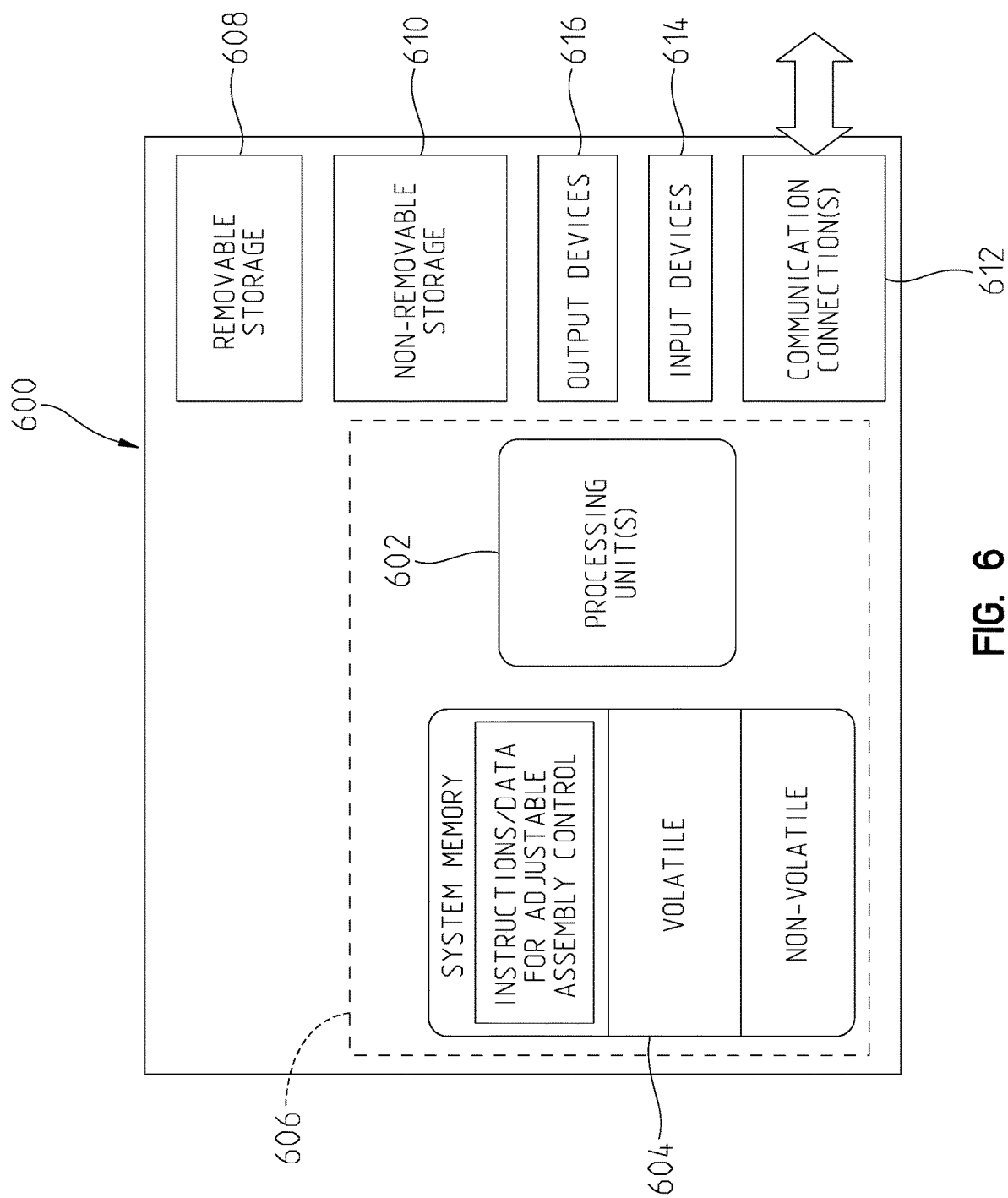
FIG. 6 illustrates an example of a suitable operating environment 600 in which one or more of the present embodiments may be implemented.

FIG. 6 illustrates an example of a suitable operating environment 600 of electronic controller 50 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In examples, operating environment 600 may be part of a robotic device, an adjustable EOAT, an adjustable fixture, or an adjustable assembly, or any combination thereof according to the aspects described herein. In other examples, operating environment 600 may be a separate computing device, for example that is in communication with one or more robotic devices, adjustable EOATs, adjustable fixtures, and/or associated adjustable assemblies.

In its most basic configuration, operating environment 600 typically may include at least one processing unit 602 and memory 604. Depending on the exact configuration and type of computing device, memory 604 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 6 by dashed line 606. Further, environment 600 may also include storage devices (removable, 608, and/or non-removable, 610) including, but not limited to, magnetic or optical disks or tape. Similarly, environment 600 may also have input device(s) 614 such as a keyboard, mouse, pen, voice input, etc. and/or output device(s) 616 such as a display, speakers, printer, etc. Also included in the environment may be one or more communication connections, 612, such as LAN, WAN, point to point, etc.

Operating environment 600 may include at least some form of computer readable media. The computer readable media may be any available media that can be accessed by processing unit 602 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet. In aspects, networking environments may include industrial ethernet networks and/or discrete I/O communications.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 604. While executing on the processing unit 602, program modules (e.g., applications, Input/Output (I/O) management, and other utilities) may perform processes including, but not limited to, control of an adjustable EOAT, an adjustable fixture, and/or robotic device in accordance with the aspects described above.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 600 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

Examples

Example 1. An adjustable end-of-arm tool for a robot may comprise a base adapted to be coupled to the robot; a first adjustable assembly coupled to the base; and a second adjustable assembly coupled to the base. The first adjustable assembly may comprise a first plurality of links; a first plurality of couplers coupling the plurality of links and the base, the first plurality of couplers may provide at least two degrees of the freedom; and a first tool coupled to the base through the first plurality of links and the first plurality of couplers. The first tool may include a first interface which is positionable relative to the base in multiple positions based on the first plurality of links and the first plurality of couplers. The second adjustable assembly may comprise a second plurality of links; a second plurality of couplers coupling the plurality of links and the base, the first plurality of couplers may provide at least two degrees of the freedom; and a second tool coupled to base through the second plurality of links and the second plurality of couplers. The second tool may include a second interface which is positionable relative to the base in multiple positions based on the second plurality of links and the second plurality of couplers.

Example 2. The adjustable end-of-arm tool of Example 1, wherein at least one of the first tool and the second tool may be a magnetic gripper.

Example 3. The adjustable end-of-arm tool of Example 1, wherein the base may have a longitudinal mid-plane. The first adjustable assembly may be positioned on a first side of the longitudinal mid-plane and the second adjustable assembly may be positioned on a second side of the longitudinal mid-plane, the second side being opposite the first side.

Example 4. The adjustable end-of-arm tool of any of Examples 1-3, wherein the base may include a linear rail defining a first axis.

Example 5. The adjustable end-of-arm tool of Example 4, wherein the first plurality of couplers may enable linear movement along the first axis, may enable linear movement along a second axis perpendicular to the first axis, and may enable linear movement along a third axis perpendicular to both the first axis and the second axis.

Example 6. The adjustable end-of-arm tool of Example 5, the first plurality of links may include a first linear rail parallel to the second axis and slidably coupled to the linear rail; and a second linear rail parallel to the third axis and slidably coupled to the first linear rail.

Example 7. The adjustable end-of-arm tool of any of the previous Examples, wherein the first plurality of couplers may enable rotation about at least one of the first axis, the second axis, and the third axis.

Example 8. The adjustable end-of-arm tool of Example 7, wherein the first plurality of couplers may enable rotation about at least two of the first axis, the second axis, and the third axis.

Example 9. The adjustable end-of-arm tool of Example 8, wherein the first plurality of couplers may enable rotation about each of the first axis, the second axis, and the third axis.

Example 10. The adjustable end-of-arm tool of Example 1, wherein the first tool and the second tool may each be a single-sided tool.

Example 11. The adjustable end-of-arm tool of Example 10, wherein the single-sided tool may be one of: a magnetic gripper; a suction gripper; a pin clamp; or a locator.

Example 12. The adjustable end-of-arm tool of Example 1, wherein the first tool and the second tool may each be a double-sided tool.

Example 13. The adjustable end-of-arm tool of Example 12, wherein the double-sided tool may be one of: a power clamp; a parallel clamp; a swing unit; a multiple finger gripping device; or a mylar gripping device.

Example 14. The adjustable end-of-arm tool of Example 1, may further comprise a third adjustable assembly coupled to the base. The third adjustable assembly may comprise a third plurality of links; a third plurality of couplers coupling the third plurality of links and the base, the third plurality of couplers may provide at least two degrees of the freedom; and a third tool coupled to the base through the third plurality of links and the third plurality of couplers.

Example 15. The adjustable end-of-arm tool of Example 14, wherein the base may have a longitudinal mid-plane. The first adjustable assembly and the third adjustable assembly may be positioned on a first side of the longitudinal mid-plane and the second adjustable assembly may be positioned on a second side of the longitudinal mid-plane, the second side being opposite the first side.

Example 16. The adjustable end-of-arm tool of any one of Examples 13 and 14, wherein the first plurality of links and the first plurality of couplers may provide six degrees of freedom for the positioning the first tool relative to the base, the second plurality of links and the second plurality of couplers may provide six degrees of freedom for the positioning the second tool relative to the base, and the third plurality of links and the third plurality of couplers may provide six degrees of freedom for the positioning the third tool relative to the base.

Example 17. The adjustable end-of-arm tool of Example 16, wherein each of the first adjustable assembly, the second adjustable assembly, and the third adjustable assembly may be independently coupled to the base.

Example 18. The adjustable end-of-arm tool of Example 1, wherein the first plurality of links and the first plurality of couplers may provide six degrees of freedom for the positioning the first tool relative to the base and the second plurality of links and the second plurality of couplers may provide six degrees of freedom for the positioning the second tool relative to the base.

Example 19. The adjustable end-of-arm tool of Example 18, wherein each of the first adjustable assembly and the second adjustable assembly may be independently coupled to the base.

Example 20. The adjustable end-of-arm tool any of the previous Examples, may further comprise a controller configured to: identify a first configuration associated with a first object; and configure the first adjustable assembly and the second adjustable assembly according to the first configuration to position the first interface of first tool in a first position relative to the base and to position the second interface of the second tool in a second position relative to the base.

Example 21. The adjustable end-of-arm tool of Example 20, wherein the controller may be further configured to: identify a second configuration associated with a second object, wherein the second configuration is different than the first configuration; and configure the first adjustable assembly and the second adjustable assembly according to the second configuration to position the first interface of first tool in a third position relative to the base and to position the second interface of the second tool in a fourth position relative to the base.

Example 22. An adjustable fixture to receive an object may comprise a base; a first adjustable assembly coupled to the base; and a second adjustable assembly coupled to the base. The first adjustable assembly may comprise a first plurality of links; a first plurality of couplers coupling the first plurality of links and the base, the first plurality of couplers providing at least two degrees of the freedom; and a first tool coupled to the base through the first plurality of links and the first plurality of couplers. The first tool may include a first interface extending above the base. The first interface may be positionable relative to the base in multiple positions based on the first plurality of links and the first plurality of couplers. The second adjustable assembly may comprise a second plurality of links; a second plurality of couplers coupling the second plurality of links and the base, the second plurality of couplers providing at least two degrees of the freedom; and a second tool coupled to base through the second plurality of links and the second plurality of couplers. The second tool may include a second interface extending above the base. The second interface being positionable relative to the base in multiple positions based on the second plurality of links and the second plurality of couplers.

Example 23. The adjustable fixture of Example 22, wherein the first tool and the second tool may each be a single-sided tool.

Example 24. The adjustable fixture of Example 23, wherein the single-sided tool may be one of: a magnetic gripper; a suction gripper; a pin clamp; or a locator.

Example 25. The adjustable fixture of Example 22, wherein the first tool and the second tool may each be a double-sided tool.

Example 26. The adjustable fixture of any one of Examples 22-25, may further comprise a controller configured to: identify a first configuration associated with a first object; and configure the first adjustable assembly and the second adjustable assembly according to the first configuration to position the first interface of first tool in a first position relative to the base and to position the second interface of the second tool in a second position relative to the base.

Example 27. The adjustable fixture of Example 26, wherein the first configuration associated with the first object may be identified according to a sequence comprising the first object and a second object. The controller may be further configured to: identify a second configuration associated with the second object according to the sequence; and configure the first adjustable assembly and the second adjustable assembly according to the second configuration to position the first interface of first tool in a third position relative to the base and to position the second interface of the second tool in a fourth position relative to the base.

Example 28. The adjustable fixture of Example 22, wherein the first plurality of links and the first plurality of couplers may provide six degrees of freedom for the positioning the first tool relative to the base and the second plurality of links and the second plurality of couplers may provide six degrees of freedom for the positioning the second tool relative to the base.

Example 29. The adjustable fixture of Example 28, wherein each of the first adjustable assembly and the second adjustable assembly may be independently coupled to the base.

Example 30. A method for controlling an adjustable assembly of an EOAT for a robot may comprise identifying a first configuration associated with a first object; configuring the adjustable assembly according to the first configuration wherein an interface of the adjustable assembly has a first position relative to a base of the adjustable assembly; engaging a tool of the adjustable assembly, thereby causing the adjustable assembly to grip the first object; disengaging the tool of the adjustable assembly; identifying a second configuration associated with a second object; configuring the adjustable assembly according to the second configuration wherein an interface of the adjustable assembly has a second position relative to a base of the adjustable assembly, the second position being different than the first position; engaging the tool of the adjustable assembly, thereby causing the adjustable assembly to grip the second object; and disengaging the tool of the adjustable assembly.

Example 31. The method of Example 30, wherein the first configuration associated with the first object may be identified according to a stored sequence comprising the first object and the second object; and the second configuration associated with the second object may be identified according to the stored sequence.

Example 32. The method of Example 30, wherein the first configuration associated with the first object may be identified in response to detecting the first object using computer vision; and the second configuration associated with the second object may be identified in response to detecting the second object using computer vision.

Example 33. The method of Example 30, wherein configuring the adjustable assembly according to the first configuration may comprise detecting the first object using computer vision; and dynamically configuring the adjustable assembly based on the detected first object.

Example 34. The method of Example 30, wherein configuring the adjustable assembly according to the first configuration may comprise identifying a location of the first object using computer vision; and configuring the interface of the adjustable assembly according to the identified location.

Example 35. A method for controlling an adjustable assembly of an EOAT for a robot may comprise identifying a first configuration associated with a first object; configuring the adjustable assembly according to the first configuration wherein a first interface of a first tool of the adjustable assembly may have a first position relative to the base, a second interface of a second tool of the adjustable assembly may have a second position relative to the base, and a third interface of a third tool of the adjustable assembly may have a third position relative to the base; engaging the plurality of tools of the adjustable assembly, thereby causing the adjustable assembly to grip the first object; disengaging the plurality of tool of the adjustable assembly; identifying a second configuration associated with a second object; configuring the adjustable assembly according to the second configuration wherein at least one of the first interface of the first tool, the second interface of the second tool, and the third interface of the third tool is moved relative to the first configuration; engaging the plurality of tools of the adjustable assembly, thereby causing the adjustable assembly to grip the second object; and disengaging the plurality of tools of the adjustable assembly. The adjustable assembly may include a base, a plurality of tools including the first tool having the first interface, the second tool having the second interface, and the third tool having the third interface. The first interface of the first tool may be moveable relative to the base in six degrees of freedom. The second interface of the second tool may be moveable relative to the base in six degrees of freedom. The third interface of the third tool may be moveable relative to the base in six degrees of freedom.

Example 36. The method of Example 35, wherein the first configuration associated with the first object may be identified according to a stored sequence comprising the first object and the second object; and the second configuration associated with the second object may be identified according to the stored sequence.

Example 37. The method of Example 35, wherein the first configuration associated with the first object may be identified in response to detecting the first object using computer vision; and the second configuration associated with the second object is identified in response to detecting the second object using computer vision.

Example 38. The method of Example 35, wherein configuring the adjustable assembly according to the first configuration may comprise detecting the first object using computer vision; and dynamically configuring the adjustable assembly based on the detected first object.

Example 39. The method of Example 35, wherein configuring the adjustable assembly according to the first configuration may comprise identifying a location of the first object using computer vision; and configuring the interface of the adjustable assembly according to the identified location.

Example 40. An adjustable end-of-arm tool for a robot may comprise a base adapted to be coupled to the robot, the base including a linear rail defining a first axis; a first adjustable assembly coupled to the base; and a second adjustable assembly coupled to the base. The first adjustable assembly may comprise a first plurality of links; a first plurality of couplers coupling the plurality of links and the base, and a first tool. The first plurality of couplers may enable linear movement along the first axis, may enable linear movement along a second axis perpendicular to the first axis, may enable linear movement along a third axis perpendicular to both the first axis and the second axis, and may enable rotation about at least two of a fourth axis, a fifth axis, and a sixth axis. The first tool may be coupled to the base through the first plurality of links and the first plurality of couplers. The first tool may include a first interface which is positionable relative to the base in multiple positions based on the first plurality of links and the first plurality of couplers. The second adjustable assembly may be coupled to the base. The second adjustable assembly may comprise a second plurality of links; a second plurality of couplers coupling the plurality of links and the base, the second plurality of couplers may provide at least two degrees of the freedom; and a second tool. The second tool may be coupled to base through the second plurality of links and the second plurality of couplers. The second tool may include a second interface which is positionable relative to the base in multiple positions based on the second plurality of links and the second plurality of couplers.

Example 41. The adjustable end-of-arm tool of Example 40, wherein the first plurality of couplers may enable rotation about each of the fourth axis, the fifth axis, and the sixth axis.

Example 42. The adjustable end-of-arm tool of any one of Examples 40 and 41, wherein the fourth axis may be the first axis, the fifth axis may be the second axis, and the sixth axis may be the third axis.

Example 43. The adjustable fixture of Example 40, wherein each of the first adjustable assembly and the second adjustable assembly may be independently coupled to the base.

Example 44. The adjustable end-of-arm tool of Example 43, may further comprise a third adjustable assembly coupled to the base. The third adjustable assembly may comprise a third plurality of links; a third plurality of couplers coupling the third plurality of links and the base, the third plurality of couplers providing at least two degrees of the freedom; and a third tool coupled to the base through the third plurality of links and the third plurality of couplers.

Example 45. The adjustable end-of-arm tool of Example 44, wherein the base may have a longitudinal mid-plane. The first adjustable assembly and the third adjustable assembly being positioned on a first side of the longitudinal mid-plane and the second adjustable assembly being positioned on a second side of the longitudinal mid-plane, the second side being opposite the first side.

Example 46. The adjustable end-of-arm tool of Example 45, wherein each of the first adjustable assembly, the second adjustable assembly, and the third adjustable assembly may be independently coupled to the base.

Example 47. An adjustable end-of-arm tool for a robot may comprise a base adapted to be coupled to the robot; a first adjustable assembly coupled to the base; and a second adjustable assembly coupled to the base. The first adjustable assembly may comprise a first linear adjustment subassembly coupled to the base. The first linear adjustment subassembly may provide at least two degrees of linear motion relative to the base. The first adjustable assembly may further comprise a first rotational adjustment subassembly coupled to the base through the first linear subassembly. The first rotational adjustment subassembly may provide at least two degrees of rotational motion relative to the base. The first adjustable assembly may further comprise a first tool coupled to the base through the first rotational subassembly and the first linear subassembly. The first tool including a first interface which is positionable relative to the base in multiple positions based on the first linear adjustment subassembly and the first rotational adjustment subassembly. The second adjustable assembly may be coupled to the base. The second adjustable subassembly may comprise a second linear adjustment subassembly coupled to the base. The second adjustable assembly may further comprise a second rotational adjustment subassembly coupled to the base through the second linear subassembly. The second adjustable assembly may further comprise a second tool. The second tool may be coupled to the base through the second rotational subassembly and the second linear subassembly. The second tool may include a second interface which is positionable relative to the base in multiple positions based on the second linear adjustment subassembly and the second rotational adjustment subassembly.

Example 48. The adjustable end-of-arm tool of Example 47, wherein the first rotational adjustment subassembly may provide at least three degrees of rotational motion relative to the base.

Example 49. The adjustable end-of-arm tool of Example 47, wherein the base may include a linear rail defining a first axis. The first linear adjustment subassembly may include a first plurality of links and a first plurality of couplers coupling the plurality of links and the base. The first plurality of couplers may enable linear movement along the first axis, may enable linear movement along a second axis perpendicular to the first axis, may enable linear movement along a third axis perpendicular to both the first axis and the second axis.

Example 50. The adjustable end-of-arm tool of Example 49, wherein the first rotational adjustment subassembly may provide at least three degrees of rotational motion relative to the linear adjustment subassembly about a fourth axis, a fifth axis, and a sixth axis.

Example 51. The adjustable end-of-arm tool of Example 50, wherein the fourth axis is the first axis, the fifth axis is the second axis, and the sixth axis is the third axis.

Example 52. The adjustable end-of-arm tool of any one of Examples 50 and 51, wherein the fourth axis, the fifth axis, and the sixth axis may intersect at a common point.

Example 53. The adjustable end-of-arm tool of any one of Example 47-52, wherein the first tool and the second tool may each be a single-sided tool.

Example 54. The adjustable end-of-arm tool of Example 53, wherein the single-sided tool is one of: a magnetic gripper; a suction gripper; a pin clamp; or a locator.

Example 55. The adjustable end-of-arm tool of any one of Example 47-52, wherein the first tool and the second tool may each be a double-sided tool.

Example 56. The adjustable end-of-arm tool of any one of Examples 47-55, may further comprise a controller configured to: identify a first configuration associated with a first object; and configure the first adjustable assembly and the second adjustable assembly according to the first configuration to position the first interface of first tool in a first position relative to the base and to position the second interface of the second tool in a second position relative to the base.

Example 57. The adjustable end-of-arm tool of Example 56, wherein the first configuration associated with the first object may identified according to a sequence comprising the first object and a second object. The controller may be further configured to identify a second configuration associated with the second object according to the sequence; and configure the first adjustable assembly and the second adjustable assembly according to the second configuration to position the first interface of first tool in a third position relative to the base and to position the second interface of the second tool in a fourth position relative to the base.

Example 58. The adjustable end-of-arm tool of Example 47, may further comprise a third adjustable assembly coupled to the base. The third adjustable assembly may comprise a third linear adjustment subassembly coupled to the base. The third linear adjustment subassembly may provide at least two degrees of linear motion relative to the base. The third adjustable assembly may further comprise a third rotational adjustment subassembly coupled to the base through the third linear subassembly. The third rotational adjustment subassembly may provide at least two degrees of rotational motion relative to the base. The third tool may be coupled to the base through the third rotational subassembly and the third linear subassembly. The third tool may include a third interface which is positionable relative to the base in multiple positions based on the third linear adjustment subassembly and the third rotational adjustment subassembly.

Example 59. The adjustable end-of-arm tool of Example 58, wherein the base may have a longitudinal mid-plane. The first adjustable assembly and the third adjustable assembly being positioned on a first side of the longitudinal mid-plane and the second adjustable assembly being positioned on a second side of the longitudinal mid-plane, the second side being opposite the first side.

Example 60. The adjustable end-of-arm tool of any one of Examples 58 and 59, wherein the first plurality of links and the first plurality of couplers may provide six degrees of freedom for the positioning the first tool relative to the base, the second plurality of links and the second plurality of couplers may provide six degrees of freedom for the positioning the second tool relative to the base, and the third plurality of links and the third plurality of couplers may provide six degrees of freedom for the positioning the third tool relative to the base.

Example 61. The adjustable end-of-arm tool of Example 60, wherein each of the first adjustable assembly, the second adjustable assembly, and the third adjustable assembly may be independently coupled to the base.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. An adjustable end-of-arm tool for a robot for moving an object, comprising:
   a base adapted to be coupled to the robot and positionable by the robot;
   a first adjustable assembly coupled to the base, comprising:
      a first plurality of links;
      a first plurality of couplers coupling the plurality of links and the base, the first plurality of couplers providing at least two degrees of the freedom; and
      a first tool coupled to the base through the first plurality of links and the first plurality of couplers, the first tool including a first interface which is positionable relative to the base in multiple positions based on the first plurality of links and the first plurality of couplers; and
   a second adjustable assembly coupled to the base, comprising:
      a second plurality of links;
      a second plurality of couplers coupling the plurality of links and the base, the first plurality of couplers providing at least two degrees of the freedom; and
      a second tool coupled to base through the second plurality of links and the second plurality of couplers, the second tool including a second interface which is positionable relative to the base in multiple positions based on the second plurality of links and the second plurality of couplers;
      wherein the second adjustable assembly is coupled to the base independent of the first adjustable assembly; and
   a controller operably coupled to at least one sensor configured to detect the object and each of the first adjustable assembly and the second adjustable assembly, the controller operable to dynamically adjust the first adjustable assembly and the second adjustable assembly based upon at least one output of the at least one sensor to position the first adjustable assembly and the second adjustable assembly to grip the object.

2. The adjustable end-of-arm tool of claim 1, at least one of the first tool and the second tool is a magnetic gripper.

3. The adjustable end-of-arm tool of claim 1, wherein the base has a longitudinal mid-plane, the first adjustable assembly being positioned on a first side of the longitudinal mid-plane and the second adjustable assembly being positioned on a second side of the longitudinal mid-plane, the second side being opposite the first side.

4. The adjustable end-of-arm tool of claim 1, wherein the base includes a linear rail defining a first axis.

5. The adjustable end-of-arm tool of claim 4, wherein the first plurality of couplers enables linear movement along the first axis, enables linear movement along a second axis perpendicular to the first axis, enables linear movement along a third axis perpendicular to both the first axis and the second axis.

6. The adjustable end-of-arm tool of claim 5, the first plurality of links includes
   a first linear rail parallel to the second axis and slidably coupled to the linear rail; and
   a second linear rail parallel to the third axis and slidably coupled to the first linear rail.

7. The adjustable end-of-arm tool of claim 5, wherein the first plurality of couplers enables rotation about at least one of a fourth axis parallel to the first axis, a fifth axis parallel to the second axis, and a sixth axis parallel to the third axis.

8. The adjustable end-of-arm tool of claim 7, wherein the first plurality of couplers enables rotation about at least two of the fourth axis, the fifth axis, and the sixth axis.

9. The adjustable end-of-arm tool of claim 8, wherein the first plurality of couplers enables rotation about each of the fourth axis, the fifth axis, and the sixth axis.

10. The adjustable end-of-arm tool of claim 1, wherein the first tool and the second tool are each a single-sided tool.

11. The adjustable end-of-arm tool of claim 10, wherein the single-sided tool is one of:
   a magnetic gripper;
   a suction gripper;
   a pin clamp; or
   a locator.

12. The adjustable end-of-arm tool of claim 1, wherein the first tool and the second tool are each a double-sided tool.

13. The adjustable end-of-arm tool of claim 12, wherein the double-sided tool is one of:
   a power clamp;
   a parallel clamp;
   a swing unit;
   a multiple finger gripping device; or
   a mylar gripping device.

14. The adjustable end-of-arm tool of claim 13, wherein the first plurality of links and the first plurality of couplers provides six degrees of freedom for the positioning the first tool relative to the base, the second plurality of links and the second plurality of couplers provides six degrees of freedom for the positioning the second tool relative to the base, and the third plurality of links and the third plurality of couplers provides six degrees of freedom for the positioning the third tool relative to the base.

15. The adjustable end-of-arm tool of claim 14, wherein each of the first adjustable assembly, the second adjustable assembly, and the third adjustable assembly are independently coupled to the base.

16. The adjustable end-of-arm tool of claim 1, further comprising:
   a third adjustable assembly coupled to the base, comprising:
      a third plurality of links;
      a third plurality of couplers coupling the third plurality of links and the base, the third plurality of couplers providing at least two degrees of the freedom; and
      a third tool coupled to the base through the third plurality of links and the third plurality of couplers.

17. The adjustable end-of-arm tool of claim 16, wherein the base has a longitudinal mid-plane, the first adjustable assembly and the third adjustable assembly being positioned on a first side of the longitudinal mid-plane and the second adjustable assembly being positioned on a second side of the longitudinal mid-plane, the second side being opposite the first side.

18. The adjustable end-of-arm tool of claim 1, wherein the first plurality of links and the first plurality of couplers provides six degrees of freedom for the positioning the first tool relative to the base and the second plurality of links and the second plurality of couplers provides six degrees of freedom for the positioning the second tool relative to the base.

19. The adjustable end-of-arm tool of claim 18, wherein each of the first adjustable assembly and the second adjustable assembly are independently coupled to the base.

20. The adjustable end-of-arm tool of claim 1, further comprising:
 a controller configured to:
  identify a first configuration associated with a first object; and
  configure the first adjustable assembly and the second adjustable assembly according to the first configuration to position the first interface of first tool in a first position relative to the base and to position the second interface of the second tool in a second position relative to the base.

21. The adjustable end-of-arm tool of claim 20, wherein the controller is further configured to:
 identify a second configuration associated with a second object, wherein the second configuration is different than the first configuration; and
 configure the first adjustable assembly and the second adjustable assembly according to the second configuration to position the first interface of first tool in a third position relative to the base and to position the second interface of the second tool in a fourth position relative to the base.

22. The adjustable end-of-arm tool of claim 1, wherein the controller is further configured to:
 configure the EOAT in a first position;
 identify, by the at least one sensor, an obstacle; and
 configure the EOAT in a second position to avoid a collision with the obstacle.

23. The adjustable end-of-arm tool of claim 22, wherein the at least one sensor comprises a vision sensor.

24. The adjustable end-of-arm tool of claim 22, wherein the at least one sensor comprises a LIDAR sensor.

25. The adjustable end-of-arm tool of claim 22, wherein the at least one sensor is supported by the base.

26. The adjustable end-of-arm tool of claim 22, wherein the at least one sensor is supported independent of the base.

27. The adjustable end-of-arm tool of claim 22, wherein the at least one sensor is supported by the robot.

28. The adjustable end-of-arm tool of claim 1, wherein the controller is further configured to:
 determine a proximity of the BOAT to a ferromagnetic workpiece.

29. The adjustable end-of-arm tool of claim 28, wherein the controller is further configured to:
 determine a correctness of a placement of the EOAT on the ferromagnetic workpiece.

30. The adjustable end-of-arm tool of claim 1, wherein the at least one sensor is supported by the robot.

31. The adjustable end-of-arm tool of claim 1, wherein the at least one sensor is supported by the first tool.

32. The adjustable end-of-arm tool of claim 1, wherein the at least one sensor is supported independent of the robot.

33. An adjustable end-of-arm tool for a robot for moving an object, comprising:
 a base adapted to be coupled to the robot and positionable by the robot, the base including a linear rail defining a first axis;
 a first adjustable assembly coupled to the base, comprising:
  a first plurality of links;
  a first plurality of couplers coupling the plurality of links and the base, the first plurality of couplers enables linear movement along the first axis, enables linear movement along a second axis perpendicular to the first axis, enables linear movement along a third axis perpendicular to both the first axis and the second axis, and enables rotation about at least two of a fourth axis, a fifth axis, and a sixth axis; and
  a first tool coupled to the base through the first plurality of links and the first plurality of couplers, the first tool including a first interface which is positionable relative to the base in multiple positions based on the first plurality of links and the first plurality of couplers; and
 a second adjustable assembly coupled to the base, comprising:
  a second plurality of links;
  a second plurality of couplers coupling the plurality of links and the base, the second plurality of couplers providing at least two degrees of the freedom; and
 a second tool coupled to base through the second plurality of links and the second plurality of couplers, the second tool including a second interface which is positionable relative to the base in multiple positions based on the second plurality of links and the second plurality of couplers
  wherein the second adjustable assembly is coupled to the base independent of the first adjustable assembly; and
  a controller operably coupled to at least one sensor configured to detect the object and each of the first adjustable assembly and the second adjustable assembly, the controller operable to dynamically adjust the first adjustable assembly and the second adjustable assembly based upon at least one output of the at least one sensor to position the first adjustable assembly and the second adjustable assembly to grip the object.

34. The adjustable end-of-arm tool of claim 33, wherein the first plurality of couplers enables rotation about each of the fourth axis, the fifth axis, and the sixth axis.

35. The adjustable end-of-arm tool of claim 33, wherein the fourth axis is the first axis, the fifth axis is the second axis, and the sixth axis is the third axis.

36. The adjustable end-of-arm tool of claim 33, wherein each of the first adjustable assembly and the second adjustable assembly are independently coupled to the base.

37. The adjustable end-of-arm tool of claim 36, further comprising:
 a third adjustable assembly coupled to the base, comprising:
  a third plurality of links;
  a third plurality of couplers coupling the third plurality of links and the base, the third plurality of couplers providing at least two degrees of the freedom; and
  a third tool coupled to the base through the third plurality of links and the third plurality of couplers.

38. The adjustable end-of-arm tool of claim 37, wherein the base has a longitudinal mid-plane, the first adjustable assembly and the third adjustable assembly being positioned on a first side of the longitudinal mid-plane and the second adjustable assembly being positioned on a second side of the longitudinal mid-plane, the second side being opposite the first side.

39. The adjustable end-of-arm tool of claim 38, wherein each of the first adjustable assembly, the second adjustable assembly, and the third adjustable assembly are independently coupled to the base.

40. The adjustable end-of-arm tool of claim 33, wherein the at least one sensor is supported by the robot.

41. The adjustable end-of-arm tool of claim 33, wherein the at least one sensor is supported by the first tool.

42. The adjustable end-of-arm tool of claim 33, wherein the at least one sensor is supported independent of the robot.

43. An adjustable end-of-arm tool for a robot for moving an object, comprising:
    a base adapted to be coupled to the robot and positionable by the robot;
    a first adjustable assembly coupled to the base, comprising:
        a first linear adjustment subassembly coupled to the base, the first linear adjustment subassembly provides at least two degrees of linear motion relative to the base;
        a first rotational adjustment subassembly coupled to the base through the first linear subassembly, the first rotational adjustment subassembly provides at least two degrees of rotational motion relative to the base; and
        a first tool coupled to the base through the first rotational subassembly and the first linear subassembly, the first tool including a first interface which is positionable relative to the base in multiple positions based on the first linear adjustment subassembly and the first rotational adjustment subassembly; and
    a second adjustable assembly coupled to the base, comprising:
        a second linear adjustment subassembly coupled to the base;
        a second rotational adjustment subassembly coupled to the base through the second linear subassembly; and
        a second tool coupled to the base through the second rotational subassembly and the second linear subassembly, the second tool including a second interface which is positionable relative to the base in multiple positions based on the second linear adjustment subassembly and the second rotational adjustment subassembly;
        wherein the second adjustable assembly is coupled to the base independent of the first adjustable assembly; and
    a controller operably coupled to at least one sensor configured to detect the object and each of the first adjustable assembly and the second adjustable assembly, the controller operable to dynamically adjust the first adjustable assembly and the second adjustable assembly based upon at least one output of the at least one sensor to position the first adjustable assembly and the second adjustable assembly to grip the object.

44. The adjustable end-of-arm tool of claim 43, wherein the first rotational adjustment subassembly provides at least three degrees of rotational motion relative to the base.

45. The adjustable end-of-arm tool of claim 43, wherein the base includes a linear rail defining a first axis, the first linear adjustment subassembly includes a first plurality of links and a first plurality of couplers coupling the plurality of links and the base, the first plurality of couplers enables linear movement along the first axis, enables linear movement along a second axis perpendicular to the first axis, enables linear movement along a third axis perpendicular to both the first axis and the second axis.

46. The adjustable end-of-arm tool of claim 45, wherein the first rotational adjustment subassembly provides at least three degrees of rotational motion relative to the linear adjustment subassembly about a fourth axis, a fifth axis, and a sixth axis.

47. The adjustable end-of-arm tool of claim 46, wherein the fourth axis is the first axis, the fifth axis is the second axis, and the sixth axis is the third axis.

48. The adjustable end-of-arm tool of claim 46, wherein the fourth axis, the fifth axis, and the sixth axis intersect at a common point.

49. The adjustable end-of-arm tool of claim 43, wherein the first tool and the second tool are each a single-sided tool.

50. The adjustable end-of-arm tool of claim 49, wherein the single-sided tool is one of:
    a magnetic gripper;
    a suction gripper;
    a pin clamp; or
    a locator.

51. The adjustable end-of-arm tool of claim 43, wherein the first tool and the second tool are each a double-sided tool.

52. The adjustable end-of-arm tool of claim 43, further comprising:
    a controller configured to:
        identify a first configuration associated with a first object; and
        configure the first adjustable assembly and the second adjustable assembly according to the first configuration to position the first interface of first tool in a first position relative to the base and to position the second interface of the second tool in a second position relative to the base.

53. The adjustable end-of-arm tool of claim 52, wherein:
    the first configuration associated with the first object is identified according to a sequence comprising the first object and a second object; and
    the controller is further configured to:
        identify a second configuration associated with the second object according to the sequence; and
        configure the first adjustable assembly and the second adjustable assembly according to the second configuration to position the first interface of first tool in a third position relative to the base and to position the second interface of the second tool in a fourth position relative to the base.

54. The adjustable end-of-arm tool of claim 43, further comprising:
    a third adjustable assembly coupled to the base, comprising:
        a third linear adjustment subassembly coupled to the base, the third linear adjustment subassembly provides at least two degrees of linear motion relative to the base;
        a third rotational adjustment subassembly coupled to the base through the third linear subassembly, the third rotational adjustment subassembly provides at least two degrees of rotational motion relative to the base; and
        a third tool coupled to the base through the third rotational subassembly and the third linear subassembly, the third tool including a third interface which is positionable relative to the base in multiple positions based on the third linear adjustment subassembly and the third rotational adjustment subassembly.

55. The adjustable end-of-arm tool of claim 54, wherein the base has a longitudinal mid-plane, the first adjustable assembly and the third adjustable assembly being positioned on a first side of the longitudinal mid-plane and the second adjustable assembly being positioned on a second side of the longitudinal mid-plane, the second side being opposite the first side.

56. The adjustable end-of-arm tool of claim 54, wherein the first plurality of links and the first plurality of couplers provides six degrees of freedom for the positioning the first tool relative to the base, the second plurality of links and the second plurality of couplers provides six degrees of freedom for the positioning the second tool relative to the base, and the third plurality of links and the third plurality of couplers provides six degrees of freedom for the positioning the third tool relative to the base.

57. The adjustable end-of-arm tool of claim 56, wherein each of the first adjustable assembly, the second adjustable assembly, and the third adjustable assembly are independently coupled to the base.

58. The adjustable end-of-arm tool of claim 43, wherein the at least one sensor is supported by the robot.

59. The adjustable end-of-arm tool of claim 43, wherein the at least one sensor is supported by the first tool.

60. The adjustable end-of-arm tool of claim 43, wherein the at least one sensor is supported independent of the robot.

* * * * *